(12) United States Patent
Inukai et al.

(10) Patent No.: US 10,300,391 B2
(45) Date of Patent: May 28, 2019

(54) MANAGEMENT DEVICE, MANAGEMENT METHOD, TERMINAL DEVICE, CONTROL METHOD, AND PROGRAM

(71) Applicant: KONAMI DIGITAL ENTERTAINMENT CO., LTD., Tokyo (JP)

(72) Inventors: Shinsaku Inukai, Kawasaki (JP); Daisuke Sato, Tokyo (JP); Masato Miyazaki, Tokyo (JP); Kenshiro Hanamoto, Tokyo (JP); Hiroyuki Hosoyama, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 346 days.

(21) Appl. No.: 14/860,795

(22) Filed: Sep. 22, 2015

(65) Prior Publication Data
US 2016/0008720 A1   Jan. 14, 2016

(30) Foreign Application Priority Data

Mar. 28, 2013 (JP) ................................. 2013-070625
Mar. 28, 2013 (JP) ................................. 2013-070626
(Continued)

(51) Int. Cl.
*A63F 13/48* (2014.01)
*A63F 13/795* (2014.01)
(Continued)

(52) U.S. Cl.
CPC .......... *A63F 13/795* (2014.09); *A63F 13/352* (2014.09); *A63F 13/48* (2014.09); *A63F 13/77* (2014.09); *A63F 2300/209* (2013.01)

(58) Field of Classification Search
CPC .......... A63F 13/48; A63F 13/77; A63F 13/79; A63F 13/352; A63F 13/795
(Continued)

(56) References Cited

U.S. PATENT DOCUMENTS 7,311,608 B1 * 12/2007 Danieli .................. A63F 13/12
                                                            463/42
7,613,800 B2 * 11/2009 Dhupelia ................ A63F 13/12
                                                            705/31
(Continued)

FOREIGN PATENT DOCUMENTS

JP    200497610 A    4/2004
JP    2005332187 A   12/2005
(Continued)

OTHER PUBLICATIONS

Sinker marketing—Sin BalbBo betting of "Wind runner" the blog. naver.com,[online] Feb. 8, 2013., and the Internet <URL:http://blog.naver.com/kss3500/120180904963>, 22 pages total.
(Continued)

*Primary Examiner* — Omkar A Deodhar
*Assistant Examiner* — Shauna-Kay Hall
(74) *Attorney, Agent, or Firm* — Sughrue Mion, PLLC

(57) ABSTRACT

A management device includes: a controller configured to control an invitation processing for introducing a first application from a first terminal of a first user to a second terminal of a second user. The first application and a second application have been executed in the first terminal. The first and second users are inter-related with respect to the second application. The controller further includes: an invitation request receiver configured to receive, from the first terminal of the first user, an invitation request information for inviting the second user to the first application; and an invitation notifier configured to transmit, to the second terminal of the
(Continued)

second user, an invitation notification information that is based on the invitation request information for inviting the second user that has been received by the invitation request receiver.

25 Claims, 17 Drawing Sheets

(30) Foreign Application Priority Data

| | | | |
|---|---|---|---|
| Mar. 28, 2013 | (JP) | ................................ | 2013-070627 |
| Mar. 28, 2013 | (JP) | ................................ | 2013-070628 |
| Mar. 4, 2014 | (JP) | ................................ | 2014-042183 |
| Mar. 4, 2014 | (JP) | ................................ | 2014-042184 |
| Mar. 4, 2014 | (JP) | ................................ | 2014-042185 |
| Mar. 4, 2014 | (JP) | ................................ | 2014-042186 |

(51) Int. Cl.
    *A63F 13/352*     (2014.01)
    *A63F 13/77*     (2014.01)

(58) Field of Classification Search
    USPC ................................................................ 463/9
    See application file for complete search history.

(56) References Cited

U.S. PATENT DOCUMENTS

| | | | | |
|---|---|---|---|---|
| 8,480,494 | B2* | 7/2013 | Cantor | ................ A63F 13/12 463/40 |
| 2004/0092313 | A1 | 5/2004 | Saito et al. | |
| 2007/0168958 | A1* | 7/2007 | Huang | ................ G06Q 10/00 717/120 |
| 2008/0227552 | A1* | 9/2008 | Shimomura | ............ A63F 13/12 463/42 |
| 2010/0210364 | A1* | 8/2010 | York | ................ A63F 13/79 463/43 |
| 2010/0255917 | A1* | 10/2010 | Nemoto | ................ A63F 13/67 463/42 |
| 2012/0028700 | A1* | 2/2012 | Avent | ................ A63F 13/12 463/23 |
| 2012/0322560 | A1* | 12/2012 | Joo | ................ A63F 13/35 463/42 |
| 2013/0252728 | A1* | 9/2013 | Kaneyoshi | .............. A63F 13/79 463/29 |

FOREIGN PATENT DOCUMENTS

| | | |
|---|---|---|
| JP | 5107455 B1 | 12/2012 |
| JP | 2013-588 A | 1/2013 |
| JP | 201313445 A | 1/2013 |
| KR | 101069315 A | 10/2011 |
| WO | 2011126508 A1 | 10/2011 |
| WO | 2013001897 A1 | 1/2013 |

OTHER PUBLICATIONS

Kenji Saeki, 'PS Vita 'Samurai & Dragons','Frend Shotai Kino' & 'Maju Soko' o Jisso', paragraph of 'Frend Shotai Kino', 1st to 2nd paragraphs, [online], Nov. 27, 2012, Impress Watch Corp., GAME Watch, [retrieval date May 14, 2014, Internet<URL: http://game.watch.impress.co.jp/docs/news/20121127_575538.html>.

Tomomi Yamamura, 'PlayStation Home' Closed β Test Report—HOME no Sekai e Itte Mimashita Hen-', paragraph of Home Application Instal—Avatar no Sakusei' Kakuchosei Yutaka na Sekkei no Application. Komaka ni Tsukuri Komeru Avatar', 1st paragraph, paragraph of 'HOME no Menu-teki na Yakuwari o Ninau 'Virtual PSP' HOME no Junin wa Minna PSP o Full Katsuyo!', 4th to 7th paragraphs,[online], Sep. 9, 2008, Impress Watch Corp., GAME Watch, [retrieval date May 14, 2014], Internet <URL:http://game.watch.impress.co.jp/docs/20080909/home.htm>.

* cited by examiner

FIG. 7

| APPLICATION ID (ApID) | NOTIFICATION DESTINATION URL (NoticeURL) | STORE URL (ApStoreURL) | APPLICATION URL SCHEME (ApURI) | APPLICATION NAME (ApNAME) | APPLICATION DESCRIPTION (ApDOC) | APPLICATION ICON IMAGE (ApICO) | RE-INVITATION PERMISSION FLAG (FlagResultInvite) |
|---|---|---|---|---|---|---|---|
| | | | | | | | |
| | | | | | | | |

FIG. 8

| INVITATION ID | REQUEST SOURCE APPLICATION ID | REQUEST SOURCE APPLICATION INVITING USER ID | REQUEST SOURCE APPLICATION INVITED USER ID | REQUEST DESTINATION APPLICATION ID | REQUEST DESTINATION APPLICATION INVITING USER ID | REQUEST DESTINATION APPLICATION INVITED USER ID | REQUEST DESTINATION APPLICATION INVITING USER NAME | REQUEST DESTINATION APPLICATION INVITING USER IMAGE URL | INVITATION REQUEST STATUS |
|---|---|---|---|---|---|---|---|---|---|
| (InviteID) | (ApIDfrom) | (Apfrom_UIDfrom) | (Apfrom_UIDto) | (ApIDto) | (Apto_UIDfrom) | (Apto_UIDto) | (Apto_NAMEfrom) | (Apto_URLfrom) | (StatusInvite) |
| | | | | | | | | | |

FIG. 12

| FILTER ID<br>(FilterID) | BLOCKING APPLICATION ID<br>(ApIDfrom) | BLOCKED APPLICATION ID<br>(ApIDto) |
|---|---|---|
|  |  |  |
|  |  |  |

FIG. 15

| FILTER ID (FilterID) | APPLICATION ID (FilterApID) | BLOCKING USER (UIDfrom) | BLOCKED USER (UIDto) |
|---|---|---|---|
|  |  |  |  |
|  |  |  |  |

FIG. 16

| FILTER ID (FilterID) | APPLICATION ID (FilterApID) | BLOCKING USER (UIDfrom) |
|---|---|---|
|  |  |  |
|  |  |  |

FIG. 17

| REQUEST SOURCE APPLICATION ID (ApIDfrom) | REQUEST SOURCE APPLICATION INVITING USER ID (Apfrom_UIDfrom) | REQUEST SOURCE APPLICATION INVITED USER ID (Apfrom_UIDto) | REQUEST DESTINATION APPLICATION ID (ApIDto) | REQUEST DESTINATION APPLICATION INVITING USER ID (Apto_UIDfrom) | REQUEST DESTINATION APPLICATION INVITED USER ID (Apto_UIDto) | INVITATION REQUEST STATUS (StatusInvite) |
|---|---|---|---|---|---|---|
| = |  |  | = | Apto_UIDto |  |  |

FIG. 18

| REQUEST SOURCE APPLICATION ID | REQUEST SOURCE APPLICATION INVITING USER ID | REQUEST SOURCE APPLICATION INVITED USER ID | REQUEST DESTINATION APPLICATION ID | REQUEST DESTINATION APPLICATION INVITING USER ID | REQUEST DESTINATION APPLICATION INVITED USER ID | INVITATION REQUEST STATUS |
|---|---|---|---|---|---|---|
| (ApIDfrom) | (Apfrom_UIDfrom) | (Apfrom_UIDto) | (ApIDto) | (Apto_UIDfrom) | (Apto_UIDto) | (StatusInvite) |
| = | | | = | | = | 2,3 |

FIG. 19

| REQUEST SOURCE APPLICATION ID | REQUEST SOURCE APPLICATION INVITING USER ID | REQUEST SOURCE APPLICATION INVITED USER ID | REQUEST DESTINATION APPLICATION ID | REQUEST DESTINATION APPLICATION INVITING USER ID | REQUEST DESTINATION APPLICATION INVITED USER ID | INVITATION REQUEST STATUS |
|---|---|---|---|---|---|---|
| (ApIDfrom) | (Apfrom_UIDfrom) | (Apfrom_UIDto) | (ApIDto) | (Apto_UIDfrom) | (Apto_UIDto) | (StatusInvite) |
| = | | | = | | = | 0,1 |

FIG. 20

| REQUEST SOURCE APPLICATION ID | REQUEST SOURCE APPLICATION INVITING USER ID | REQUEST SOURCE APPLICATION INVITED USER ID | REQUEST DESTINATION APPLICATION ID | REQUEST DESTINATION APPLICATION INVITING USER ID | REQUEST DESTINATION APPLICATION INVITED USER ID | INVITATION REQUEST STATUS |
|---|---|---|---|---|---|---|
| (ApIDfrom) | (Apfrom_UIDfrom) | (Apfrom_UIDto) | (ApIDto) | (Apto_UIDfrom) | (Apto_UIDto) | (StatusInvite) |
| = | | = | | | = | -1 |

FIG. 21

| REQUEST SOURCE APPLICATION ID | REQUEST SOURCE APPLICATION INVITING USER ID | REQUEST SOURCE APPLICATION INVITED USER ID | REQUEST DESTINATION APPLICATION ID | REQUEST DESTINATION APPLICATION INVITING USER ID | REQUEST DESTINATION APPLICATION INVITED USER ID | INVITATION REQUEST STATUS |
|---|---|---|---|---|---|---|
| (ApIDfrom) | (Apfrom_UIDfrom) | (Apfrom_UIDto) | (ApIDto) | (Apto_UIDfrom) | (Apto_UIDto) | (StatusInvite) |
| = | | | = | = | = | -1 |

MANAGEMENT DEVICE, MANAGEMENT METHOD, TERMINAL DEVICE, CONTROL METHOD, AND PROGRAM

BACKGROUND

Technical Field

The disclosure relates to a management device, a management method, a terminal device, a control method, and a program.

Related Art

Social network games provided to members of SNSs, social networking services, have been known. The SNSs do function as a portal site for social network games provided to members, and manage member information of users of the SNS and information of the users in each social network game in association with each other. For this reason, for example, members who are in a friend relationship can mutually know what games others are playing and, if they are playing a game but a person in a friend relationship with them is not, they can invite the member to play the game via the SNSs.

There are social network games that, rather than being provided to SNS members can be used even without being a member of an SNS, these being referred to herein as independent social network games. Applications such as these independent social network games are so-called native applications, which can be used by downloading them from a store site that sells applications or from a dedicated site for each individual application and installing them.

With such native applications, if another user is to be invited to an application that a user is using, the method that has been used is that of utilizing social media or e-mail. With this method, the inviting user gives notification (invitation notification) of the user ID and the user receiving the invitation inputs the user ID of the inviting user when starting to use the application to which the invitation was received, so as to establish a relationship between the inviting user and the invited user.

There are cases in which a user that is in a friend relationship with a user via a certain application but wishes to make an invitation to a different application. Using the above-noted method, however, it might be that it is unclear whether the user to be invited is using social media, or that the user's e-mail address might be unknown. Additionally, users who are in a friend relationship regarding an application are not necessarily in a friend relationship in the real world, and there are many cases in which the name (nickname) used within an application does not coincide with the user name (account name) used in social media or for e-mail used in the real world. With the above-noted method, therefore, there have been cases in which it is not possible to make an effective invitation notification to a user to be invited. For this reason, there has been a desire for an arrangement between the application to which the invitation is to be made and the inviting application, whereby it is possible to invite a user. However, because each application manages the user information in each of the applications in a unique manner, there is incompatibility of user information between applications. For this reason, there have been cases in which a user who is a friend in a given application could not be invited to a different application.

SUMMARY

A management device includes: a controller configured to control an invitation processing for introducing a first application from a first terminal of a first user to a second terminal of a second user. The first application and a second application have been executed in the first terminal. The first and second users are inter-related with respect to the second application. The controller further includes: an invitation request receiver configured to receive, from the first terminal of the first user, an invitation request information for inviting the second user to the first application; and an invitation notifier configured to transmit, to the second terminal of the second user, an invitation notification information that is based on the invitation request information for inviting the second user that has been received by the invitation request receiver.

BRIEF DESCRIPTIONS OF THE DRAWINGS

FIG. 7 is a drawing showing an example of information stored in the application settings storage.

FIG. 8 is a drawing showing an example of the information stored in the invitation request information storage.

FIG. 12 is a drawing showing an example of the information stored in a mutual invitation blocking settings storage.

FIG. 15 is a drawing showing an example of the information stored in the invitation request blocked user settings storage.

FIG. 16 is a drawing showing an example of the information stored in the invitation request blocked application settings storage.

FIG. 17 is a drawing describing a first example of filtering processing based on an invitation request record.

FIG. 18 is a drawing describing a second example of filtering processing based on an invitation request record.

FIG. 19 is a drawing describing a third example of filtering processing based on an invitation request record.

FIG. 20 is a drawing describing a fourth example of filtering processing based on an invitation request record.

FIG. 21 is a drawing describing a fifth example of filtering processing based on an invitation request record.

DETAILED DESCRIPTIONS

Figure 1:
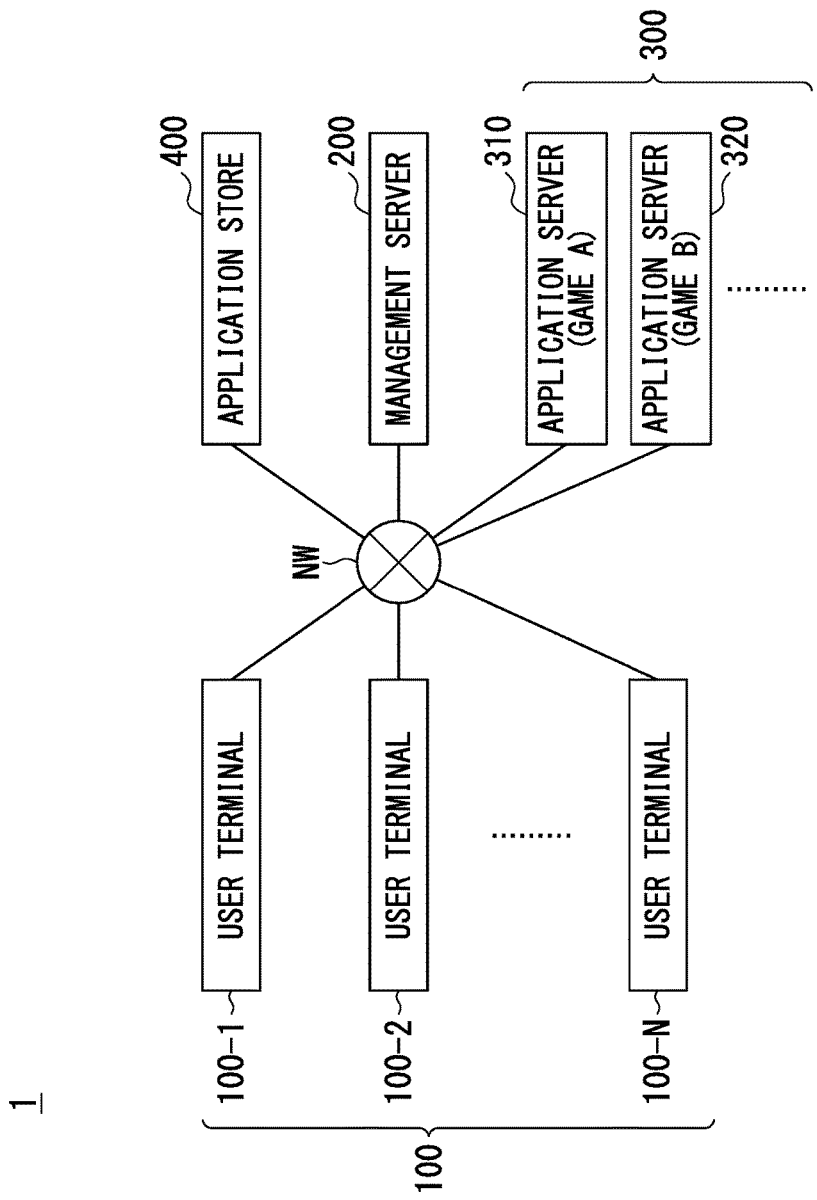
FIG. 1 is a drawing showing an example of the constitution of a network system according to a first embodiment.

In one aspect of the present invention, a management device includes: a controller configured to control an invitation processing for introducing a first application from a first terminal of a first user to a second terminal of a second user. The first application and a second application have been executed in the first terminal. The first and second users are inter-related with respect to the second application. The controller further includes: an invitation request receiver configured to receive, from the first terminal of the first user, an invitation request information for inviting the second user to the first application; and an invitation notifier configured to transmit, to the second terminal of the second user, an invitation notification information that is based on the invitation request information for inviting the second user that has been received by the invitation request receiver.

In some cases, the invitation request receiver is configured to acquire the invitation request information associated with a second user corresponding information that corresponds to the second user in the second application. The controller further includes: an invitation request manager configured to manage, as an invitation request record, the invitation request information and the second user corresponding information, which are associated with each other.

In some cases, the invitation request receiver is configured to acquire the invitation request information in association with a first user corresponding information that corresponds to the first user in the first application and in association with the second user corresponding information that corresponds to the second user in the second application. The invitation request manager is configured to manage, as an invitation request record, the invitation request information, the first user corresponding information, and the second user corresponding information which are associated among each other.

In some cases, the first user corresponding information in the first application associated with the invitation request information is acquired by the second application on the first terminal of the first user, directly from the first application on the first terminal of the first user, or indirectly via a memory in the first terminal of the first user.

The management device may, in some cases, further includes: a request inquirer configured to inquire whether the invitation request information for the second user is present or not, based on a request inquiry from the second terminal of the second user, wherein the invitation notifier is configured to transmit, to the second terminal of the second user, the invitation notification information that is based on the invitation request information in a case that the invitation notifier determines that the invitation request information for the second user is present, upon the inquiry by the request inquirer.

In some cases, the invitation request receiver is configured to acquire the invitation request information associated with a second user corresponding information that corresponds to the second user in the second application. The controller further includes: an invitation request manager configured to manage, as an invitation request record, the invitation request information and the second user corresponding information, which are associated with each other. The request inquirer is configured to inquire whether the invitation request record corresponding to the second user corresponding information in the second application that is associated with the request inquiry from the second terminal of the second user.

The management device may, in some cases, further includes: an invitation establishment receiver configured to receive an invitation establishment information indicating that an invitation was established, which corresponds to the invitation notification information, wherein upon a launch of the first application in the second terminal of the second user, the invitation establishment information was transmitted from the second terminal of the second user or a server that is adaptable to the first application, and an invitation establishment processor configured to perform a processing based on the invitation establishment information received by the invitation establishment receiver.

In some cases, based on the invitation establishment information received by the invitation establishment receiver, the invitation establishment processor is configured to transmit an invitation completion notification information notifying that an invitation, which corresponds to the invitation notification information, to the first terminal of the first user or to a server that is adaptable to the first application.

In some cases, based on the invitation establishment information received by the invitation establishment receiver, to grant a reward to the first user in the first application, the invitation establishment processor is configured to transmit the first user corresponding information in the first application as the invitation completion notification information to the first terminal of the first user or to a server that is adaptable to the first application.

In some cases, the invitation establishment information is associated with a part or all of the invitation notification information. The part or all of the invitation notification information is acquired by the first application on the second terminal of the first user, directly from the second application on the second terminal of the second user, or indirectly via a memory in the second terminal of the second user.

The management device may, in some cases, further includes: an application manager configured to manage a set of application information related to each of a plurality of applications which includes the first application and the second application; and an application information notifier configured to transmit at least a part of the set of application information managed by the application manager to the first terminal of the first user.

In some cases, the application manager is configured to manage each application information of each of the plurality of applications which includes the first application and the second application. The application information notifier is configured to: refer each application information managed in the application manager; determine whether or not a request for invitation to the first application is allowed for each of the plurality of applications; and transmit, to the first terminal of the first user, a set of application indication information indicating one or more applications to which the request for invitation is allowed.

In some cases, the application manager is configured to manage an invitation prohibition information including a combination of an invitation-accepting-prohibited-application with an inviting-prohibited-application. The invitation-accepting-prohibited-application is an application on which prohibition for an invitation to the inviting-prohibited-application is set to prohibit the invitation-accepting-prohibited-application from inviting the inviting-prohibited-application. The inviting-prohibited-application is an application on which prohibition for accepting an invitation from the invitation-accepting-prohibited-application is set to prohibit the inviting-prohibited-application from accepting an invitation from the invitation-accepting-prohibited-application. The application information notifier is configured to: refer the invitation prohibition information managed by the application manager; and transmit, to the first terminal of the first user, a set of application indication information indicating other applications than the invitation-accepting-prohibited-application indicated by the invitation prohibition information which sets the first application into the inviting-prohibited-application.

In some cases, the application manager is configured to manage an invitation prohibition information including a combination of an invitation-accepting-prohibited-application with an inviting-prohibited-application. The invitation-accepting-prohibited-application is an application on which prohibition for an invitation to the inviting-prohibited-application is set to prohibit the invitation-accepting-prohibited-application from inviting the inviting-prohibited-application. The inviting-prohibited-application is an application on which prohibition for accepting an invitation from the invitation-accepting-prohibited-application is set to prohibit the inviting-prohibited-application from accepting an invitation from the invitation-accepting-prohibited-application. The application information notifier is configured to: refer the invitation prohibition information managed by the application manager; and transmit, to the first terminal of the first user, a set of application indication information indicating other applications than the inviting-prohibited-application indicated by the invitation prohibition information which sets the first application into the invitation-accepting-prohibited-application.

The management device may, in some cases, further includes: a transceiver configured to perform at least one of an indirect communication and a direct communication, with respect to at least one of the invitation request information and the invitation notification information, wherein the indirect communication communicates indirectly via a server adaptable to the first application or the second application to any one of the first terminal of the first user and the second terminal of the second user, and wherein the direct communication communicates directly to any one of the first terminal of the first user and the second terminal of the second user.

In some cases, the transceiver is configured to: establish a communication session via a server adaptable to any one of the first application and the second application; and communicate directly any one of the first terminal of the first user and the second terminal of the second user, after the communication session has been established.

In another aspect of the present invention, a management device includes: a controller configured to control an invitation processing for introducing a first application from a first terminal of a first user to a second terminal of a second user. The first application and a second application have been executed in the first terminal. The first and second users are inter-related with respect to the second application.

The controller further includes: an application manager, an application information notifier, an invitation request receiver, an invitation request manager, an invitation notifier, an invitation establishment receiver, and an invitation establishment processor. The application manager is configured to manage a set of application information related to each of a plurality of applications which includes the first application and the second application. The application information notifier is configured to transmit at least a part of the set of application information managed by the application manager to the first application in the first terminal of the first user. The invitation request receiver is configured to receive, from the second application launched included in applications indicated by the at least part of the set of application information transmitted by the application information notifier in the first terminal of the first user, an invitation request information for inviting the second user to the first application. The invitation request manager is configured to manage an invitation request record corresponding to the invitation request information. The request inquirer is configured to inquire whether the invitation request record for the second user in the second application is present or not, based on a request inquiry from the second application in the second terminal of the second user. The invitation notifier is configured to transmit, to the second application in the second terminal of the second user, the invitation notification information that is based on the invitation request record in a case that the invitation notifier determines that the invitation request record for the second user is present, upon the inquiry by the request inquirer. The invitation establishment receiver is configured to receive an invitation establishment information indicating that an invitation was established, which corresponds to the invitation notification information, wherein upon a launch of the first application in the second terminal of the second user, the invitation establishment information was transmitted from the second terminal of the second user or a server that is adaptable to the first application. The invitation establishment processor is configured to perform a processing based on the invitation establishment information received by the invitation establishment receiver.

The management device may, in some cases, further includes: a transceiver configured to perform at least one of an indirect communication and a direct communication, with respect to the at least a part of the set of application information managed by the application manager, the invitation request information, the invitation notification information, and the invitation establishment information, wherein the indirect communication communicates indirectly via a server adaptable to the first application or the second application to any one of the first terminal of the first user and the second terminal of the second user, and wherein the direct communication communicates directly to any one of the first terminal of the first user and the second terminal of the second user.

In some cases, the transceiver is configured to: establish a communication session via a server adaptable to any one of the first application and the second application; and communicate directly to any one of the first terminal of the first user and the second terminal of the second user, after the communication session has been established.

In still another aspect of the present invention, a management method includes: controlling an invitation processing for introducing a first application from a first terminal of a first user to a second terminal of a second user. The first application and a second application have been executed in the first terminal. The first and second users are inter-related with respect to the second application. Controlling the invitation processing further includes: receiving, from the first terminal of the first user, an invitation request information for inviting the second user to the first application; and transmitting, to the second terminal of the second user, an invitation notification information that is based on the invitation request information for inviting the second user that has been received from the first terminal of the first user.

In yet another aspect of the present invention, a management method includes: controlling an invitation processing for introducing a first application from a first terminal of a first user to a second terminal of a second user, the first application and a second application having been executed in the first terminal, the first and second users being inter-related with respect to the second application. Controller the invitation processing further includes: managing a set of application information indicating each of a plurality of applications which includes the first application and the second application; transmitting at least a part of the set of application information to the first application in the first terminal of the first user; receiving, from the second application launched included in applications indicated by the at least part of the set of application information in the first terminal of the first user, an invitation request information for inviting the second user to the first application; managing an invitation request record corresponding to the invitation request information; inquiring whether the invitation request record for the second user in the second application is present or not, based on a request inquiry from the second application in the second terminal of the second user; transmitting, to the second application in the second terminal of the second user, the invitation notification information that is based on the invitation request record in a case that the invitation request record for the second user is present, upon the inquiry; receiving an invitation establishment information indicating that an invitation was established, which corresponds to the invitation notification information, wherein upon a launch of the first application in the second terminal of the second user, the invitation establishment information was transmitted from the second terminal of the second user or a server that is adaptable to the first application; and performing a processing based on the invitation establishment information received by the invitation establishment receiver.

In a further aspect of the present invention, a non-transitory computer readable storage medium stores a computer program to be executed by a computer to perform a management method. The method includes: controlling an invitation processing for introducing a first application from a first terminal of a first user to a second terminal of a second user, the first application and a second application having been executed in the first terminal, the first and second users being inter-related with respect to the second application. Controlling the invitation processing further includes: receiving, from the first terminal of the first user, an invitation request information for inviting the second user to the first application; and transmitting, to the second terminal of the second user, an invitation notification information that is based on the invitation request information for inviting the second user that has been received from the first terminal of the first user.

In a still further aspect of the present invention, a non-transitory computer readable storage medium stores a computer program to be executed by a computer to perform a management method. The method includes: controlling an invitation processing for introducing a first application from a first terminal of a first user to a second terminal of a second user, the first application and a second application having been executed in the first terminal, the first and second users being inter-related with respect to the second application. Controlling the invitation processing further includes: managing a set of application information indicating each of a plurality of applications which includes the first application and the second application; transmitting at least a part of the set of application information to the first application in the first terminal of the first user; receiving, from the second application launched included in applications indicated by the at least part of the set of application information in the first terminal of the first user, an invitation request information for inviting the second user to the first application; managing an invitation request record corresponding to the invitation request information; inquiring whether the invitation request record for the second user in the second application is present or not, based on a request inquiry from the second application in the second terminal of the second user; transmitting, to the second application in the second terminal of the second user, the invitation notification information that is based on the invitation request record in a case that the invitation request record for the second user is present, upon the inquiry; receiving an invitation establishment information indicating that an invitation was established, which corresponds to the invitation notification information, wherein upon a launch of the first application in the second terminal of the second user, the invitation establishment information was transmitted from the second terminal of the second user or a server that is adaptable to the first application; and performing a processing based on the invitation establishment information received by the invitation establishment receiver.

In yet a further aspect of the present invention, a management device includes: a controller configured to control an invitation processing for introducing a first application from a first terminal of a first user to a second terminal of a second user, the first application and a second application having been executed in the first terminal.

The controller further includes: an extractor configured to receive, from the second application, a set of inter-related user information indicating related users who are inter-related with respect to the second application, the extractor being configured to extract, based on an extraction condition, one or more invitation candidates to the first application from the related users indicated by the set of inter-related user information; an invitation candidate user notifier configured to transmit, to the first terminal of the first user, an invitation candidate information that indicates one or more invitation candidates to the first application extracted by the extractor; an invitation request receiver configured to receive, from the first terminal of the first user, an invitation request information for inviting, to the first application, a second user among the one or more invitation candidates indicated by the invitation candidate information; and an invitation notifier configured to transmit, to the second terminal of the second user, an invitation notification information based on the invitation request information.

In some cases, the extractor is configured to remove, from an extraction target in the extraction condition, a user which has requested an invitation from the second application with respect to the first application.

In some cases, the extractor is configured to remove, from an extraction target in the extraction condition, a user which has accepted an established request for invitation from the second application to the first application.

In some cases, the extractor is configured to remove, from an extraction target in the extraction condition, a user to which a request for invitation from the second application to the first application has been transmitted, and the request for invitation has been unestablished.

In some cases, the extractor is configured to remove, from an extraction target in the extraction condition, a user which has rejected a request for invitation from the second application to the first application.

The management device may, in some cases, further includes: an application manager configured to manage a set of application information related to each of a plurality of applications which includes the first application and the second application; and wherein the application manager is configured to manage the set of application information which includes a first application re-invitation information indicating whether or not to grant a re-invitation for user to the first application, and wherein the extractor is configured to refer to the application manager to confirm the extraction condition, and wherein the extractor is configured to include, into the extraction target, a user which has rejected a request for invitation to the first application in a case that the re-invitation to the first application is granted in accordance with the first application re-invitation information.

In some cases, the extractor is configured to include, into the extraction target in the extraction condition, a user which has rejected a request, from another user different from the first user, for invitation from the second application to the first application in a case that the re-invitation to the first application is from the first user.

In some cases, the extractor is configured to remove, from an extraction target in the extraction condition, a user for which a rejection to an invitation request from the first user has been set.

The management device may, in some cases, further includes: an application manager configured to manage a set of application information related to each of a plurality of applications which includes the first application and the second application, wherein the application manager is configured to manage a first prohibition information including a combination of an invitation-accepting-prohibited user with an inviting-prohibited user, the invitation-accepting-prohibited user is a user which sets prohibited from accepting an invitation request, and the inviting-prohibited user is a user which sets prohibited from inviting the invitation-accepting-prohibited user, and wherein the extractor is configured to remove, from an extraction target in the extraction condition, the invitation-accepting-prohibited user as an invitation-rejecting user, in a case that the first user is set to be the invitation-accepting-prohibited user in accordance with the first prohibition information.

In some cases, the extractor is configured to remove, from an extraction target in the extraction condition, a user which has set to reject a request for invitation to the first application.

The management device may, in some cases, further includes: an application manager configured to manage a set of application information related to each of a plurality of applications which includes the first application and the second application, wherein the application manager is configured to manage a second prohibition information including a combination of an invitation-accepting-prohibited user with an inviting-prohibited application, the invitation-accepting-prohibited user is a user which sets prohibited from accepting an invitation request, and the inviting-prohibited application is an application which sets prohibited from inviting the invitation-accepting-prohibited user, and wherein the extractor is configured to remove, from an extraction target in the extraction condition, the invitation-accepting-prohibited user as an invitation-rejecting user, in a case that the first application is set to be the inviting-prohibited application in accordance with the second prohibition information.

The management device may, in some cases, further includes: an invitation establishment receiver configured to receive an invitation establishment information indicating that an invitation to the first application from the second application was established, which corresponds to the invitation notification information, from the second terminal of the second user or a server adaptable to the first application.

In moreover aspect of the present invention, a management method includes: controlling an invitation processing for introducing a first application from a first terminal of a first user to a second terminal of a second user, the first application and a second application having been executed in the first terminal.

Controlling the invitation processing further includes: receiving, from the second application, a set of inter-related user information indicating related users who are inter-related with respect to the second application; extracting, based on an extraction condition, one or more invitation candidates to the first application from the related users indicated by the set of inter-related user information; transmitting, to the first terminal of the first user, an invitation candidate information that indicates one or more invitation candidates to the first application extracted; receiving, from the first terminal of the first user, an invitation request information for inviting, to the first application, a second user among the one or more invitation candidates indicated by the invitation candidate information; and transmitting, to the second terminal of the second user, an invitation notification information based on the invitation request information.

In furthermore aspect of the present invention, a non-transitory computer readable storage medium stores a computer program to be executed by a computer to perform a management method. The method includes: controlling an invitation processing for introducing a first application from a first terminal of a first user to a second terminal of a second user, the first application and a second application having been executed in the first terminal. Controlling the invitation processing further includes: receiving, from the second application, a set of inter-related user information indicating related users who are inter-related with respect to the second application; extracting, based on an extraction condition, one or more invitation candidates to the first application from the related users indicated by the set of inter-related user information; transmitting, to the first terminal of the first user, an invitation candidate information that indicates one or more invitation candidates to the first application extracted; receiving, from the first terminal of the first user, an invitation request information for inviting, to the first application, a second user among the one or more invitation candidates indicated by the invitation candidate information; and transmitting, to the second terminal of the second user, an invitation notification information based on the invitation request information.

In an additional aspect of the present invention, a terminal device includes: a first display controller, a launcher, n invitation candidate information acquisitor, an invitation request notifier, an invitation notification acquisitor, a second display controller, and a screen transitioner.

The first display controller is configured to display, on a display, a set of information indicating one or more applications, based on a first operation by a first application installed in the terminal device. The launcher is configured to launch a second application in a specific mode, the second application having been selected, based on a second operation, from the set of information indicating the one or more applications, the set of information being displayed on the display by the first display controller. The invitation candidate information acquisitor is configured to acquire, from a management device, an invitation candidate information that indicates one or more invitation candidates to the first application in the second application which is placed in operation in the specific mode. The invitation request notifier is configured to transmit, to the management device, an invitation request information that is associated with an invitational user's information of an invitational user which is to be invited to the first application, the invitational user's information being included in the invitation candidate information acquired by the invitation candidate information acquisitor. The invitation notification acquisitor is configured to acquire, from the management device, an invitation notification information which is based on the invitation request information in a case that the invitation request information exists in the management device, the invitation request information indicates that an information of an owner user which owns the terminal device is to be the invitational user's information, in the second application which is operating in a normal mode. The second display controller is configured to display, on the display, a set of invitation information, based on the invitation notification information acquired by the invitation notification acquisitor. The screen transitioner is configured to perform a screen transition to a screen for installation of the first application indicated by the set of invitation information, based on a third operation to the set of invitation information displayed by the second display controller.

The terminal device may, in some cases, further includes: a memory; an invitation information manager configured to store, in the memory, at least a part of an associated information which is associated with the invitation notification information which corresponds to the invitation information to which the third operation is done, the invitation information being included in the set of invitation information displayed by the second display controller; and an invitation establishment notifier configured to transmit, to the management device, an invitation establishment information which corresponds to the invitation notification information, provided that the at least part of the associated information which is associated with the invitation notification information which corresponds to the first application is stored in the memory, in a case that a predefined condition regarding the first application is satisfied.

The terminal device may, in some cases, further includes: an inquirer configured to inquire, to the management device, whether or not there exists in the management device the invitation request information indicating that the information of the owner user which owns the terminal device is to be the invitational user's information, in the second application which is operating in the normal mode, wherein the invitation notification acquisitor is configured to acquire, from the management device, the invitation notification information that is based on the invitation request information, in a case that there exists in the management device the invitation request information indicating that the information of the owner user which owns the terminal device is to be the invitational user's information.

The terminal device may, in some cases, further includes: an application information acquisitor configured to acquire, from the management device, the set of information indicating the one or more applications, based on the first operation in the first application, wherein the first display controller is configured to display an installed application information which indicates an installed application which is installed in the terminal device, the installed application is included in the one or more applications indicated by the set of information acquired by the application information acquisitor.

In some cases, the first display controller is configured to detect the installed application which is installed in the terminal device from the one or more applications indicated by the set of information acquired by the application information acquisitor, the first display controller is configured to display a detected application information which indicates the detected application.

In some cases, the invitation candidate information acquisitor is configured to notify, to the management device, a related-user's information having a relationship with the owner user who owns the terminal device in the second application which is operating in the specific mode. The invitation candidate information acquisitor is configured to acquire, from the management device, an extracted user's information which indicates a user extracted under an extraction condition from the related-user's information notified to the management device. The invitation candidate information acquisitor is configured to define the extracted user's information to be the invitation candidate information.

In some cases, the invitation request notifier is configured to transmit, to the management device, the invitation request information that is associated with the invitational user's information and with an owner user's information in the first application.

In some cases, the invitation request notifier is configured to transmit, to the management device, the invitation request information that is associated further with a first application information which indicates the first application.

The terminal device may, in some cases, further includes: a specific mode terminater which ends the second application which was launched in the specific mode, after the invitation request notifier has transmitted the invitation request information to the management device.

The terminal device may, in some cases, further includes: a transceiver configured to perform at least one of an indirect communication and a direct communication, with respect to at least one of the invitation candidate information, the invitation request information and the invitation notification information, wherein the indirect communication communicates indirectly via a server adaptable to the first application or the second application to the management device, and wherein the direct communication communicates directly to the management device.

In some cases, the transceiver is configured to: establish a communication session via the server adaptable to the first application; and communicate directly to the management device, after the communication session has been established.

In some cases, the invitation candidate information acquisitor, the invitation request notifier, the invitation notification acquisitor, the second display controller, and the screen transitioner are implemented by execution by a computer of programs which are incorporated in application programs installed in the management device.

The terminal device may, in some cases, further includes: a memory that stores application programs which incorporate programs therein respectively; and a processor configured to execute the programs to implement the first display controller, the launcher, the invitation candidate information acquisitor, the invitation request notifier, the invitation notification acquisitor, the second display controller, and the screen transitioner.

In a further additional aspect of the present invention, a control method for controlling a terminal device includes: displaying, on a display, a set of information indicating one or more applications, based on a first operation by a first application installed in the terminal device; launching a second application in a specific mode, the second application having been selected, based on a second operation, from the set of information indicating the one or more applications, the set of information being displayed on the display; acquiring, from a management device, an invitation candidate information that indicates one or more invitation candidates to the first application in the second application which is placed in operation in the specific mode; transmitting, to the management device, an invitation request information that is associated with an invitational user's information of an invitational user which is to be invited to the first application, the invitational user's information being included in the invitation candidate information acquired; acquiring, from the management device, an invitation notification information which is based on the invitation request information in a case that the invitation request information exists in the management device, the invitation request information indicates that an information of an owner user which owns the terminal device is to be the invitational user's information, in the second application which is operating in a normal mode; displaying, on the display, a set of invitation information, based on the invitation notification information acquired; and performing a screen transition to a screen for installation of the first application indicated by the set of invitation information, based on a third operation to the set of invitation information displayed.

In a still additional aspect of the present invention, a non-transitory computer readable storage medium stores a computer program to be executed by a computer to perform a control method for controlling a terminal device. The control method includes: displaying, on a display, a set of information indicating one or more applications, based on a first operation by a first application installed in the terminal device; launching a second application in a specific mode, the second application having been selected, based on a second operation, from the set of information indicating the one or more applications, the set of information being displayed on the display; acquiring, from a management device, an invitation candidate information that indicates one or more invitation candidates to the first application in the second application which is placed in operation in the specific mode; transmitting, to the management device, an invitation request information that is associated with an invitational user's information of an invitational user which is to be invited to the first application, the invitational user's information being included in the invitation candidate information acquired; acquiring, from the management device, an invitation notification information which is based on the invitation request information in a case that the invitation request information exists in the management device, the invitation request information indicates that an information of an owner user which owns the terminal device is to be the invitational user's information, in the second application which is operating in a normal mode; displaying, on the display, a set of invitation information, based on the invitation notification information acquired; and performing a screen transition to a screen for installation of the first application indicated by the set of invitation information, based on a third operation to the set of invitation information displayed.

In yet an additional aspect of the present invention, a non-transitory computer readable storage medium stores a computer program which is to be incorporated into an application program which is to be installed in a terminal device, the computer program being executable by a computer to perform a control method for controlling the terminal device. The control method includes: displaying, on a display, a set of information indicating one or more applications, based on a first operation by a first application installed in the terminal device; launching a second application in a specific mode, the second application having been selected, based on a second operation, from the set of information indicating the one or more applications, the set of information being displayed on the display; acquiring, from a management device, an invitation candidate information that indicates one or more invitation candidates to the first application in the second application which is placed in operation in the specific mode; transmitting, to the management device, an invitation request information that is associated with an invitational user's information of an invitational user which is to be invited to the first application, the invitational user's information being included in the invitation candidate information acquired; acquiring, from the management device, an invitation notification information which is based on the invitation request information in a case that the invitation request information exists in the management device, the invitation request information indicates that an information of an owner user which owns the terminal device is to be the invitational user's information, in the second application which is operating in a normal mode; displaying, on the display, a set of invitation information, based on the invitation notification information acquired; and performing a screen transition to a screen for installation of the first application indicated by the set of invitation information, based on a third operation to the set of invitation information displayed.

In another aspect of the present invention, a terminal device includes: a launcher, a user information acquisitor and an invitation request notifier. The launcher is configured to implement, in an application installed in the terminal device, a specific function of another application installed in the terminal device. The user information acquisitor is configured to acquire a set of related user information which indicates related users having a relationship with an owner user which owns the terminal device, in the other application, the specific function of which is being implemented. The invitation request notifier is configured to notify, to a management device, an invitation request information for inviting an invitational user to the other application, the specific function of which has been implemented, the invitational user being included in the related users indicated by the set of related user information acquired by the user information acquisitor.

The terminal device may, in some cases, further includes: an invitation notification acquisitor configured to acquire, from the management device, an invitation notification information which is based on the invitation request information, the invitation request information indicating the owner user which owns the terminal device as an invitational user, the invitation request information being included in a set of invitation request information that were transmitted to the management device from other terminal devices than the terminal device; and a first display controller configured to display, on a display, an invitation information which is based on the invitation notification information acquired by the invitation notification acquisitor.

The terminal device may, in some cases, further includes: an invitation establishment notifier configured to transmit, to the management device, an invitation establishment information which corresponds to the invitation notification information, provided that another application, the specific function of which was implemented, is installed in the terminal device, and the other application corresponding to the invitation information displayed by the first display controller.

In some cases, the invitation request notifier is configured to transmit, to the management device, the invitation request information which is associated with an identification of the invitational user, and wherein the invitation notification acquisitor is configured to acquire, from the management device, based on the identification of the invitational user which is associated with the invitation request information transmitted from the invitation request notifier, the invitation notification information which is based on the invitation request information, the invitation request information indicating the owner user which owns the terminal device as the invitational user who has been invited to the other application, the specific function of which has been implemented.

In some cases, the invitation request notifier is configured to transmit, to the management device, the invitation request information which is associated with an identification of the invitational user and an identification of the owner user in another application, the specific function of which is being implemented.

In some cases, the invitation request notifier is configured to transmit, to the management device, the invitation request information which is associated further with an identification of the owner user in still another application, the specific function of which has been implemented.

In some cases, the invitation request notifier is configured to transmit, to the management device, the invitation request information which is associated further with an identification of still another application, the specific function of which has been implemented.

In some cases, the specific function includes: transmitting an identification of the owner user in the other application, the specific function of which has been implemented, to a server which is adaptable to the other application, so as to acquire the acquire the set of related user information which indicates the related users having the relationship with the owner user.

In some cases, the specific function includes: notifying, to the management device, an identification of the other application, the specific function of which has been implemented and an identification of the owner user in the other application, the specific function of which has been implemented.

The terminal device may, in some cases, further includes: an application information acquisitor configured to acquire, from the management device, a set of information indicating one or more applications; and a first display controller configured to display, on a display, an installed application information which indicates an installed application which is installed in the terminal device, the installed application being included in the one or more applications indicated by the set of information acquired by the application information acquisitor.

The terminal device may, in some cases, further includes: a third display controller configured to display, on a display, at least a part of the set of related user information which indicates the related users having the relationship with the owner user, which has been acquired by the user information acquisitor, as an invitation candidate information that indicates one or more invitation candidates to the other application, the specific function of which has been implemented.

In some cases, the third display controller is configured to perform a display screen transition from a first display screen to a second display screen. The first display screen displays an information including the at least a part of the set of related user information which indicates the related users, the set of related user information having been acquired by the user information acquisitor. The second display screen is displayed by the other application, the specific function of which has been implemented.

In some cases, the third display controller is configured to terminate displaying, on the display, the information including the at least a part of the set of related user information which indicates the related users, after the invitation request notifier transmitted, to the management device, the invitation request information, and before the third display controller performs the display screen transition from the first display screen to the second display screen which is displayed by the other application, the specific function of which has been implemented.

In some cases, the launcher, the user information acquisitor, and the invitation request notifier are implemented by execution by a computer of programs which are incorporated in application programs installed in the management device.

The terminal device may, in some cases, further includes: a memory that stores application programs which incorporate programs therein respectively; and a processor configured to execute one program incorporated in one of the application programs installed in the terminal device and to execute other programs incorporated in others of the application programs installed in the terminal device.

In still another aspect of the present invention, a control method for a terminal device includes: implementing, in an application installed in the terminal device, a specific function of another application installed in the terminal device; acquiring a set of related user information which indicates related users having a relationship with an owner user which owns the terminal device, in the other application, the specific function of which is being implemented; and transmitting, to a management device, an invitation request information for inviting an invitational user to the other application, the specific function of which has been implemented, the invitational user being included in the related users indicated by the set of related user information.

In yet another aspect of the present invention, a non-transitory computer readable storage medium stores a computer program to be executed by a computer to perform a control method for controlling a terminal device. The control method includes: implementing, in an application installed in the terminal device, a specific function of another application installed in the terminal device; acquiring a set of related user information which indicates related users having a relationship with an owner user which owns the terminal device, in the other application, the specific function of which is being implemented; and transmitting, to a management device, an invitation request information for inviting an invitational user to the other application, the specific function of which has been implemented, the invitational user being included in the related users indicated by the set of related user information.

In a further aspect of the present invention, a non-transitory computer readable storage medium stores a computer program which is to be incorporated into an application program which is to be installed in a terminal device, the computer program being executable by a computer to perform a control method for controlling the terminal device. The control method includes: implementing, in an application installed in the terminal device, a specific function of another application installed in the terminal device; acquiring a set of related user information which indicates related users having a relationship with an owner user which owns the terminal device, in the other application, the specific function of which is being implemented; and transmitting, to a management device, an invitation request information for inviting an invitational user to the other application, the specific function of which has been implemented, the invitational user being included in the related users indicated by the set of related user information.

The present embodiments have been made with consideration to above-noted situation, and has as an object the provision of a management device, a management method, a terminal device, a control method, and a program that enable a user that is in a friend relationship with a given application to make an invitation to another application, even if there is incompatibility of user information between the applications.

The present embodiments are made with consideration given to such a situation and provides a management device, a management method, a terminal device, a control method, and a program capable of improving the convenience of inviting a user in a friend relationship with a given application to another application.

As described above, according to the present embodiments, because invitation candidates are extracted from a list of users with whom there is a friend relationship in a given application, based on prescribed extraction conditions, the convenience of inviting a user in a friend relationship in the given application to another application can be improved.

Also, according to the present embodiments, it is possible to invite a user in a friend relationship with a given application to another application, even if there is incompatibility of user information between the applications.

ILLUSTRATIVE EMBODIMENTS

Embodiments of the present invention will be described below, with references being made to the drawings.

(First Embodiment)
(Outline of Mutual Invitation System)

First, the outline of the mutual invitation system according to the present embodiment will be described. The mutual invitation system is a system in which, from a user terminal in which a first application and a second application of different types are installed, another user terminal in a prescribed relationship with the user in the second application is invited to install the first application.

For example, in social network games provided to a member of an SNS (social networking service), the user information in each of the social network games is managed in association with the user member information in the SNS. For this reason, for example, members who are in a friend relationship can mutually know what games others are playing by using this association using the member information and, if they are playing a game but a person in a friend relationship with them is not, they can invite that member to play the game via the SNS.

There are social network games that, rather than being provided to SNS members can be used even without being a member of an SNS (these being referred to herein as independent social network games). Applications such as these independent social network games are so-called native applications, which can be used, for example, by downloading them from a store site selling applications or from a dedicated site for each individual application and installing them into the user terminal.

With such native applications, however, because each application manages the user information in a unique manner, there is incompatibility of user information between applications. For this reason, there are cases in which a user who is a friend in a given application could not be invited to a different application. Given this, in the present embodiment, having as an object the provision of a mutual invitation system with a high level of convenience between applications, the constitution is one in which, even if there is incompatibility of user information between applications, it is possible to invite a user in a friend relationship in a given application to another application.

The installation of an application includes not only the new introduction of the program of an application not yet introduced into the user terminal, but also the updating of the program of an application that provides accommodation of the mutual invitation system. That is, it includes the downloading an updating program, with respect to an application installed in the user terminal, for the purpose of adaptable to the mutual invitation system.

(Network System Constitution)

FIG. 1 is a simplified drawing showing an example of the constitution of a network system 1 according to the first embodiment of the present invention, which implements a mutual invitation system. The network system 1 has the computers of a plurality of user terminals 100-N (where N is a positive integer) (user terminal 100-1, user terminal 100-2, . . . ), a management server 200, a plurality of application servers 300 (application server 310, application server 320, . . . ), and an application store 400, these computers being connected, via the network NW, to enable communication. In this case, because the plurality of user terminals 100-N have the same constitution, unless specifically indicated, the suffixes -1, -2 and the like will be omitted, and these will be referred to as the user terminal 100.

The management server 200 is a management device that manages information related to applications that are compatible with the mutual invitation system of the present embodiment, and that also communicates with the user terminal 100 so as to manage invitation information between applications and control invitation processing. Specifically, the management server 200 controls the processing of inviting, from the user terminal 100 in which the first application and the second application are installed, the user terminal 100 of another user in a prescribed relationship via the second application to install the first application.

The application server 300 handles applications that can be installed into the user terminal 100. In this case, taking the example of the application to be installed in the user terminal 100 being a game, the application server 310 handling game A and the application server 320 handling game B are shown connected to the user terminal 100 via the network NW. In the network system 1, the application servers are not restricted to the application server 310 and the application server 320, and a plurality of application servers 300 enabling games to be installed in and played from the user terminal 100 can be provided. In this case, an application to be installed in the user terminal 100 is a so-called native application, having an application program that is installed into the user terminal 100, so that the user terminal 100 performs processing (for example, game processing) related to the application, based on the installed program. The user terminal 100 transmits to the application server 300 user information corresponding to the user playing the game and acquires from the application server 300 information required during the playing of the game and a user list of users in a prescribed relationship (for example, a friend relationship) in the game.

The application store 400 is a server device that provides a store site (downloading service site) enabling downloading of applications that can be installed into the user terminal 100. By the user connecting the user's own user terminal 100 to the application store 400 via the network NW and purchasing a desired application, either for free or for a fee, the user can download and install the purchased application into the user's own user terminal 100.

The user terminal 100 is a terminal device used by the user, this being, for example, a mobile telephone, a smartphone, a tablet terminal, a personal computer, or a game machine with a communication function. In this case, the description will be for a smartphone as the user terminal 100.

Figure 2:
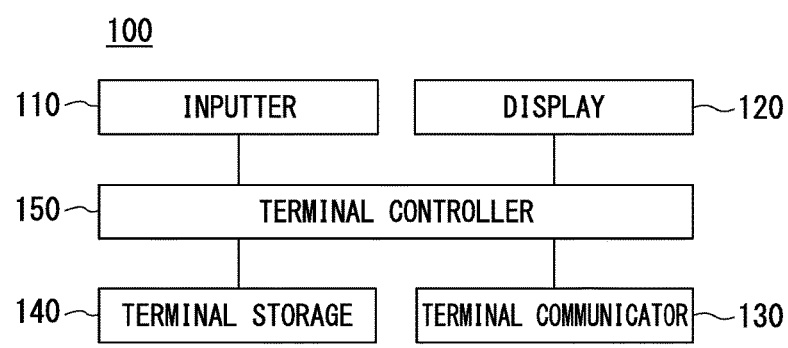
FIG. 2 is a drawing showing an example of the constitution of a user terminal according to the first embodiment.

FIG. 2 is a simplified drawing showing an example of the constitution of the user terminal 100 according to the present embodiment. As shown in this drawing, the user terminal 100 has an inputter 110, a display 120, a terminal communicator 130, terminal storage 140, and a terminal controller 150.

The inputter 110 is an input device that accepts instructions from the user in response to operations made by the user and generates input instruction information responsive to the specifics of the instruction. As the inputter 110, it is possible to use a keyboard or button, a touch panel, a mouse, or a microphone or the like.

The display 120 is a display device that displays information of images, characters, and the like and can be, for example, an LCD (liquid crystal display), an organic EL (electroluminescence) display. The inputter 110 and the display 120 can be integrated as a touch panel that accepts operation inputs from a user.

The terminal communicator 130 communicates with the management server 200 or the application server 300 via the network NW.

The terminal storage 140 is constituted by a recording medium such as a RAM (random-access memory), a ROM (read-only memory), a flash ROM, a hard disk (hard disk drive), or a combination thereof, and stores programs for controlling various parts of the user terminal 100 (for example, an OS (operating system) for causing the terminal controller 150 to perform basic operation), installed application programs, and various type of information.

The terminal controller 150 has an information processing device such as a CPU (central processor) that functions as the control center of the user terminal 100 and controls the various parts of the user terminal 100. For example, the terminal controller 150, in addition to executing processing of basic operations based on the OS stored in the terminal storage 140, executes processing based on the application program (game program). The terminal controller 150 also performs processing to execute, via the OS, functions of various applications that can run in the OS (web browsers, applications to display a store page of a store site provided by the application store 400, or the like).

The network NW is, for example a mobile telephone network, a PHS (Personal Handy-phone System) network, a VPN (virtual private network), a dedicated communication circuit network, a WAN (wide area network), a LAN (local area network), a PSTN (public switched telephone network), or a combination thereof, serving as an information communication network.

(Constitution of and Processing in the Mutual Invitation System)

Next, the constitution of and the processing performed in the mutual invitation system of the present embodiment will be described, with reference made to FIG. 3.

Figure 3:
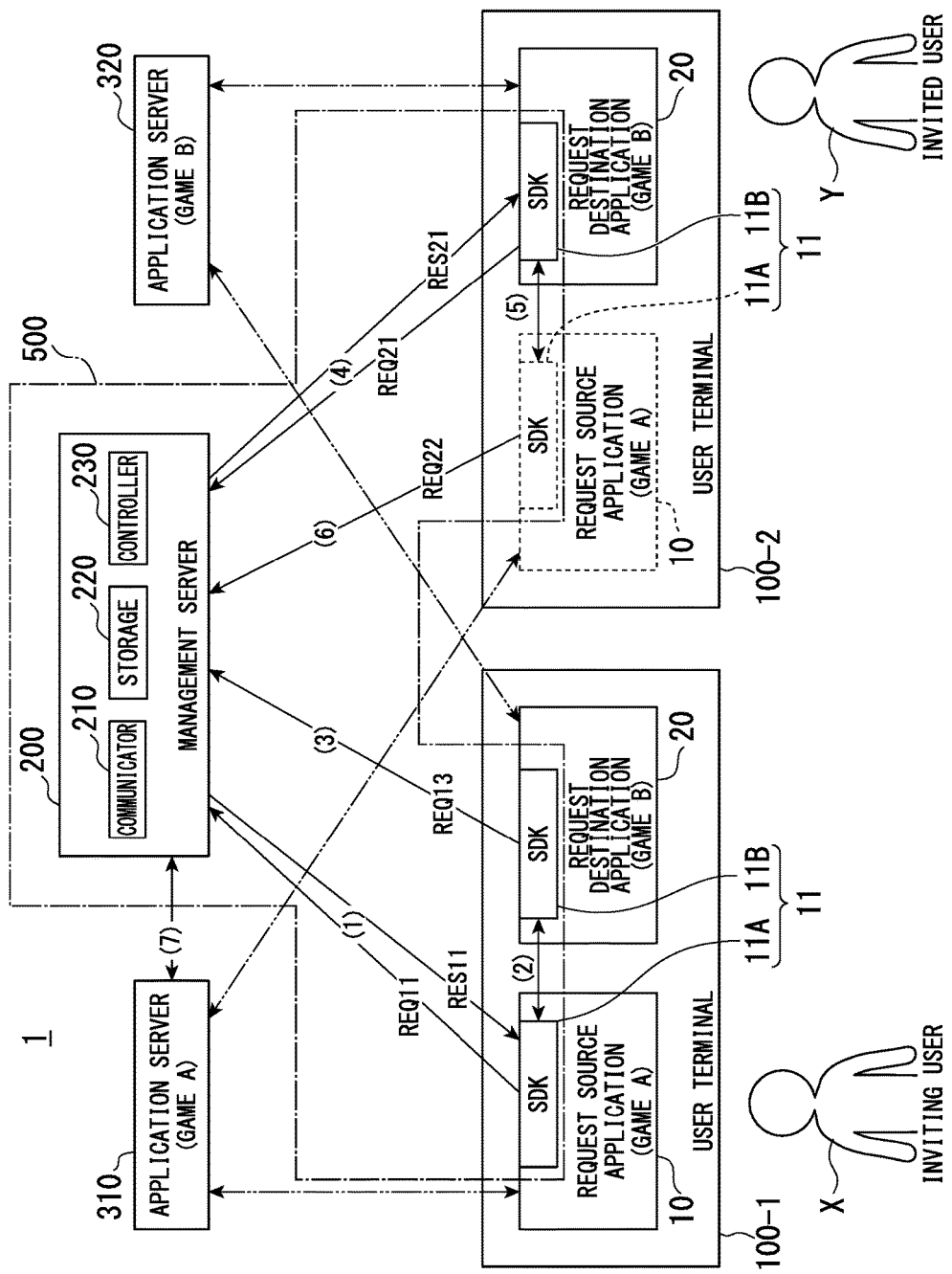
FIG. 3 is a drawing describing an example of the constitution of and processing in a mutual invitation system of the first embodiment.

FIG. 3 is a drawing describing an example of the constitution of and the processing performed in the mutual invitation system of the network system 1 of the present embodiment. In this drawing, constituent elements that correspond to the various parts of FIG. 1 are assigned the same reference symbols. In this case, the user terminal 100 of the user X is taken to be the user terminal 100-1 and the user terminal 100 of the user Y is taken to be the user terminal 100-2. Also, the game A and the game B that can be installed into the user terminal 100 are applications that accommodate the mutual invitation system, the game A and the game B are installed into the user terminal 100-1, and the game B is installed into the user terminal 100-2 (that is, the game A is not installed therein). The user X and the user Y are taken to be in a friend relationship in the game B.

This drawing describes the invitation processing that, from the game A of the user terminal 100-1 of the user X (inviting user), invites the user terminal 100-2 of the user Y (invited user) in a friend relationship via the game B to install the game A. That is, this is the processing whereby the user X (inviting user) requests invitation of the user Y (invited user), who is in a friend relationship in the game B, which is the invitation request destination application (hereinafter "request destination application"), to the game A, which is the invitation request source application (hereinafter "request source application"), which is being played by the user X. Also, although the request source application 10 (game A) and the request destination application 20 (game B) are not, respectively, the request source application and the request destination application before the invitation processing, the description will refer to them as the request source application 10 and the request destination application 20 as a convenience.

Additionally, although the description will be for the case in which the game A is the request source application 10 and the game B is the request destination application 20, it could be that the game B is the request source application 10 and the game A is the request destination application 20. In the mutual invitation system, "mutual invitation" means that users in a prescribed relationship (for example, a friend relationship) in each application can mutually invite other users between applications.

In this case, the request source application 10 (game A) and the request destination application 20 (game B) are shown schematically as being installed into the user terminal 100-1. In contrast, the request destination application 20 (game B) is installed in the user terminal 100-2 and the request source application 10 (game A) is not installed therein at first, but will be installed based on an invitation request from the user X.

The request source application 10 (game A) transmits to the application server 310 (game A) user information corresponding to the user playing the game A and receives from the application server 310 (game A) information required during playing of the game A. In the same manner, the request destination application 20 (game B) transmits to the application server 320 (game B) user information corresponding to the user playing the game B and receives from the application server 320 (game B) information required during playing of the game B. Additionally, in the mutual invitation system of the present embodiment, the request destination application 20 (game B), for example, acquires from the application server 320 (game B) a user list in the request destination application 20 (game B), based on an instruction from the request source application 10 (game A).

The application server 310 (game A) and the application server 320 (game B) each manage the user information in a unique form. For this reason, there is incompatibility in the user information between the request source application 10

(game A) and the request destination application 20 (game B). In this case, the user information is, for example, identification information that uniquely identifies the users in each of the applications, this being identification information (hereinafter, "user IDs") that is managed uniquely in each individual application. The user ID may be non-visual information (internal information) that is not knowable by the user. The user ID and the user name registered by the user may be registered as user information in association with each other.

Software for invitation processing (hereinafter referred to as the SDK (software development kit) 11) is embedded into an application that accommodates the mutual invitation system of the present embodiment. The SDK 11 is constituted, for example, as a collection of APIs (application programming interfaces) for intermediating between each application adaptable to the mutual invitation system installed in the user terminal 100 and the management server 200. In this drawing, the SDK 11A is embedded into the request source application 10 (game A) and the SDK 11B is embedded into the request destination application 20 (game B). The SDK 11A and the SDK 11B each has a constitution that executes a function corresponding to the request source application 10 and the request destination application 20, respectively, and executes functions required by each of the applications. Because an application adaptable to the mutual invitation system can be either the request source application 10 or the request destination application 20, the SDK 11 having the constitutions of both the SDK 11A and the SDK 11B is embedded.

That is, if the applications are constituted to enable incorporation of the above-described SDK 11, the application can accommodate the mutual invitation system of the present embodiment. An application into which the above-described SDK 11 is embedded beforehand may be provided in downloadable form, and an SDK 11 that can be embedded into an installed application afterwards may be provided.

Among applications adaptable to the mutual invitation system, there may be applications that accommodate only the request destination application 20. In this case, the SDK 11B only may be embedded, or the SDK 11 may be embedded and the SDK 11A may not be caused to function. For example, an application for which the end of provision of service has been decided and no new user registrations will be accepted need not have the function of the request source application 10. Also, applications adaptable to the mutual invitation system may include an application that only accommodates the request source application 10. In this case, the SDK 11A only may be embedded, or the SDK 11 may be embedded and the SDK 11B may not be caused to function. In these cases, it is not "mutual invitation" but rather "one-way invitation." That is, there can be accommodation of either "mutual invitation" or "unilateral invitation," and whether "mutual invitation" or "unilateral invitation" is accommodated can be made dependent on the application.

The constituent elements of the above-described SDK 11 (SDK 11A and SDK 11B in this drawing) and the management server 200 are the main constituent elements (refer to reference symbol 500) of the mutual invitation system of the present embodiment, and the mutual invitation system 500 with this reference symbol applied will be described below. In the following description, an application adaptable to the mutual invitation system 500 will be referred to as a "system-adaptable application." The identification information that uniquely identifies an application will be referred to as the "application ID."

The management server 200 manages information related to system-adaptable applications. The management server 200 controls invitation processing by communicating with the SDK 11 embedded into the system-adaptable applications installed in the user terminal 100.

As shown in this drawing, the management server 200 has a communicator 210, a storage 220, and a controller 230. The communicator 210 communicates with the user terminal 100, the application server 310 (game A), or the application server 320 (game B) via the network NW. The storage 220 stores information related to the system-adaptable application and various information related to invitation requests. The controller 230 controls the exchange between the user terminal 100 and the application server 310 (game A) related to invitation requests and controls invitation requests.

The general flow of invitation processing in the mutual invitation system 500 will now be described. In this case, the request source application 10 (game A) and the request destination application 20 (game B) are installed in the user terminal 100-1 of the user X. In the user terminal 100-2 of the user Y, the request destination application 20 (game B) is taken as being installed (and the request source application 10 (game A) is taken as not being installed).

Also, when the system-adaptable application is installed and first executed (launched) in the user terminal 100, for example, the application ID of the system-adaptable application, and the user ID of the user in the system-adaptable application are taken as being set from the application itself into the SDK 11.

(1) Request for an Application List from a Request Source Application to a Management Server (Inviting User Terminal)

The SDK 11A of the request source application 10 (game A) installed in the user terminal 100-1 of the user X, who is the inviting user, based on a first operation (operation by the user X) in the request source application 10 (game A) running in the normal mode, transmits to the management server 200 application list request information requesting an application list of a part of or all of a plurality of system-adaptable applications. In this case, the first operation is an operation, for example, with respect to the inputter 110, for acquisition of a list of system-adaptable applications that can make a request invitation to (can select as the request destination application 20) the request source application 10 to which the invited user can be invited.

When the management server 200 acquires the application list request information from the user terminal 100-1 (SDK 11A), it transmits (RES11) to the user terminal 100-1 (SDK 11A) of the user X a list of system-adaptable applications as the request source application 10 (game A) to which the invited user can be invited. When the user terminal 100-1 (SDK 11A) acquires the application list from the management server 200, it displays from the acquired application list, on the display 120 at least a part of the system-adaptable application installed in the user terminal 100-1.

(2) Friend List Display of the Request Destination Application (User Terminal of the Inviting User)

A second operation by the user X selects from among the application list displayed on the display 120 of the user terminal 100-1 a system-adaptable application to which the user is registered and to which the user wishes to make an invitation to the request source application 10 (game A). In this case, the second operation is an operation, for example, with respect to the inputter 110, for selection of one of the plurality of system-adaptable applications included in the application list displayed on the display 120.

When one of the plurality of system-adaptable application included in the application list is selected (in this case, the request destination application 20 (game B)), the user terminal 100-1 (SDK 11A) launches the selected request destination application 20 (game B) in a specified mode.

In this case, the launching of the system-adaptable application can be done as a normal-mode launch or a specified-mode launch. The normal-mode launch is a launch for the purpose of using the system-adaptable application (for example, playing a game), and the specified-mode launch is a form of launch which calls (executes) a specific function of the functions of the system-adaptable application. For example, if the request destination application 20 (game B) is launched in the specified mode, the request destination application 20 (game B) goes into the operation mode in the specified mode that executes a specified function from among its functions. In this case, the specified function is a function that causes display on the display 120 of the user terminal 100-1 a friend list corresponding to users in a prescribed relationship (for example, a friend relationship) with the inviting user (user X) in the request destination application 20 (game B).

Examples of the operating states of an adaptable to application include the non-operating state (not running), the running state (active) in which some processing is being executed, the background state (background) in which some processing is being executed but not displayed on the screen, and the suspended state (suspended) in which all processing is interrupted and not being executed. In this case, the launching of a system-adaptable application refers to transitioning from the not running or suspended state to the active state. The ending of a system-adaptable application refers to transitioning from the active state to the not running or suspended state.

For example, the launching of the above-described request destination application 20 (game B) in the specified mode is the transitioning of the request destination application 20 (game B) to the active state of the specified mode. When this occurs, the request source application 10 (game A) transitions from the normal operating state (active) to the not running state or the suspended state. The ending of the operation of the request destination application 20 (game B) in the specified mode is the transition of the request destination application 20 (game B) from the specified operating state (active) to the not running or the suspended state.

If a plurality of system-adaptable applications can be in the operating state simultaneously, the launching of a system-adaptable application is the transition, for example, of the system-adaptable applications being displayed on the frontmost layer of the screen to a state enabling operation by a user.

In the user terminal 100-1, the request destination application 20 (game B) launched in the specified mode can be acquired by making an inquiry to the application server 320 (game B) regarding the user list of users in a prescribed relationship (for example, friend relationship) with the user X in the request destination application 20 (game B). The SDK 11B of the request destination application 20 (game B) of the user terminal 100-1 then displays on the display 120 the friend list corresponding to the user list acquired by the request destination application 20 (game B).

(3) Invitation Request from a Request Destination Application to the Management Server (Inviting User Terminal)

When the user X, who is the inviting user, selects from amount the friend list displayed on the display 120 of the user terminal 100-1 the user Y, who is the invited user, to be invited to the request source application 10 (game A), the user terminal 100-1 (SDK 11B) transmits to the management server 200 request information that requests (REQ13) an invitation of the selected user Y to the request source application 10 (game A). When this is done, there may be a plurality of invited users. If a plurality of invited users are selected, the user terminal 100-1 (SDK 11B) transmits to the management server 200 invitation a plurality of invitation request information corresponding to each of the invited users. Upon receiving the invitation request information transmitted from the user terminal 100-1 (SDK 11B), the management server 200 stores a record of the received invitation request information into the storage 220 and manages the information.

(4) Request Inquiry from the Request Destination Application to the Management Server (Invited User Terminal)

At a prescribed timing, the SDK 11B of the request destination application 20 (game B) installed in the user terminal 100-2 of the user Y, who is the invited user, inquiries (REQ21) whether or not there is invitation request information that has the user Y as the invited user among the invitation request information managed by the management server 200. If invitation request information having the user Y as the invited user is being managed by the management server 200, the management server 200, in response to the above-noted inquiry from the user terminal 100-2 (SDK 11B,) transmits to the user terminal 100-2 (SDK 11B) invitation notification information, based on the invitation request information (RES21). The user terminal 100-2 (SDK 11B) acquires the invitation notification information transmitted from the management server 200.

If the user terminal 100-2 (SDK 11B) acquired invitation notification information from the management server 200, it displays on the startup screen or in a prescribed screen of the request destination application 20 (game B) displayed by the display 120 an invitation notification indicating that invitation notification information was acquired. This notifies the user Y via the request destination application 20 (game B) of an invitation request by the user X inviting the user Y to the request source application 10 (game A). The user terminal 100-2 (SDK 11B), based on the acquired invitation notification information, displays on the display 120 the invitation information indicating the details of the invitation request (information such as information indicating the inviting user and the request source application 10 (game A)).

(5) Installation of the Request Source Application (Invited User Terminal)

The user Y, who is the invited user, can either approve or reject the notified invitation request. If the request source application 10 (game A), the invitation request of which notification was made, is already installed in the user terminal 100-2, it may cause the user terminal 100-2 (SDK 11B) display this on the display 120.

If the user Y approves the notified invitation request, the user terminal 100-2 (SDK 11B) stores the invitation notification information corresponding to the approved invitation request into the terminal storage 140. The user terminal 100-2 also displays on the display 120 a store page enabling downloading of the request source application 10 (game A) of a store site provided by the application store 400.

The user Y downloads and installs into the user terminal 100-2 the request source application 10 (game A) from this store page. When the request source application 10 (game A) installed into the user terminal 100-2 is launched by an operation made by the user Y, the SDK 11A of the request source application 10 (game A) acquires invitation notification information that was acquired from the management server 200 by the SDK 11B of the request destination application 20 (game B) and stored into the terminal storage 140. It is possible, by the existence or non-existence of the invitation notification information, to judge whether or not the application is a system-adaptable application installed based on the above-noted invitation request.

(6) Invitation Establishment Notification from the Request Destination Application to the Management Server (Invited User Terminal)

Based on the launching by the user Y of the request source application 10 (game A) installed in the user terminal 100-2 based on the above-noted invitation request or on a pre-established achievement point being reached after the start of playing, the user terminal 100-2 (SDK 11A) transmits to the management server 200 invitation establishment information indicating that the invitation by the invitation request has been achieved (REQ 22). In this case, the above-noted achievement point is the point at which game A has progressed (been played) to some extent, the end of a tutorial, the end of a prescribed stage in the progress of the game, the earning of a prescribed point score, or some other achievement point being arbitrarily settable at the application side.

(7) Invitation Completion Notification from the Management Server to the Application Server of the Request Source Application Upon receiving invitation establishment information transmitted from the user terminal 100-2 (SDK 11A), the management server 200 transmits to the application server 310 (game A) invitation completion notification information indicating that the invitation by the invitation request has been completed (REQ23). Upon receiving the invitation completion notification information transmitted from the management server 200, the application server 310 (game A) grants a prescribed reward (for example, an incentive) to the user X in the request source application 10 (game A) for the completion (establishment) of the invitation. The prescribed reward is, for example, a virtual currency or item that can be used within the request source application 10 (game A).

By this processing flow, a request for an invitation to the request source application 10 (game A) is made via the request destination application 20 (game B). In this case, in the mutual invitation system 500 the invitation request information requesting an invitation of the invited user to the request source application 10 (game A) can be transmitted to the management server 200 via the request destination application 20 (game B) in which the inviting user and the invited user are in a prescribed relationship (for example a friend relationship). For this reason, in the mutual invitation system 500, even between applications not having compatible user information, a user in a prescribed relationship (for example, a friend relationship) in a certain application can be invited to another application.

In the mutual invitation system 500, by the management server 200 managing the recording of the above-described invitation request information (invitation request records), because management is done of invitation processing when user information differs between applications, this differs from the situation in an SNS, in which unique user information of each individual application is linked for management. In the mutual invitation system 500, therefore, logging into an SNS server using a member ID as is done in an SNS is unnecessary, and it is possible to make an invitation to an application without the user having to be aware of the existence of the management server 200. According to the present embodiment, therefore, it is possible to improve the convenience when a user invitation is made between applications.

(Example of the User Terminal 100 Display Screen in the Invitation Processing)

Next, an example of the screen displayed on the display 120 of the user terminal 100 in the invitation processing in the mutual invitation system 500 will be described.

Figure 4:
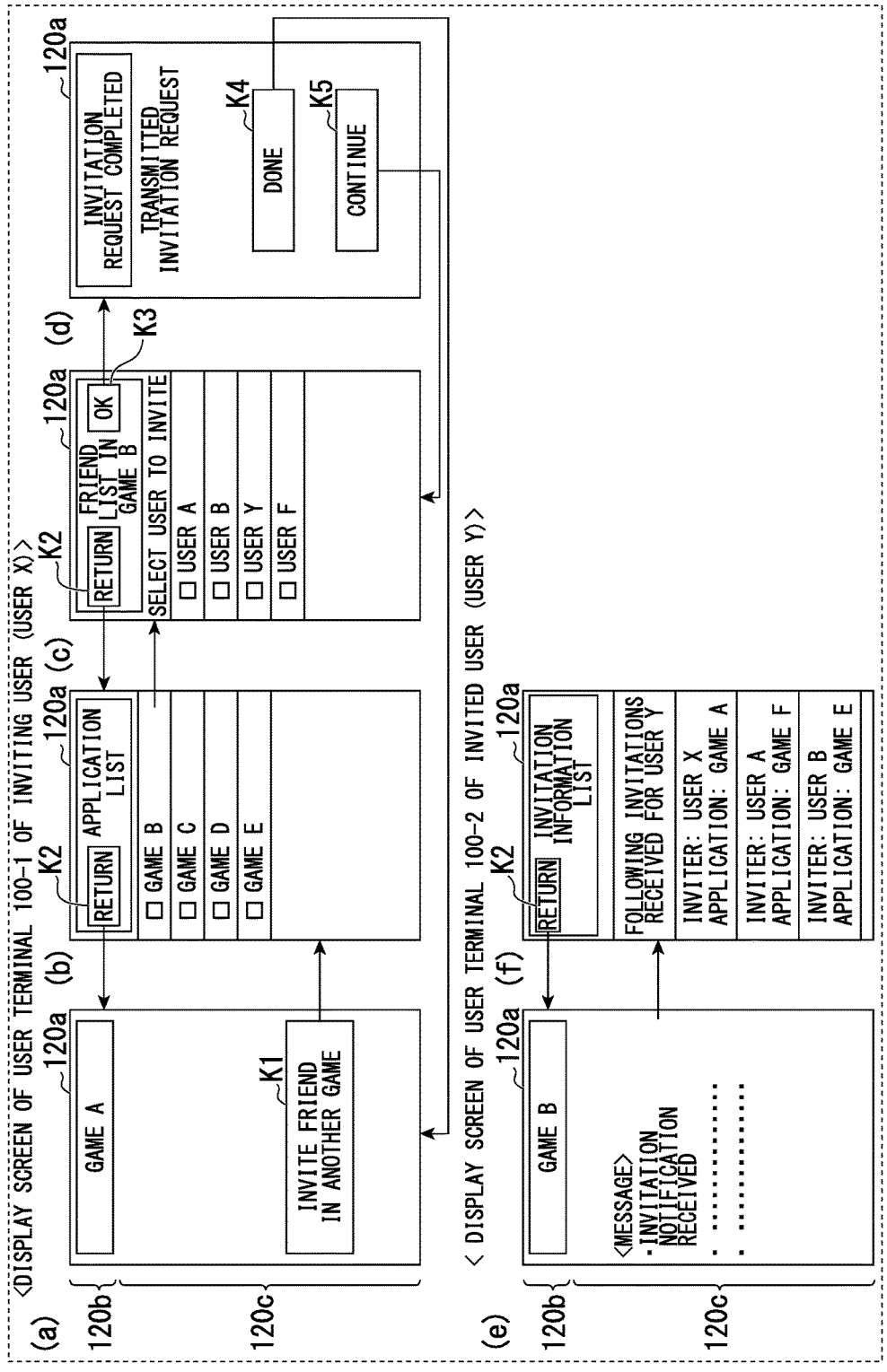
FIG. 4 is a drawing showing examples of the display screen of a user terminal in invitation processing.

FIG. 4 is a drawing showing examples of screen displayed by the user terminal 100 in the invitation processing. The screens marked with the symbols (a), (b), (c), and (d) are displayed on the display 120 of the user terminal 100-1 of the user X, who is the inviting user, in the course of performing invitation processing (the processing steps (1) to (3) in FIG. 3). The screens marked with the symbols (e) and (f) are displayed on the display 120 of the user terminal 100-2 of the user Y, who is the invited user, in the process of performing invitation processing (the processing steps (4) to (5) in FIG. 3).

In this case, the region 120a is the entire display screen region related to the invitation processing. The region 120b, in which the title and the like is displayed, and the region 120c, in which content and the like is displayed, are included within the region 120a.

First, the display screens displayed on the display 120 of the user terminal 100-1 of the user X, who is the inviting user, will be described.

The display screen shown at (a) is an example of the invitation screen in request source application 10 (game A) (the screen example display in the processing of (1) in FIG. 3). The region 120b displays the title of the request source application 10 (game A) currently running ("Game A" in this example). The region 120c displays an "Invite" button K1 for starting the processing to invite friends from another game. The Invite button K1 is displayed as an operator item for causing the transmission of application list request information from the user terminal 100-1 (SDK 11A) to the management server 200. For example, by the user X operating the Invite button K1 (first operation), the user terminal 100-1 (SDK 11A) transmits application list request information to the management server 200 (REQ11 in (1) of FIG. 3).

The display screen shown at (b) is an example of a display screen of a list of system-adaptable applications corresponding to the application list (application list screen) (an example of the display screen displayed in the processing shown in (1) of FIG. 3. Based on the above-noted operation of the Invite button K1, the user terminal 100-1 (SDK 11A) acquires the application list transmitted from the management terminal 200 (RES11 in (1) of FIG. 3), and switches the display on the display 120 from the invitation screen to an application list screen of at least a part of the system-adaptable applications installed in the user terminal 100-1 of the acquired applications. The region 120b displays "Application List" as the title of this display screen. The region 120c displays an arrangement of information indicating system-adaptable applications for which invitation is possible (that is, for which an invited user can be selected). In this case, each of the information indicating system-adaptable applications displayed in the region 120c is displayed as an operator item that can select a system-adaptable application in response to an operation by a user X (second operation). The region 120b displays the Return button K2 as an operator item to return to the immediately previous display screen.

If a system-adaptable application other than the application source application 10 (game A) is not installed in the user terminal 100-1, the user terminal 100-1 (SDK 11A)

displays on the display 120 a message to that effect, or information or the like that introduces the system-adaptable application.

The display screen shown at (c) is an example of the display screen showing a friend list (friend list screen), which is a display screen example displayed in the processing in (2) of FIG. 3. When a request destination application 20 (game B) selected by an operation by the user X (second operation) from the application list screen shown at (b) is launched in a specified mode, the user terminal 100-1 (SDK 11B) switches the display 120 from the application list screen on the display screen in the request source application 10 (game A) to a friend list screen displaying a list of friends corresponding to the user list of users in a prescribed relationship (for example, a friend relationship) with the user X in the request destination application 20 (game B). The region 120*b* displays "Game B Friend List" as the title of this display screen. The region 120*c* displays an arrangement of information indicating users who can be selected as invited users. In this case, each of the information indicating a user displayed in the region 120*c* is displayed as an operator item that can select an invited user in response to an operation from the user X. It is also possible to select a plurality of invited users in the friend list screen. For example, by switching the displayed checkboxes corresponding to information indicating a plurality of users on and off (checking and unchecking), it is possible to select one or a plurality of users as invited users. The region 120*b* displays an "OK" button K3 as an operator item that finalizes (makes the selection) of the user(s) selected in the region 120*c*. The region 120*b* displays a "Return" button K2 as an operator item that returns to the immediately previous display screen.

If there is no user having a prescribed relationship (for example, friend relationship) with the user X in the request source application 20 (game B), the user terminal 100-1 (SDK 11B) displays a message giving notice to that effect on the display 120.

The display screen shown at (d) is an example of the display screen (invitation request completed screen) displayed to indicate that the invitation request with respect to an invited user has been completed (display screen example display in the processing of FIG. 3 (3)). When the user terminal 100-1 (SDK 11B) sends to the management server 200 invitation request information requesting invitation to the request destination application 10 (game A) of a user (the user Y in this case) as the invited user selected in response to an operation by the user X from the friend list screen shown at (c) (REQ13 of (3) in FIG. 3), a switch is made from the friend list screen, and the invitation request completion screen is displayed on the display 120. The region 120*b* displays "Invitation Request Completed" as the title of this display screen. The region 120*c* displays a "Done" button K4 as an operator item that ends the invitation processing by an operation from the user X and a "Continue" button K5 as an operator item that continues the invitation processing.

If the Continue button K5 is operated, the user terminal 100-1 (SDK 11B) switches the display, for example, to the friend list screen shown at (c). If, however, the Done button K4 is operated, the user terminal 100-1 (SKD11B) ends the display of the Invitation Request Completion screen and ends the operation of the specified mode. The display screen of the display 120 then returns to the invitation screen in the request source application 10 (game A).

In this case, the above-described invitation screen shown at (a) and the application list screen shown at (b) are display screens that are displayed by the user terminal 100-1 (SKD 11A) in normal-mode operation of the request source application 10 (game A). In contrast, the friend list screen shown at (c) and the Invitation Request Completion screen shown at (d) are display screens that are displayed by the user terminal 100-1 (SKD11B) in specified-mode operation of the request destination application 20 (game B). During the time period when the request destination application 20 (game B) is in the operating state (Active) of the specified mode and either the Friend List screen shown at (c) or the Invitation Request Completion screen shown at (d) is displayed, the operating state of the request source application 10 (game A) is non-operating (Not running), or the suspended state (Suspended).

Next, the display screen displayed on the display 120 of the user terminal 100-2 of the user Y, who is the invited user, will be described. A notification of an invitation request of the user Y as an invited user in the request source application 20 (game B) is made to the user Y when the request destination application 10 (game B) is launched in the normal mode in the user terminal 100-2 of the user Y.

The display screen shown at (e) is an example of the invitation notification screen giving notice of the invitation of the user Y if the invited user is the user Y (display screen example displayed in the processing of (4) in FIG. 3). This invitation notification screen is, for example, the startup screen of the request destination application 20 (game B) (the screen displayed when the game is launched and can be started playing). The region 120*b* displays the title of the request destination application 20 (game B) currently running (in this case, "Game B"). The region 120*c* includes a display region for messages (notifications) received for the user Y, and an invitation notification message is displayed that indicates that an invitation request has been made with the user Y as the invited user. The invitation notification message is displayed as operator item that, in response to operation by the user Y, switches to an invitation information list screen that displays a list of invitation information that has reached the user Y in the request destination application 20 (game B).

The display screen shown at (f) is an example of an invitation information list screen that displays a list of invitation information (display screen example displayed in the processing at (4) in FIG. 3). The user terminal 100-2 (SDK 11B), in response to an operation by the user Y with respect to an invitation notification message displayed on the invitation notification screen shown at (e), switches from the invitation notification screen to the notification information list screen and displays it on the display 120. The region 120*b* displays "Invitation Information List" as the title of this display screen. The region 120*c* displays an arrangement of invitation information that has reached the user Y in the request destination application 20 (game B). In this case, information indicating the inviting user (for example, the user X) and information indicating the request source application 10 (for example, game A), which is the system-adaptable application to which the user Y is invited, are displayed. This invitation information, in response to an operation (third operation) from the user Y to approve the invitation, is displayed as an operator item that switches to the display screen of a store page enabling access to an application store 400 and downloading of the request source application 10 (game A). The region 120*b* displays a "Return" button K2 as an operator item that returns to the immediately previous display screen.

(User Terminal 100 (SDK 11) Functional Constitution)

Figure 5:
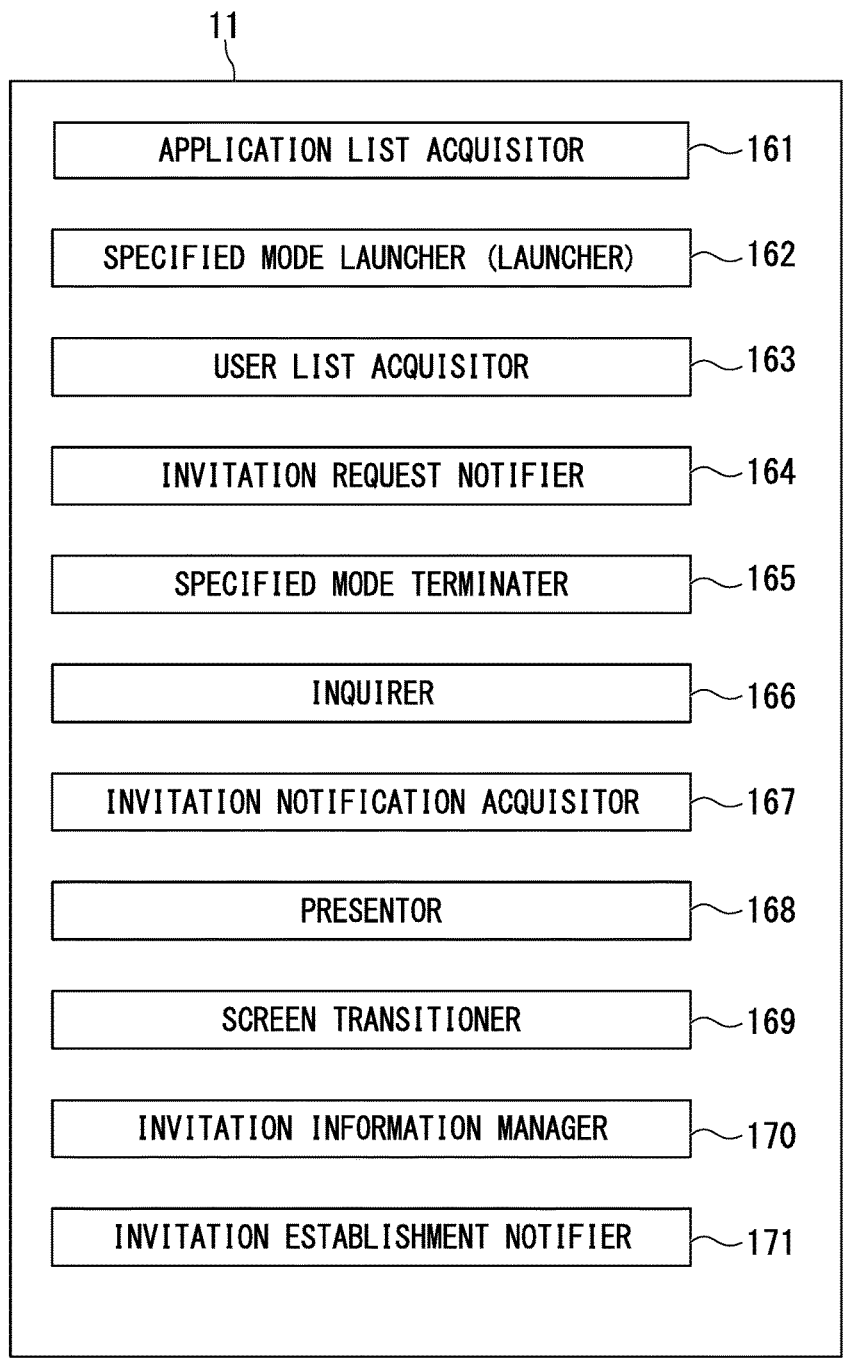
FIG. 5 is a drawing showing an example of the functional constitution that executes based on SDK of the user terminal according to the present embodiment.

Next, referring to FIG. 5, the functional constitution of the invitation processing executed by the user terminal 100

(SDK 11) in the mutual invitation system 500 will be described. FIG. 5 shows an example of the functional constitution of the invitation processing executed by the terminal controller 150 based on the user terminal SDK 11 in the user terminal 100 according to the present embodiment.

The SDK 11 has an application list acquisitor 161, a specified mode launcher 162 (launcher), a user list acquisitor 163, an invitation request notifier 164, a specified mode terminater 165, an inquirer 166, an invitation notification acquisitor 167, a presentor 168, a screen transitioner 169, an invitation information manager 170, and an invitation establishment notifier 171.

The application list acquisitor 161 acquires from the management server 200 an application list comprising a part of all of a plurality of system-adaptable applications that accommodate the mutual invitation system 500. For example, the application list acquisitor 161, based on the above-described first operation in the system-adaptable application (request source application 10) running in the normal mode, transmits to the management server 200 application list request information that requests the above-described application list. The application list acquisitor 161 then acquires an application list sent from the management server 200 that acquired the application list request information.

The specified mode launcher 162 causes the request source application 20, which is the application selected from among the system-adaptable application included in the application list to be launched. For example, the specified mode launcher 162 of the SDK 11A of the request source application 10 causes the request destination application 20 selected from system-adaptable applications included in the application list to be launched in the specified mode. In this case, as described above, the launching of the request destination application 20 in the specified mode is, for example, the transition of the request destination application 20 to the running state (Active) of the specified mode.

The specified mode launcher 162 notifies the SDK 11B of the request destination application 20 regarding the user ID of the inviting user (for example, the user X) in the request source application 10 that is operating in the normal mode. This enables notification from the SDK 11B of the request destination application 20 to the management server 200 regarding the user ID of the inviting unit (for example, the user X) in the request source application 10. Additionally, specified mode launcher 162 notifies the request destination application 20 regarding the application ID of the request source application 10 that is operating in the normal mode. This enables notification from the SDK 11B of the request destination application 20 to the management server 200 regarding the application ID of the request source application 10.

The specified mode launcher 162 also indirectly notifies the SDK 11B of the request destination application 20, either directly or indirectly via the terminal storage 140 of the user terminal 100, regarding the user ID of the inviting user (for example, the user X) in the request source application 10 or the application ID of the request source application 10.

The user list acquisitor 163 acquires a user list of users who are in a prescribed relationship (for example, friend relationship) with an inviting user (for example, the user X) being managed by the application server 300 (for example, the application server 320 (game B) handling the request destination application 20 (game B)) and that is running in the specified mode. Specifically, for example, the request destination application 20 acquires a user list from the application server 300 handling the request destination application 20 and the user list acquisitor 163 of the SDK 11B of the request destination application 20 acquires the user list acquired by the request destination application 20. That is, the user list acquisitor 163 of the SDK 11B of the request destination application 20 acquires, via the request destination application 20, a user list from the application server 300 handling the request destination application 20.

The invitation request notifier 164 transmits to the management server 200 invitation request information that indicates a request to invite the invited user (for example, the user Y) selected from the user list acquired by the user list acquisitor 163 to the request source application 10. The invitation request information includes, for example, the user ID of the inviting user (for example, the user X) in the request source application 10, the user ID of the inviting user (for example, the user X) in the request destination application 20 that has been launched in the specified mode, or the user ID in the request destination application 20 of the invited user (for example, the user Y) selected from the user list. This enables an inviting user (for example, user X) in the request source application 10 to request, as the inviting user in the request destination application 20, the invitation of the invited user (for example, the user Y) selected from the user list.

The invitation request information may further include the application ID of the request source application 10, and may further include the application ID of the request destination application 20.

In this case, the user ID of the inviting user (for example, the user X) in the request source application 10 or the application ID of the request source application 10 included in the invitation request information is acquired by the request destination application 20 in the user terminal 100 of the inviting user (for example, the user X) from the request source application 10, either directly or indirectly via the terminal storage 140 of the user terminal 100.

The specified mode terminater 165 ends the request destination application 20 that was launched in the specified mode. For example, after the invitation request notifier 164 of the SDK 11B transmits the invitation request information, the specified mode terminater 165 of the SDK 11B of the request destination application 20 that was launched in the specified mode ends the specified mode operation of the request destination application 20. In this case, as described above, the ending of the specified mode operation of the request destination application 20 is the transition of the request destination application 20 (game B) that is in the running state (Active) to the non-operating state (Not running), or the suspended state (Suspended).

The inquirer 166 inquires (request inquiry) of the management server 200 with regard to the existence or non-existence of record (invitation request record) of invitation request information (for example, invitation request information with respect to the local user) in which the invited user is that user (for example the user Y) in the request destination application 20 that is running in the normal mode. For example, the inquirer 166 makes an inquiry to the management server 200 regarding the existence or non-existence of invitation request information (an invitation request record) in which the user ID in the request destination application 20 of the invited user including in the invitation request information (invitation request record) is the user ID of the user him/herself (for example, the user Y).

If, the result of the inquiry by the inquirer 166 is that there is invitation request information (an invitation request record) in which the user ID of the user him/herself (for example, the user Y) is the user ID of the invited user in the request destination application 20, the invitation notification acquisitor 167 acquires from the management server 200 invitation notification information based on the invitation request information (invitation request record).

The presenter 168 generates and displays on the display 120 a display screen based on various information included in the acquired application list, user list and the like, so as to present various information. For example, the presenter 168 (first presenter, application list presenter) presents system-adaptable applications installed in the user terminal 100 from the application list acquired by the application list acquisitor 161 (refer to the example of the application list screen shown at (b) in FIG. 4).

In this case, a method of detecting a system-adaptable application installed in the user terminal 100 from the application list is, for example, the method of using the URL scheme. The URL scheme calls an application or a specific function within an application, and is established for each application. Thus, by using the URL scheme, it is possible to identify a system-adaptable application.

For example, when a system-adaptable application is installed into the user terminal 100 and first executed (launched), the initialization processing sets the URL scheme of the system-adaptable application into the SDK 11 of the installed system-adaptable application in the initialization processing. The application list acquisitor 161, in addition to the application list, acquires the URL schemes corresponding to each of the system-adaptable applications included in the application list. The presenter 168 then, based on the URL schemes of the installed system-adaptable applications and the URL schemes of the system-adaptable applications included in the application list, detects the system-adaptable applications that are installed in the user terminal 100 and presents the detected system-adaptable applications.

If it is possible to acquire a list of system-adaptable applications installed in the user terminal 100 as standard functions or the like of the operating system, the presenter 168 may, by using the list of pre-installed system-adaptable applications, detect system-adaptable applications installed in the user terminal 100 from among the application list.

The presenter 168 presents at least a part of the users included in the user list acquired by the user list acquisitor 163. For example, the presenter 168 displays on the display 120 a user list screen (friend list screen) of users that are in a prescribed relationship (for example, friend relationship) with the inviting user (for example, user X) in the request destination application 20 (refer to the example of the friend list screen at (c) in FIG. 4).

The presenter 168 (second presenter, invitation information presenter) presents invitation information based on the invitation notification information acquired by the invitation notification acquisitor 167. For example, the presenter 168 displays on the display 120 an invitation information list screen showing a list of invitation information wherein the invited user is the user him/herself (for example, the user Y) (refer to the example of the invitation information list screen shown at (f) in FIG. 4).

The screen transitioner 169 transitions to a screen in which a request source application 10 indicated by invitation information among the invitation information presented by the presenter 168 and approved by the invited user can be installed. For example, the screen transitioner 169, based on the above-described third operation with respect to invitation information presented by the presenter 168, transitions to a screen enabling installation of a request source application 10 indicated by the invitation information.

For example, the screen transitioner 169 launches an application (application store) that displays a store page of a store site that enables installation (downloading) of the request source application 10. The launched application store then acquires from the application store 400 and displays on the display 120 a store page enabling installation of the request source application 10.

The invitation information manager 170 stores into the terminal storage 140 of the user terminal 100 invitation notification information corresponding to invitation information for which the invitation was approved by the invited user (for example, the user Y) from among the invitation information presented by the presenter 168. The invitation information manager 170 may store into the terminal storage 140 of the user terminal 100 at least a part of the information included in the invitation notification information.

If a prescribed condition is satisfied in a system-adaptable application running in the normal mode, the invitation establishment notifier 171 transmits to the management server 200 invitation establishment information indicating that the invitation corresponding to the invitation notification information was made, with the condition that invitation notification information corresponding to the system-adaptable application currently running was stored in the terminal storage 140 of the user terminal 100. The case in which the prescribed condition is satisfied in the above-described system-adaptable application is the case, as described using FIG. 3, in which an achievement point set beforehand in the system-adaptable application has been reached. The achievement point may include the time at which the system-adaptable application is installed and is first executed (launched). That is, the first execution (launching) of the system-adaptable application in the normal mode may be taken as satisfying the prescribed condition.

In this case, the above-described invitation establishment information includes a part or all of the invitation notification information. The part or all of the invitation notification information is that which was acquired by the SDK 11A of the request source application 10 in the user terminal 100 of the invited user from the SDK 11B of the request destination application 20, either directly or indirectly via the terminal storage 140 of the user terminal 100. For example, in the user terminal 100 (for example, the user terminal 100-2) of the invited user (for example, the user Y), the invitation establishment notifier 171 of the SDK 11A of the request source application 10 acquires at least a part of the information included in the invitation notification information that was stored in the terminal storage 140 by the invitation information manager 170 of the SDK1B of the request source application 20.

Of the functional elements in the invitation processing executed by the SDK 11 shown in FIG. 5, for example, the application list acquisitor 161, the specified mode launcher 162 (launcher), the presenter 168, the invitation information manager 170, and the invitation establishment notifier 171 correspond to the functional constitution (that is, the functional constitution of the invitation source) of the SDK 11A of the request source application 10. Also, for example, the user list acquisitor 163, the invitation request notifier 164, the specified mode terminater 165, the presenter 166, the invitation notification acquisitor 167, the presenter 168, and the screen transitioner 169 correspond to the functional constitution of the SDK 11B of the request destination application 20 (that is, the functional constitution of the invitation destination).

(Management Server 200 Constitution)

Next, the constitution of the management server 200 will be described in detail, with reference made to FIG. 6.

Figure 6:
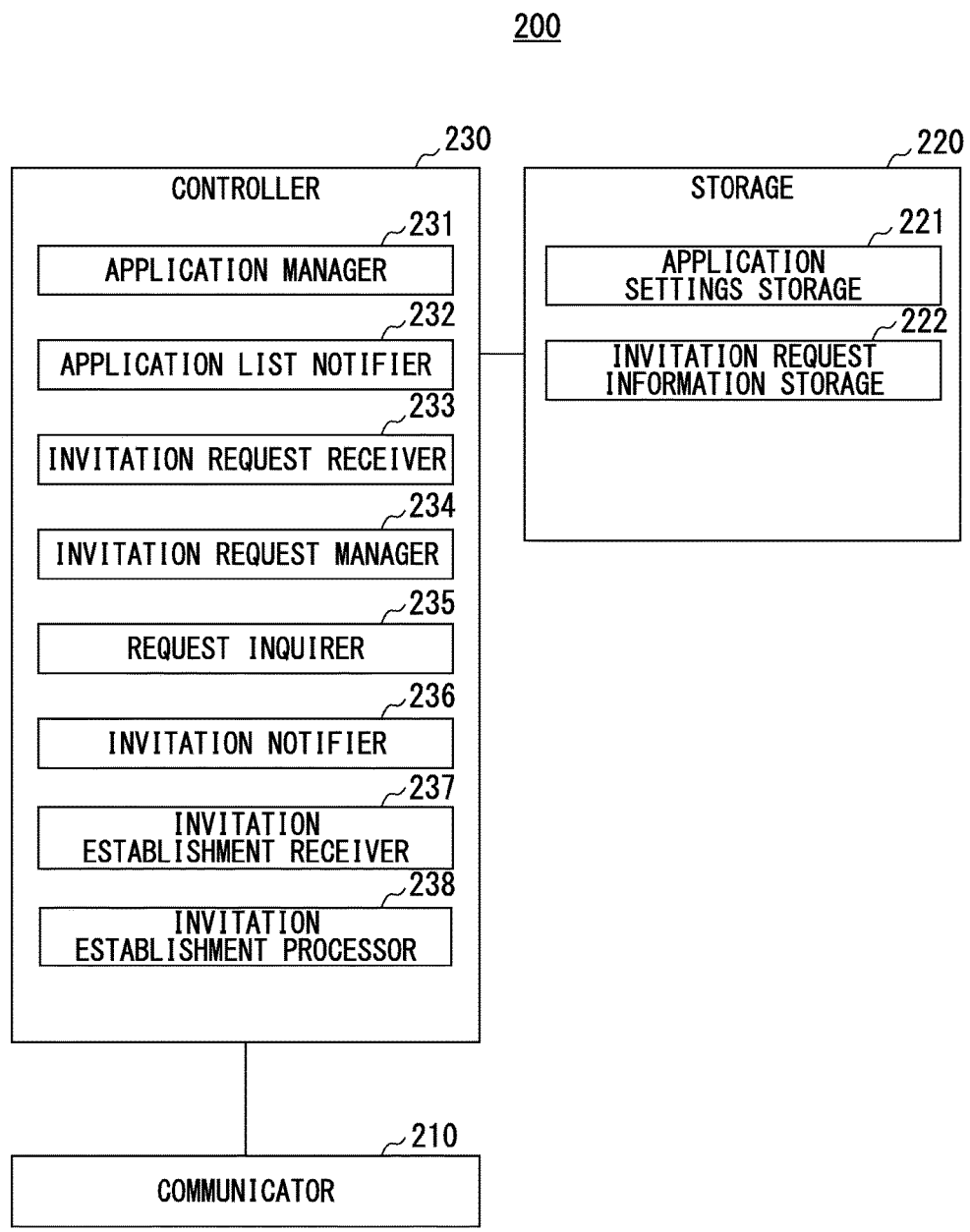
FIG. 6 is a drawing showing an example of the constitution of a management server according to the first embodiment.

FIG. 6 shows an example of the constitution of the management server 200 according to the present embodiment. The management server 200 has, as described referring FIG. 3, a communicator 210, a storage 220, and a controller 230, and, at this point, the storage 220 and the controller 230 will be described in detail.

The storage 220 stores various information managed by the controller 230. As shown in this drawing, the storage 220 has an application settings storage 221 and an invitation request information storage 222. It is sufficient that the various information is stored in a format suitable for the use of the information, such as in a database table format or JSON (JavaScript (registered trademark) object notation).

The application settings storage 221 stores information (application information) regarding a system-adaptable application that accommodates the mutual invitation system 500. FIG. 7 shows an example of application information stored in the application settings storage 221. In the application information, the application ID of the system-adaptable application (ApID), the notification destination URL (NoticeURL), the store URL (ApStoreURL), the name of the application indicating the name of the system-adaptable application (ApNAME), the application description, which is descriptive information regarding the system-adaptable application (ApDOC), an application icon image which is the image of an icon indicating the system-adaptable application (ApICO), and a re-invitation permission flag (FlagResultInvite) are associated with each other.

The notification destination (NoticeURL) is the URL (universal resource locator) of the notification destination for the invitation completion notification information, in which is set, for example, the URL of the application server 300 handling the system-adaptable application. The store URL (ApStoreURL) is the URL of the page of the sales site (application store 400) at which the system-adaptable application can be downloaded. The application URL scheme (ApURI) is set to the URL scheme established for the system-adaptable application. The re-invitation permission flag (FlagResultInvite) is set to flag information indicating whether or not re-invitation to the system-adaptable application can be made. For example, the re-invitation permission flag (FlagResultInvite) is set to the flag 0 if re-invitation is not possible and the flag 1 if re-invitation is possible.

The above-noted application information is, for example, set beforehand before it is possible to download the system-adaptable application from the application store 400 and is stored in the application settings storage 221.

The invitation request information storage 222 stores information included in the invitation request information transmitted from the user terminal 100 and acquired by the management server 200. That is, the invitation request information storage 222 stores as an invitation request record information included in invitation request information that requests an invitation of an invited user (for example, the user Y) in a prescribed relationship (for example, friend relationship) with the inviting user in the request destination application 20 by the inviting user (for example the user X) of the request source application 10 to the request source application 10.

Regarding the invitation request record, a new record corresponding the invitation request record is generated (as one invitation request information data), for example, when management server 200 acquires invitation request information transmitted from the user terminal 100, and stored into as a record of the invitation request information into the invitation request information storage 222.

The invitation request record includes information other than information included in the invitation request information acquired from the user terminal 100, and that information includes information that is updated in the course of the invitation processing.

FIG. 8 shows an example of an invitation request record stored in the invitation request record storage 222. In the invitation request record, an invitation ID (InviteID), a request source application ID (ApIDfrom), a request source application inviting user ID (Apfrom_UIDfrom), a request source application invited user ID (Apfrom_UIDto), a request destination application ID (ApIDto), a request destination application inviting user ID (Apto_UIDfrom), a request destination application invited user ID (Apto_UIDto), and an invitation request status (StatusInvite) are associated with each other.

The invitation ID (InviteID) is a management ID that is issued in the sequence in which each of the invitation request information is acquired, so that identification is possible of each invitation request information stored as an invitation request record. The request source application ID (ApIDfrom) is the application ID of the request source application 10, the request source application inviting user ID (Apfrom_UIDfrom) is the user ID of the inviting user in the request source application 10, and the request source application invited user ID (Apfrom_UIDto) is the user ID of the invited user in the request source application 10. The request destination application ID (ApIDto) is the application ID of the request destination application 20, the request destination application inviting user ID (Apto_UIDfrom) is the user ID of the inviting user in the request destination application 20, and the request destination application invited user ID (Apto_UIDto) is the user ID of the invited user in the request destination application 20.

The invitation request status (StatusInvite) is set to flag information indicating the degree of progress of the invitation processing, based on invitation request information transmitted from the user terminal 100. For example, in the status in which the invitation notification information based on the invitation request information received by the management server 200 has not been notified to the invited user, the flag is set to 0 (invitation notification not yet made) in the invitation request status (StatusInvite), and when it changes to the state in which the invited user has been notified, the flag is updated from 0 to 1 (invitation notification is made). Also, if the invitation establishment information corresponding this invitation request information is received by the management server 200 from the user terminal 100 of the invited user, the invitation request status (StatusInvite) is updated from a flag 1 to the flag 2 (invitation establishment not yet notified). Additionally, based on the invitation establishment information received by the management server 200, if the invitation establishment notification information that notifies the request source application 10 that the invitation has been made has been transmitted to the application server 300 handling the request source application 10, the invitation request status (StatusInvite) is updated from the flag 2 to the flag 3 (invitation establishment notification made). Also, if the invitation request information received by the management server 200 is rejected by the invited user, and the amount of time elapsed after the invitation request status (StatusInvite) is set to the flag 0 or the flag 1 has exceeded a pre-established time or the invitation request has been rejected, the invitation request status is updated to a flag −1 (failure) that indicates that the invitation failed.

The invitation request record may further associates a request destination application inviting user name (Apto_NAMEfrom) and a request destination application inviting user image URL (Apto_URLfrom). In this case, the request destination application inviting user name (Apto_NAMEfrom) is the user name of the inviting user in the request destination application 20, and the request destination application inviting user image URL (Apto_URLfrom) is a URL indicating the link destination of a user image of the inviting user in the request destination application 20. Although this information is not necessary for the flow of invitation processing shown from (1) to (7) in FIG. 3, by including this information in the invitation request record (invitation request information), in the request destination application 20 of the user terminal 100 of the invited user who has received the invitation request information, it is possible to display the user name or the user image of the inviting user by just the SDK 11B processing.

The controller 230 controls the invitation processing that installs the request source application 10, from the user terminal 100 of the inviting user, in which the request source application 10 and the request destination application 20 are installed in a user terminal 100 in which the request destination application 20 of an invited user in a prescribed relationship with the inviting user in the request destination application 20 is installed. As shown in FIG. 6, the controller 230 has an application manager 231, an application list notifier 232, an invitation request receiver 233, an invitation request manager 234, a request inquirer 235, an invitation notifier 236, an invitation establishment receiver 237, and an invitation establishment processor 238.

The application manager 231 manages information regarding a system-adaptable application that accommodates the mutual invitation system 500. The information regarding a system-adaptable application managed by the application manager 231 is, for example, stored in the application settings storage 221 before a system-adaptable application adaptable to the mutual invitation system 500 becomes downloadable from the application store 400.

The application list notifier 232, based on a request from the user terminal 100, references the application manager 231 and transmits an application list of system-adaptable applications to the user terminal 100. For example, the application list notifier 232 transmits to the request source application 10 of the user terminal 100 (for example, the user terminal 100-1) of an inviting user (for example, the user X) an application list of system-adaptable applications for which a request can be made to invite to the request source application 10.

The invitation request receiver 233 receives invitation request information transmitted from the user terminal 100. Specifically, the invitation request receiver 233 receives invitation request information that requests an invitation to the request source application 10 of the invited user transmitted from the request destination application 20 launched (in the specified mode) by selection from the application list in the user terminal 100 of the inviting user.

For example, the invitation request receiver 233 receives invitation request information that requests an invitation to the request source application 10 of the invited user (for example, the user Y) transmitted from the request destination application 20 launched (in the specified mode) by selection from the application list in the user terminal 100 (for example, the user terminal 100-1) of the inviting user (for example, the user X).

In this case, the invitation request information includes, for example, the user ID of the inviting user (for example, the user X) in the request source application 10, the user ID of the inviting user (for example, the user X) in the request destination application 20, and the user ID of the invited user (for example, the user Y) selected from users having a prescribed relationship (for example, friend relationship) in the request destination application 20. This invitation request information includes the request source application 10 application ID and the request destination application 20 application ID. The invitation request receiver 233 supplies the received invitation request information to the invitation request manager 234.

The invitation request information manager 234 associates the application ID and user ID included in the invitation request information received by the invitation request receiver 233 and stores these in the invitation request information storage 222 as invitation request records and manages it. For example, the invitation request information manager 234 generates a new record corresponding to the invitation request information and stores this in the invitation request information storage 222 as an invitation request record.

The request inquirer 235, based on an inquiry (request inquiry) from the request destination application 20 of the user terminal 100 of the invited user, references the invitation request information storage 222 and inquires as to whether or not there exists an invitation request record (record of invitation request information inviting the invited user) with respect to the invited user in the request destination application 20. For example, the request inquirer 235 inquires as to whether or not there is an invitation request record (invitation request information) with respect to a user ID of the invited user (for example, the user Y) in the request destination application 20 included in the inquiry (request inquiry) from the user terminal 100 (for example, the user terminal 100-2) of the invited user (for example, the user Y).

If the result of the inquiry by the request inquirer 235 is that there is an invitation request record (invitation request information) with respect to the invited user (for example, the user Y), the request notifier 236 transmits to the request destination application 20 of the user terminal 100 (for example, the user terminal 100-2) of the invited user (for example, the user Y), the invitation request record based on the invitation request record (invitation request information). The invitation notification information based on the invitation request record (invitation request information) is information that includes at least a part of the information included in the invitation request record (invitation request information).

The invitation establishment receiver 237, based on the launching of the request source application 10 (system-adaptable application to which an invitation was made) in the user terminal 100 (for example, the user terminal 100-2) of the invited user (for example, the user Y), or on reaching a pre-established achievement point, receives from the request source application 10 of the user terminal 100 (for example, the user terminal 100-2) of the invited user (for example, the user Y) invitation establishment information indicating that the invitation corresponding to the invitation request information was established.

The invitation establishment processor 238 performs prescribed processing based on the invitation establishment information received by the invitation establishment receiver 237. For example, the invitation establishment processor 238, based on the invitation establishment information received by the management server 200, transmits to the application server 300 handling the request source application 10 (for example, the application server 310

(game A) handling the request source application 10 (game A)) invitation establishment notification information that notifies that the invitation to the request source application 10 has been made.

(Detailed Operation of the Invitation Processing)

Figure 9:
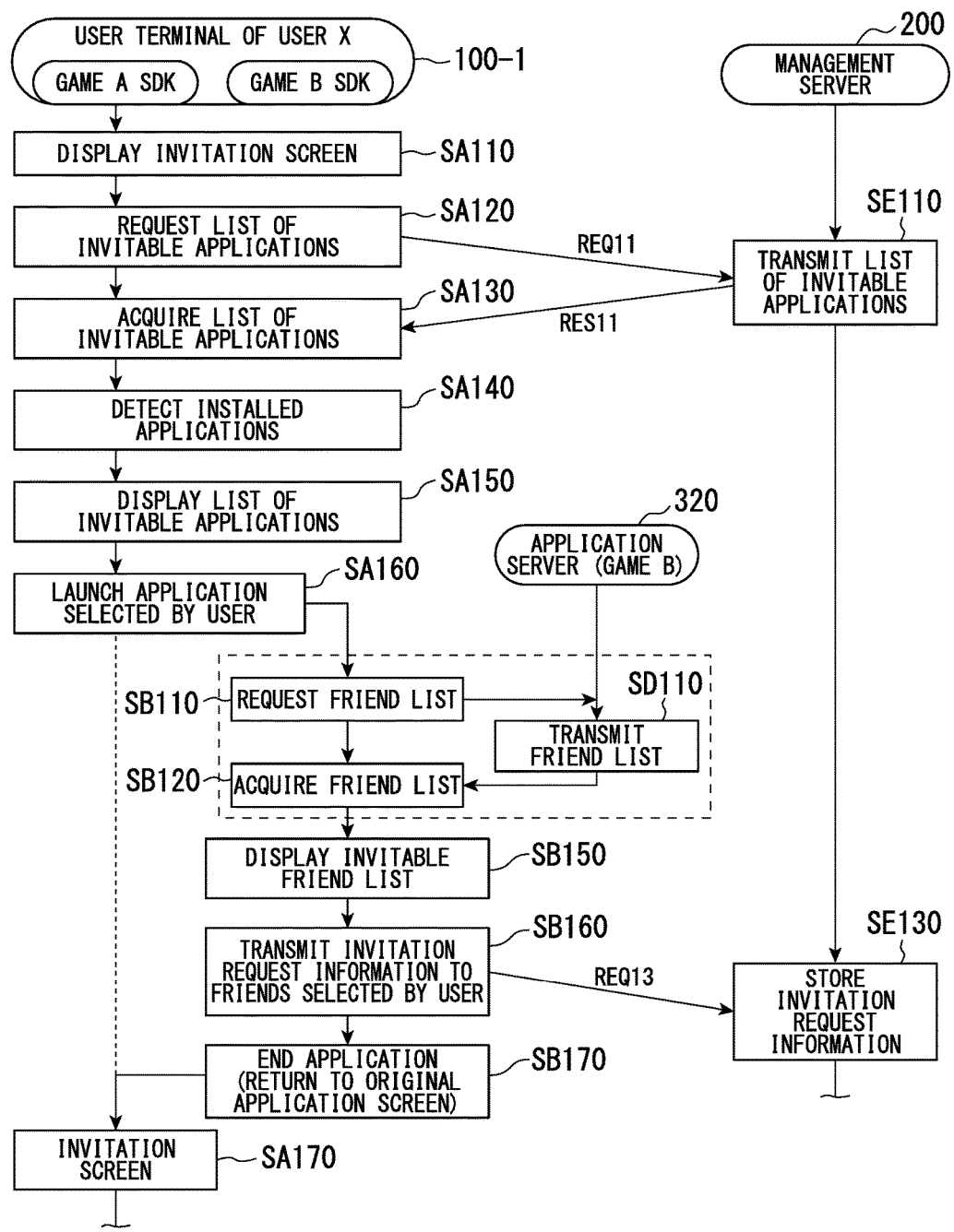
FIG. 9 is a flowchart showing a first example of the operation of invitation processing according to the first embodiment.
Figure 10:
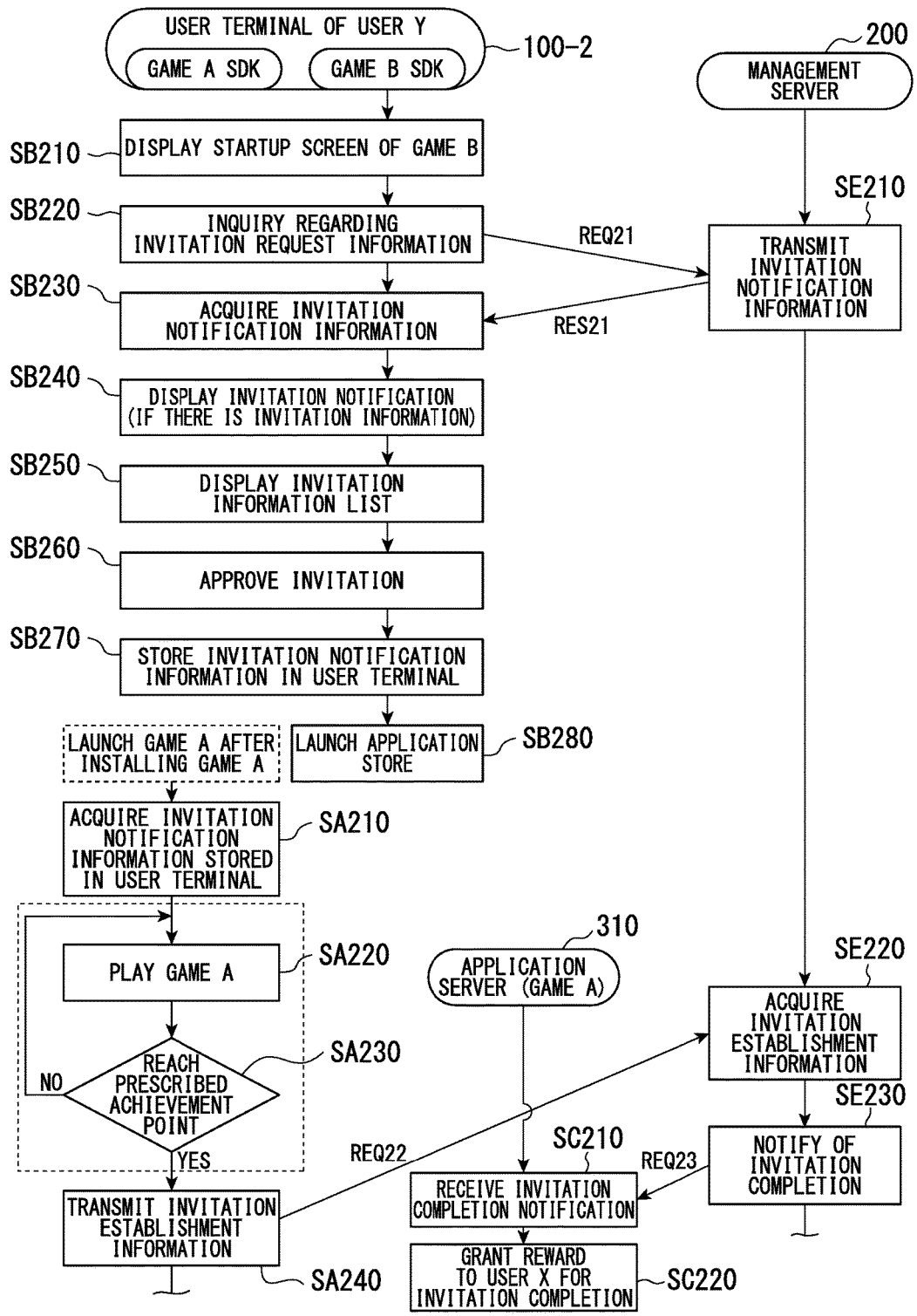
FIG. 10 is a flowchart showing a second example of the operation of invitation processing according to the first embodiment.

Next, the operation of invitation processing of the mutual invitation system 500 according to the present embodiment will be described in detail, with references made to FIG. 9 and FIG. 10. FIG. 9 and FIG. 10 are flowcharts showing an example of the operation in invitation processing by the present embodiment. The processing shown in FIG. 9 and FIG. 10 shows a detailed example of the flow of the general processing described with reference to FIG. 3.

First, referring to FIG. 9, the processing of executed by the user terminal 100-1 of the user X, who is the inviting user, and the management server 200 will be described. That is, the processing from (1) to (3) in FIG. 3 will be described by a detailed example.

(1) Request to the Management Server from the Request Source Application for an Application List (Inviting User Terminal)

The SDK 11A of the request source application 10 (game A) installed in the user terminal 100-1 of the user X, who is the inviting user, displays on the display 120 an invitation screen (refer to the example of the invitation screen shown at (a) in FIG. 4) that starts the invitation processing to invite friends in other games (step SA110).

When the user X operates the invitation screen displayed on the display 120 (first operation), the application list acquisitor 161 of the SDK 11A of the user terminal 100-1 transmits application list request information to the management server 200 application list request information that request a list of invitable applications that is either a part or all of a plurality of system-adaptable applications (REQ11, step SA120). In this case, the application list request information includes the request source application ID (ApIDfrom), and the application ID of the request source application 10 (game A) is set in the request source application ID (ApIDfrom).

Upon acquiring the application list request information from the user terminal 100-1 (SDK 11A), the application list notifier 232 of the management server 200 refers to the application settings storage 221 managed by the application manager 231 and transmits the system-adaptable application list to the user terminal 100-1 (SDK 11A). For example, the application list notifier 232, based on the request source application ID (ApIDfrom) included in the acquired application list request information, verifies that the request source application 10 (game A) that transmitted the application list request information is participating in the mutual invitation system 500. The application list notifier 232 then, in response to the request from the request source application 10 (game A) that is participating in the mutual invitation system 500, transmits an application list of system-adaptable applications (RES11, step SE110).

In this case, the application list transmitted to the user terminal 100-1 (SDK 11A) by the application list notifier 232 includes one or a plurality of application IDs (ApID) of system-adaptable applications. The application IDs of system-adaptable applications included in the application list are set in the application IDs (ApID) of the one or plurality of system-adaptable applications.

The application list notifier 232 may, based on the request source application ID (ApIDfrom) including in the acquired application list request information, transmit to the user terminal 100-1 (SDK 11A) an application list of the system-adaptable applications that omits the request source application 10 (game A) that transmitted the application list request information. The application list transmitted to the user terminal 100-1 (SDK 11A) by the application list notifier 232 may be transmitted with the URL schemes of each system-adaptable application associated with the one or plurality of application IDs (ApID).

Next, the application list acquisitor 161 of the SDK 11A of the user terminal 100-1 acquires a list of applications to which invitations can be made that was transmitted from the management server 200 (step SA130). The application list acquisitor 161 supplies the acquired application list to the presentor 168.

The presentor 168 of the SDK 11A of the user terminal 100-1 detects, of the system-adaptable applications included in the application list acquired by the application list acquisitor 161, the applications that are installed in the user terminal 100-1. For example, the presentor 168 uses the URL schemes of system-adaptable applications included in the application list acquired by the application list acquisitor 161 to detect system-adaptable applications that are installed in the user terminal 100-1 (step SA140).

If a system-adaptable application that is installed in the user terminal 100-1 is detected among the system-adaptable applications included in the application list acquired by the application list acquisitor 161, the presentor 168, based on the detection result, displays at least a part thereof on the display 120 (refer to the example of the application list screen as shown at (b) in FIG. 4, step SA150). If the no system-adaptable application other than the request source application 10 (game A) installed in the user terminal 100-1 is detected, the presentor 168 displays on the display 120 a message giving notification to that effect.

(2) Request Destination Application Friend List (User Terminal of the Inviting User)

Consider that, by an operation by the user X with respect to the application list displayed on the display 120 of the user terminal 100-1 (second operation), the request destination application 20 (game B) has been selected. In this case, the specified mode launcher 162 of the SDK 11A of the user terminal 100-1 launches the request destination application 20 (game B) in the specified mode (step SA160).

When this occurs, the specified mode launcher 162 notifies the SDK 11B of the request destination application 20 (game B) of the request source application ID (ApIDfrom) in which the application ID of the request source application 10 (game A) is set, and of the request source application inviting user ID (Apfrom_UIDfrom) in which the user ID of the user X in the request source application 10 (game A) is set.

Next, the request source application 20 (game B) launched in the specified mode acquires a user list from the application server 320 (game B). The processing to acquire the user list (the processing of step SB110 and SB120 below) is not executed by the SDK 11A, but rather executed by the request destination application 20 (game B).

The request destination application 20 (game B) launched in the specified mode in the user terminal 100-1 transmits to the application server 320 (game 13) friend list request information that requests a user list of users in a prescribed relationship (for example, friend relationship) with the user X in the request destination application 20 (game B) (step SB110). In this case, the friend list request information includes the user ID of the user X in the request destination application 20 (game B) that was notified to SDK 11B from SDK 11A.

Upon acquiring the friend list request information from the request destination application 20 (game B) of the user terminal 100-1, the application server 320 (game B) transmits to the user terminal 100-1 (request destination application 20 (game B)) a list of users in a prescribed relationship (for example, friend relationship) with the user X in the request destination application 20 (game 13) (step SDI 10).

The request destination application 20 (game B) of the user terminal 100-1 acquires the user list from the application server 320 (game B) (step SB120). The request destination application 20 (game B) passes the acquired user list to the SDK 11B. Doing this, the user list acquisitor 163 of the SDK 11B of the user terminal 100-1 acquires the user list acquired by the request destination application 20 (game B).

Next, the presentor 168 of the SDK 11B of the user terminal 100-1 displays on the display 120 a friend list of at list a part of the users included in the user list acquired by the request destination application 20 (game B). That is, the presentor 168 causes the display 120 to display a friend list corresponding to a list of users in a prescribed relationship (for example, friend relationship) with the user X in the request destination application 20 (game B) (refer to the example of the friend list screen shown at (c) in FIG. 4, step SB150).

(3) Invitation Request from the Request Destination Application to the Management Server (Inviting User Terminal)

When the user X selects a user (in this case, the user Y) to invite to the request source application 10 (game A) from the friend list displayed on the display 120 of the user terminal 100-1, the invitation request notifier 164 of the SDK 11B of the user terminal 100-1 transmits to the management server 200 invitation request information that request invitation of the selected user Y as the invited user to the request source application 10 (game A) (REQ13, step SB160).

In this case, the invitation request information includes the user ID of the user X (inviting user) in the request source application 10 (game A), the user ID of the user X (inviting user) in the request destination application 20 (game B), and the user ID of the user Y (invited user) in the request destination application 20 (game B). The invitation request information includes the application ID of the request source application 10 (game A) and the application ID of the request destination application 20 (game B).

The invitation request receiver 233 of the management server 200 receives the invitation request information transmitted from the user terminal 100-1 (SDK 11B). Then, the invitation request receiver 233 supplies the received invitation request information to the invitation request manager 234. The invitation request manager 234 generates a new record corresponding to the invitation request information received by the invitation request receiver 233 and stores the record in the invitation request information storage 222 as an invitation request record (step SE130).

In this case, the new record of invitation request information that was stored as an invitation request record in the invitation request information storage 222 is set as followed, based on the information included in the invitation request information received by the invitation request receiver 233. The application ID of the request source application 10 (game A) is set into the request source application ID (ApIDfrom), and the user ID of the user X (inviting user) in the request source application 10 (game A) is set into the request source application inviting user ID (Apfrom_UIDfrom). The application ID of the request destination application 20 (game 13) is set into the request destination application ID (ApIDto), the user ID of the user X (inviting user) in the request destination application 20 (game B) is set into the request destination application inviting user ID (Apto_UIDfrom), and the user ID of the user Y (invited user) in the request destination application 20 (game B) is set into the request destination application invited user ID (Apto_UIDto).

The flag 0 (invitation request not yet notified) is set into the invitation request status (StatusInvite). Because the invited user ID (Apfrom_UIDto) of the request source application is set after the user Y (invited user) installs the request source application 10 (game A) into the user terminal 100-2, when a new record is generated, it is set to, for example, "null".

After the invitation request notifier 164 transmits the invitation request information to the management server 200, the presentor 168 of the SDK 11B of the user terminal 100-1 causes the display 120 to display the invitation request completion screen that indicates that the invitation request with respect to the invited user has been made (refer to the example of the invitation completion screen at (d) in FIG. 4).

Next, the specified mode terminater 165 of the SDK 11B of the user terminal 100-1 ends the request destination application 20 (game B) that was launched in the specified mode (step SB170). By the request destination application 20 (game B) ending, the display on the display 120 of the user terminal 100-1 returns to the invitation screen (the invitation screen displayed at step SA110) of the request source application 10 (game A) (step SA170). When this occurs, the request source application 10 (game A) transitions to the non-operating state (Not running), the suspended state (Suspended) and, in the case of the suspended state (Suspended), transition is made to the operating state (Active) of the normal mode.

In this manner, by the processing described up to this point with reference to FIG. 9, it is possible to invite the user Y (invited user), who is in a prescribed relationship (for example, friend relationship) with the user X (inviting user) in the request destination application 20 (game 13) to the request source application 10 (game A).

Next, referring to FIG. 10, the processing executed by the user terminal 100-2 of the user Y, who is the invited user, and the management server 200 will be described. That is, a detailed example of the processing from (4) to (7) shown in FIG. 3 will be described.

(4) Request Inquiry from the Request Destination Application to the Management Server (Invited User Terminal)

When the request destination application 20 (game B) installed in the user terminal 100-2 of the user Y, who is the invited user, is launched in the normal mode, the request destination application 20 (game B) displays the startup screen on the display 120 (step SB210).

When the request destination application 20 (game B) in the user terminal 100-2 is launched in the normal mode, the inquirer 166 of the SDK 11B of the request destination application 20 (game B) inquires (request inquiry) to the management server 200 regarding whether or not there is invitation request information (an invitation request record) in which the invited user is the user Y (itself). For example, the inquirer 166 transmits to the management server 200 request inquiry information that inquires whether or not there is invitation request information (an invitation request record) in which the invited user is the user Y (itself) and that includes the request destination application ID (ApIDto) and the request destination application invited user ID (Apto_UIDto) (REQ21, step SB220).

In this case, the application ID of the request destination application 20 (game B) is set into the request destination application ID (ApIDto) and the user ID of the user Y in the request destination application 20 (game B) is set into the request destination application invited user ID (Apto_UIDto).

Upon acquiring of the request inquiry information from the user terminal 100-2 (SDK 11B), the request inquirer 235 of the management server 200 references the invitation request records stored in the invitation request information storage 222 and inquiries whether or not there is an invitation request record for which the invitation request status (StatusInvite) is the flag 0 (invitation request not yet notified) and in which the user Y in the request destination application 20 (game B) is the invited user (that is, an invitation request record with respect to the user Y). Specifically, the request inquirer 235, based on the acquired request inquiry information, inquires whether or not, in the invitation request records stored in the invitation request information storage 222, there is an invitation request record in which the application ID of the request destination application 20 (game B) is set into the request destination application ID (ApIDto) and also the user ID of the user Y in the request destination application 20 (game B) is set into the invited user ID of the request destination application (Apto_UIDto).

If the result of the inquiry by the request inquirer 235 is that there is an invitation request record in which the user Y in the request destination application 20 (game B) is the invited user, the invitation notifier 236 transmits to the user terminal 100-2 (SDK 11B) of the user Y invitation notification information based on the invitation request record (invitation request information) (RES21, step SE210).

When the invitation notifier 236 transmits the invitation notification information to the user terminal 100-2 (SDK 11B) of the user Y, the invitation request manager 234 of the management server 200 updates the invitation request status (StatusInvite) included in the invitation request record stored in the invitation request information storage 222 from the flag 0 (invitation request not yet notified) to the flag 1 (invitation request notification made).

In this case, the invitation notification information includes at least a part of the information included in the invitation request record (invitation request information). For example, the invitation notification information includes the invitation ID (InviteID), the request source application ID (ApIDfrom), the request destination application inviting user ID (Apto_UIDfrom), the request destination application inviting user name (Apto_NAMEfrom), and the request destination application inviting user image URL (Apto_URLfrom) that are included in the invitation request record (invitation request information).

Next, the invitation notification receiver 167 of the SDK 11B of the user terminal 100-2 acquires the invitation notification information transmitted from the management server 200. That is, if the result of the inquiry by the inquirer 166 is that there is an invitation request information record in which the user ID of the user Y (itself) is the user ID of the invited user in the request destination application 20 (game B), the invitation notification receiver 167 acquires from the management server 200 invitation notification information based on the invitation request record (invitation request information) (step SB230).

If the there is an invitation request record in which the user Y is the invited user, the request destination application 20 (game B) of the user terminal 100-2 causes the display 120 to display of the startup screen (refer to the example of the invitation notification screen at (e) in FIG. 4) in which an invitation notification message is displayed that indicates that there is an invitation request in which the user Y is the invited user (step SB240). This startup screen is the startup screen of the request destination application 20 (game B) displayed on the display 120 at step SB210 and is displayed on the display 120 not by processing by the SDK 11B, but rather by processing by the request destination application 20 (game B).

Next, the presentor 168 of the SDK 11B of the user terminal 100-2 presents invitation information based on the invitation notification information acquired by the invitation notification acquisitor 167. For example, the presentor 168 causes the display 120 to display an invitation information list screen (refer to the example of the invitation information list screen shown at (1) in FIG. 4) in which the user Y (itself) is the invited user (step SB250).

The invitation information displayed in the invitation information list screen shows the user names or user images of the inviting users. In the present embodiment, because the inviting user name (Apto_NAMEfrom) and the inviting user image URL (Apto_URLfrom) are included in the invitation notification information, it is possible to display the user names or user images of the inviting users on the invitation information list screen by only processing by the SDK 11B of the user terminal 100-2. For example, although the user names of the inviting users are shown in the example of the invitation information list screen shown at (f) in FIG. 4, the images of users associated with these user names may be displayed.

If the constitution is such that the invitation information does not include the names or images of the inviting users, because it is necessary acquire the user names and user images corresponding to the inviting user IDs (Apto_UIDfrom) directly from the application server 320 or indirectly via the request destination application 20 (game B), the processing becomes complex.

The presentor 168 of the SDK 11B of the user terminal 100-2 may, when presenting invitation information based on the invitation notification information acquired by the invitation notification receiver 167, use the URL scheme to detect system-adaptable applications that are installed in the user terminal 100-2. If it is detected that there is the request source application 10 (game A) to which an invitation is to be made is installed, the presentor 168 of the SDK 11B may then display on the display 120 an invitation information list screen that excludes that invitation information, or may display on the display 120 an invitation information list screen with information added to the invitation information to indicated that it is already installed.

(5) Installation of the Request Source Application (Invited User Terminal)

In the invitation information list screen displayed on the display 120, when the user Y makes an operation (third operation) approving the invitation to the request source application 10 (game A) (step SB260), the invitation information manager 170 of the SDK 11B of the user terminal 100-2 stores in the terminal storage 140 of the user terminal 100 at least part of the information included in the invitation notification information corresponding to the approved invitation information (step SB270).

The screen transitioner 169 of the SDK 11B of the user terminal 100-2 accesses the application store 400 and launches an application store that displays a store page from which the request source application 10 (game A) can be downloaded (step SB280).

(6) Invitation Establishment Notification from the Request Destination Application to the Management Server (Invited User Terminal)

Consider that, after the request source application 10 (game A) is installed into the user terminal 100-2 based on the above-noted invitation request, the request destination application 10 (game A) is launched in the normal mode. For example, consider that the user Y downloaded the request source application 10 (game A) from the application store that was launched at step SB280 to the user terminal 100-2 and launched the installed request source application 10 (game A).

The invitation information manager 170 of the SDK 11A of the request source application 10 (game A) installed in the user terminal 100-2 acquires invitation notification information stored in the terminal storage 140 (step SA210).

In the user terminal 100-2, the user Y plays the request source application 10 (game A) and progresses through the game (step SA220). Then, the request source application 10 (game A) judges whether or not a prescribed achievement point has been reached (step SA230). The processing at step SA220 and step SA230 is executed not by the SDK 11A, but rather by the request source application 10 (game A).

If, with the game progress of the request source application 10 (game A) installed in the user terminal 100-2 and launched, the prescribed achievement point is reached (YES at step SA230), the request source application 10 (game A) passes information indicating this achievement to the SDK 11A of the request source application 10 (game A). If the prescribed achievement point has not been reached (NO at step SA230), the progress through the game in the request source application 10 (game A) is continued until the prescribed achievement point is reached.

If the SDK 11A of the user terminal 100-2 receives from the request source application 10 (game A) information indicating that the prescribed achievement point has been reached, the invitation establishment notifier 171 of the SDK 11A transmits to the management server 200 invitation establishment information indicating that the invitation corresponding to the invitation notification information was made, with the condition that invitation notification information corresponding to request source application 10 (game A) was stored in the terminal storage 140 (REQ22, step SA240). In this case, the invitation establishment information includes, for example, the invitation ID (InviteID) and the request source application invited user ID (Apfrom_UIDto). An invitation ID (InviteID) that was included in the invitation notification information corresponding to this invitation establishment information is set into the invitation ID (inviteID). The user ID of the user Y in the request source application 10 (game A) is set into the invited user ID of the request source application (Apfrom_UIDto). The prescribed achievement point may include the time of installation and first execution (launching) of the request source application 10 (game A) in the user terminal 100-2.

(7) Invitation Completion Notification from the Management Server to the Request Source Application Server The invitation establishment receiver 237 of the management server 200 receives invitation establishment information in the request source application 10 (game A) transmitted from the user terminal 100-2 SDK 11A) (step SE220). The invitation establishment receiver 237 supplies to the invitation request manager 234 the invitation establishment information received by the invitation establishment receiver 237.

The invitation request manager 234, based on the invitation establishment information, sets the user ID of the user Y in the request source application 10 (game A) into the invited user ID (Apfrom_UIDto) of the request source application included in the invitation request record stored in the invitation request information storage 222. The invitation request manager 234 also updates the invitation request status (StatusInvite) from the flag 1 (invitation request already notified) to the flag 2 (information request establishment not yet notified).

Next, the invitation establishment processor 238 of the management server 200 performs prescribed processing, based on the invitation establishment information received by the invitation establishment receiver 237. For example, as the prescribed processing, the invitation establishment processor 238, based on the invitation establishment information received by the management server 200 transmits to the application server 310 (game A) handling the request source application 10 (game A) invitation establishment notification information that notifies of the establishment of an invitation from the user X (inviting user) to the request source application 10 (game A) (REQ23, step SE230). In this case, the invitation establishment notification information includes the user ID of the user X (inviting user) in the request source application 10 (game A). The invitation request manager 234 updates the invitation request status (StatusInvite) from the flag 2 (information request establishment not yet notified) to the flag 3 (invitation establishment notification made). The updating of the flag may alternatively be done at the time of receiving a response notification from the application server 310 (game A) with respect to the notification of the invitation establishment notification information.

The invitation request manager 234, based on information indicating that the request source application 10 (game A) has been installed, rather than on the invitation establishment information, may update the invitation request status (StatusInvite) from the flag 1 (invitation request already notified) to the flag 2 (information request establishment not yet notified). The invitation establishment processor 238, based on the information received by the invitation establishment receiver 237 indicating that the request source application 10 (game A) is installed, may transmit to the application server 310 (game A) handling the request source application 10 (game A) invitation establishment notification information that notifies of the establishment of an invitation to the request source application 10 (game A) from the user X (inviting user).

Upon receiving the invitation completion notification information transmitted from the management server 200 (step SC210), the application server 310 (game A) grants a prescribed reward (for example, an incentive) with respect to the completion of the invitation to the user X in the request source application 10 (game A) indicated by the user ID included in the invitation establishment notification information (step SC220). The prescribed reward is, for example, a virtual currency or item that can be used by the user within the request source application 10 (game A).

(Summary)

(1) As described above, the management server 200 (example of the management device) of the present embodiment has a controller 230 that controls processing of an invitation made from a user terminal 100 (example of the terminal device) of an inviting user (example of the first user), in which the request source application 10 (example of the first application) and the request destination application 20 (example of the second application) are installed, to a user terminal 100 of an invited user (example of the second user), in which the request destination application 20 is installed, wherein the invited user is in a prescribed relationship (for example, friend relationship) with the inviting user in the request destination application 20 (second application), so as to install the request source application 10 into the user terminal 100.

The controller 230 has the invitation request receiver 233, the request inquirer 235, and the invitation notifier 236. The invitation request receiver 233 receives from the user terminal 100 of the inviting user invitation request information that requests invitation of the invited user, who is a user selected from users in a prescribed relationship with, to the request source application 10. The request inquirer 235, based on a request inquiry from the user terminal 100 of the invited user, inquires regarding the existence or non-existence of an invitation request information with respect to the invited user. If the result of the inquiry by the request inquirer 235 is that there is invitation request information with respect to the invited user, the invitation notifier 236 transmits invitation notification information to the user terminal 100 of the invited user, based on the invitation request information. In this case, the invitation notification information includes information, for example, such as an invitation ID (InviteID) or a token information associated with the invitation ID (InviteID) (for example, an invitation request token). In this case, the associated information need not be associated permanently, and may be temporary. Instead of the invitation ID (InviteID) or the token information, various information indicated in an invitation request record corresponding to the invitation ID (InviteID) may be used.

The token information associated with the invitation ID (InviteID) (for example, an invitation request token) is, for example, generated by the management server 200. The timing of the generation of the token information is the time at which, for example, the management server 200 acquires the invitation request information.

Doing the above enables the management server 200 to notify the user terminal 100 of the invited user regarding the invitation request information, received from the inviting user using the user terminal 100 in which the request source application 10 and the request destination application 20 are installed, requesting invitation of the invited user, who is in a prescribed relationship (for example, friend relationship) with the inviting user in the request destination application 20, to the request source application 10. Thus, in the mutual invitation system 500, even between applications in which there is incompatibility of user information, it is possible to invite a user in a prescribed relationship (for example, friend relationship) in a given application to another application. That is, the mutual invitation system 500 can make easy user invitations even between applications in which user information is incompatible.

In this case, the user terminal 100 of the inviting user, in which the request source application 10 and the request destination application 20 are installed, refers to, for example, the user terminal 100 in which the request source application 10 and the request destination application 20 are installed and have been executed. That is, in user terminal 100 of the inviting user, in which the request destination application 20 has been executed and also in the request destination application 20 that has been executed, there is a prescribed relationship (for example, friend relationship) with at least one user. When an invitation request is made of a user (invited user) in a prescribed relationship (for example, friend relationship) in the request destination application 20 to the request source application 10, the request source application 10 has at least been executed.

Also, the user terminal 100, in which the request destination application 20 is installed of the invited user in a prescribed relationship (for example, friend relationship) with an inviting user in the request destination application 20, refers to the user terminal 100 in which the request destination application 20 is installed and has been executed. That is, in the user terminal 100 of the invited user, the request destination application 20 has been executed, and also in the executed request destination application 20 there is a prescribed relationship (for example, friend relationship) with at least the inviting user.

For example, the management server 200 (example of the management device) of the present embodiment has a controller 230 that controls processing of an invitation for introducing the request source application 10, made from a user terminal 100 (example of the terminal device) of an inviting user (example of the first user), in which the request source application 10 (example of the first application) and the request destination application 20 (example of the second application) have been executed, to a user terminal 100 of an invited user (example of the second user) from among users in a prescribed relationship (for example, friend relationship) with the inviting user in the request destination application 20 (second application), in which the request destination application 20 (second application) is installed. Because the inviting user and the invited user are in a prescribed relationship in the request destination application 20, the request destination application 20 has been executed in the user terminal 100 of the invited user.

As described above, the request source application 10 or the request destination application 20 having been executed refers to request source application 10 or the request destination application 20 having been installed and executed. In this case, the constitution may be one in which the entire program of the request source application 10 or the request destination application 20 is installed in the user terminal 100, or may be a constitution in which a part thereof is installed in the user terminal 100 and the remaining part of the program is executed by a device other than the user terminal 100. For example, the program that executes the request source application 10 or the request destination application 20 to be installed in the user terminal 100 may be only the minimum required program for starting the execution of the request source application 10 or the request destination application 20. The constitution may be such that the remaining part of the program is executed by a server device (for example, the application server 300) that can communicate with the user terminal 100 or another terminal device (for example, another user terminal 100).

The constitution may alternatively be one in which the entire program of the request source application 10 or the request destination application 20 to be executed by the user terminal 100 is executed by a device other than the user terminal 100. That is, the constitution may be such that the program to execute the request source application 10 or the request destination application 20 is not installed in the user terminal 100, and is executed by a server device (for example, the application server 300) that can communicate with the user terminal 100 or another terminal device (for example, another user terminal 100). For example, the execution of the request source application 10 or the request destination application 20 by the user terminal 100 includes the case in which, by an instruction from the user terminal 100, the request source application 10 or the request destination application 20 is executed in a server device connected to the user terminal 100 via a communication network, in which case information indicating the result of execution in the server device (for example, displayed information) is displayed at the user terminal 100. That is, the request source application 10 or the request destination application 20 to be executed by the user terminal 100 may be a so-called cloud-based or web-based application.

The introduction of the request source application 10 with respect to the user terminal 100 of the invited user may be the installation of a part or all of the program of the request source application 10 into the user terminal 100. In the case in which the request source application 10 is a so-called cloud-based or web-based application, with respect to the server device that is to be the agent for execution of the program request source application 10, a user registration may be caused to be made by an instruction from the user terminal 100 via a communication network to enable the state in which the request source application 10 can be executed. For example, although in the above-noted embodiment, the description has been of the example in which, in order to introduce the request source application 10 into the user terminal 100 of the invited user, a screen enabling installation of the request source application 10 is displayed on the user terminal 100 of the invited user, alternatively a user registration screen of the request source application 10 may be displayed on the user terminal 100 of the invited user.

Even if there is no request inquiry from the user terminal 100 of the invited user, the management server 200 may transmit invitation notification information to the user terminal 100 of the invited user, based on the invitation request information with respect to the invited user. For example, the management server 200 may use to the occasion of the request destination application 20 launching in the user terminal of the invited user to transmit invitation notification information to the user terminal 100 of the invited user, based on the invitation request information with respect to the invited user. The management server 200 may transmit the invitation notification information to the user terminal 100 of the invited user at a prescribed time interval, or may transmit it at a prescribed time.

That is, the controller 230 may be of a constitution having at least the invitation request receiver 233 and the invitation notifier 236. The invitation request receiver 233 receives, from the user terminal 100 of the inviting user, invitation request information that requests an invitation of invited user (example of the second user) of users in a prescribed relationship with the inviting user (example of the first user) to the request source application 10 (example of the first application). The invitation notification information 236 transmits, to the user terminal 100 of the invited user, invitation notification information based on the invitation request information with respect to the invited user of the invitation request information received by the invitation request receiver 233.

By doing the above, the management server 200 can notify the user terminal 100 of the invited user regarding an invitation request to invite to the request source application 10 an invited user in a prescribed relationship (for example, friend relationship) with the inviting user in the request destination application 20, which was received from the inviting user that uses the user terminal 100, in which the request source application 10 and the request destination application 20 have been executed. Thus, in the mutual invitation system 500, it is possible to invite a user in a prescribed relationship (for example, friend relationship) to another application, even if there is incompatibility of user information between the applications. That is, the mutual invitation system 500 can make easy user invitations even between applications in which user information is incompatible.

For example, the invitation request receiver 233 receives invitation request information that requests an invitation to the request source application 10 of an invited user of users in a prescribed relationship (for example, friend relationship) with the inviting user from a request destination application 20 (example of the second application) launched from the request source application 10, of system-adaptable applications indicated by at least a part of information transmitted by the application list notifier 232 (example of the application information notifier) in the request source application 10 of the user terminal 100 of the inviting user. The invitation notifier 236 then transmits the invitation notification information to the request destination application 20 of the user terminal 100 of the invited user. In this manner, because a notification is made to the request destination application 20 of the invited user, from the request source application 10 of the inviting user via the intervening request destination application 20, it is possible to easily invite a user, even between applications in which there is incompatibility of user information, such as between the request source application 10 and the request destination application 20. In this case, because it is possible to give notification of the invitation notification information to only the invited user, without using social media as used in the real world, it is possible to prevent invitation of an unrelated user. Also, If a social application (e-mail software or chatting) used in the real world is used, although it is possible to give notification of invitation notification information to only the invited user, in this case because it is not necessary to know the address (e-mail address or account) of the user in the messenger application, it is possible to maintain a prescribed relationship that is closed by an application (virtual world).

As described regarding the above-noted embodiment, the management server 200 may have an request inquirer 235 that inquires regarding the existence or non-existence of invitation request information with respect to the invited user, based on a request inquiry from the user terminal 100 of the invited user (example of the second user). In this case, if the result of the inquiry by the request inquirer 235 is that there exists invitation request information with respect to the invited user, the invitation notifier 236 transmits, to the user terminal 100 of the invited user, invitation notification information based on the invitation request information.

This enables the management server 200, on the occasion of the receiving of a request inquiry from the user terminal 100 of the invited user, to notify the user terminal 100 of the invited user regarding the invitation request from the inviting user.

(2) The user terminal 100 (example of the terminal device) is a terminal device capable of communicating with the management server 200 controlling the invitation processing to install the request source application 10 (first application) into the user terminal 100 (example of the terminal device) of another user, in which the request destination application 20 of the other user in a prescribed relationship (friend relationship) with the local user in a request destination application 20 of the request source application 10 (example of the first application) and the request destination application 20 (example of the second application) installed in the user terminal 100.

This enables the user terminal 100 to transmit, to the management server 200, invitation request that requests the invitation to the request source application 10 of another user (example of the invited user) in a prescribed relationship (friend relationship) with the local user (example of the inviting user) in the request destination application 20 that has been launched in the specified mode, based on an operation in the request source application 10. Notification is made of the invitation request to the user terminal 100 of the other user, via the management server 200. Thus, in the mutual invitation system 500, it is possible to invite to another application a user in a prescribed relationship (friend relationship) in a given application, even if there is incompatibility of user information between the applications. That is, the mutual invitation system 500 can make easy user invitations even between applications in which user information is incompatible.

(3) The user terminal 100 (an example of the local terminal device) has a specified mode launcher 162 (example of the launcher), a user list acquisitor 163, and an invitation request notifier 164.

The specified mode launcher 162, in a system-adaptable application installed in the user terminal 100, launches another system-adaptable application installed in the user terminal 100 in the specified mode (causes execution of a specific function).

The user list acquisitor 163 acquires a list of users that are in a prescribed relationship (friend relationship) with the local user in the request destination application 20 (example of the application) that is running in the specified mode (executing a specified function). This user list, for example, is managed by the application server 300 (example of the server device) handling the request destination application 20, and the user list acquisitor 163 acquires the user list from the application server 300 handling the request destination application 20.

The invitation request notifier 164 transmits to the management server 200 (example of the management device) invitation request information that requests invitation to a system-adaptable application (for example the request source application 10) of a user (example of the invited user) selected from the user list acquired by the user list acquisitor 163 that caused launching of the request destination application 20 in the specified mode (causing execution of a specified function) of the request destination application 20.

The above-described user list is one example of information indicating users, and the information can take any form. For example, the constituent elements of the user list acquisitor 163 and invitation request notifier 164 of the user terminal 100 can be described as follows.

The user list acquisitor 163 (example of the user information acquisitor) acquires information (for example, a user list) indicating users in a prescribed relationship (friend relationship) with the local user in the request destination application 20 (example of the application) running in a specified mode (executing a specified function). The invitation request notifier 164 transmits to the management server 200 invitation request information that requests an invitation to the request source application 10 (an example of an application) of an invited user to be invited to the request source application 10 who has launched the request destination application 20 in the specified mode (to execute a specified function of the request destination application 20), the user being from among users indicated by information (for example, a user list) acquired by the user list acquisitor 163 and indicating users in a prescribed relationship. In this manner, because the invitation request information is not transmitted to the management server 200 from the request source application 10 of the inviting user, but rather transmitted to the management server 200 from the request source application 10 with the request destination application 20 intervening (launched), it is easy to invite a user, even between applications having incompatibility of user information between the request source application 10 and the request destination application 20.

This enables the user terminal 100 to transmit, to the management server 200, an invitation request (example of the invited user) that requests invitation to the request source application 10 of another user in a prescribed relationship (for example, friend relationship) with itself (an example of the inviting user) in the request destination application 20 that was launched in the specified mode, based on an operation at the request source application 10. Notification is made of the invitation information to the user terminal 100 of the other user, via the management server 200. Thus, in the mutual invitation system 500, it is possible to invite a user in a prescribed relationship (for example, friend relationship) in a given application to another application, even between applications in which there is incompatibility of user information between applications. That is, the mutual invitation system 500 can make easy user invitations even between applications in which user information is incompatible.

(4) The management server 200 has an application manager 231 that manages information regarding system-adaptable applications that accommodate the mutual invitation system 500. That is, the application manager 231 manages information regarding each of a plurality of system-adaptable applications that include the request source application 10 (example of the first application) and the request destination application 20 (example of the second application). The management server 200 has an application list notifier 232 that transmits, to the user terminal 100 of the inviting user (example of the first user), an application list of system-adaptable applications that can request invitation to the request source application 10. For example, the application list notifier 232 transmits an application list to the request source application 10 of the user terminal 100 of the inviting user.

In this case, the above-described application list can be information indicating at least one system-adaptable application of system-adaptable application that accommodate the mutual invitation system 500, and can take any form. For example, the above-described application list may be data that includes information (for example, application names, application icons images, or application IDs) indicating at least one system-adaptable application, may be data that includes an application list screen displayed as display information that indicates at least one system-adaptable application, or may be information indicating link destinations of the application list screen. In the application list screen, the information indicating the plurality of system-adaptable applications may be displayed in an arrangement (so-called list display) top-to-bottom (vertical direction) (refer to (b) in FIG. 4), may be displayed in an arrangement left-to-right (horizontal direction), or displayed in a matrix arrangement vertically and horizontally (in a so-called grid display).

An application enabling an invitation request may be a system-adaptable application that accommodates the mutual invitation system 500 (that is, an application for which information is managed by the application manager 231). For example, the application manager 231 manages information indicating a plurality of applications, including the request source application 10 (example of the first application) and the second application. The application list notifier 232 (example of the application information notifier) transmits to the user terminal 100 of an inviting user (example of the first user) as the above-noted application list (example of information indicating applications) at least a part of the information managed by the application manager 231 (for example, an application list).

An application enabling an invitation request may be a system-adaptable application for which an invitation request is not prohibited in the management server 200, among the system-adaptable application adaptable to the mutual invitation system 500. For example, the application manager 231 may manage information indicating each of a plurality of system-adaptable applications and information regarding blocking of invitation request set in each of the system-adaptable applications. The application list notifier 232 (example of the application information notifier) may reference the application manager 231, judge whether or not an invitation request to the request source application 10 is possible (for example, whether an invitation request is blocked), and transmit to the user terminal 100 of the inviting user (example of the first user) an application list (example of information indicating applications) indicating applications to which invitation can be requested. The processing in the case such as this, for an application that can request an invitation of a system-adaptable application for which an invitation request is not prohibited will be described below, with regard to the second embodiment.

The user terminal 100 (an example of the local terminal device) has an application list acquisitor 161.

The application list acquisitor 161 acquires from the management server 200 an application list comprising a part or all of a plurality of system-adaptable applications that accommodate invitation processing. For example, the application list acquisitor 161, based on the first operation in the request source application 10 (example of the application) running in the normal mode, acquires from the management server 200 an application list of a part or all of a plurality of system-adaptable applications that accommodate the mutual invitation system 500 (example of invitation processing).

The presentor 168 (an example of a first presentor, and example of an application list presentor) presents system-adaptable applications that are installed in the user terminal 100 from among the application list acquired by the application list acquisitor 161.

This enables the management server 200 to manage information regarding system-adaptable applications adaptable to the mutual invitation system 500. Because the management server 200 transmits an application list of system-adaptable applications to the user terminal 100 of the inviting user and the user terminal 100 acquires and presents this application list, the inviting user can easily select a system-adaptable application that selects invited users from among the application list.

As described above, it is sufficient that the application list is information that indicates one or a plurality of system-adaptable applications of system-adaptable applications that accommodate the mutual invitation system 500, and the information is in any form.

That is, application list acquisitor 161 (example of the application information acquisitor) acquires from the management server 200 information indicating at least one application (an example of one or a plurality of applications) among a plurality of the system-adaptable applications adaptable to invitation processing. For example, the application list acquisitor 161 acquires from the management server 200 information indicating one or a plurality of system-adaptable applications, based on a first operation in the request source application 10 (example of the application) running in the normal mode.

The presentor 168 (example of the first display controller) then causes the display 120 to display information indicating a system-adaptable application installed in the user terminal 100 of the information indicting one or plurality of system-adaptable applications acquired by the application list acquisitor 161.

(5) The application list acquisitor 161 of the user terminal 100 (example of the local terminal device) acquires, in addition to the application list, URL schemes corresponding to each of the system-adaptable application included in the application list. The presentor 168 (example of the first presentor, example of the application list presentor) then detects and presents to the local user system-adaptable applications installed in the user terminal 100 using the acquired URL schemes.

Although the description has been of the example in which the URL schemes are used to detect system-adaptable applications installed in the user terminal 100, this is not a restriction. For example, if it is possible for the operating system to acquire information indicating the system-adaptable application that has already been installed in the user terminal 100, the information acquired by the operating system indicating already installed system-adaptable applications may be used so as to detect other applications installed in the user terminal 100.

For example, the presentor 168 (example of the first display controller) may use a function provided in the user terminal 100 (example of the local terminal device) to detect system-adaptable applications installed in the user terminal 100 from among the system-adaptable applications indicated by information indicating one or a plurality of system-adaptable application, which is acquired by the application list acquisitor 161 (example of the application information acquisitor), so that it may display on the display 120 information indicating the detected system-adaptable applications.

This enables the user terminal 100 to present (display on the display 120) only system-adaptable application installed in the user terminal 100 of the system-adaptable application list acquired from the management server 200.

When information indicating the system-adaptable application installed in the user terminal 100 of the inviting user are displayed on the display 120, the presentor 168 (example of the first display controller) may, by judging whether or not a system-adaptable application is one that has been launched in the user terminal 100 of the inviting user, display on the display 120 information indicating a system-adaptable application judged to have been launched in the user terminal 100 of the inviting user as information indicating a system-adaptable application installed in the user terminal 100 of the inviting user.

The management server 200 may, of the system-adaptable application adaptable to the mutual invitation system 500, take a system-adaptable application installed in the user terminal 100 of the inviting user to be an application enabling invitation request. For example, by information indicating a system-adaptable application installed in the user terminal 100 being transmitted from the user terminal 100 to the management server 200, the management server 200 may recognize an application that is installed in the user terminal 100.

For example, the application manager 231 may manage information regarding each of a plurality of system-adaptable applications including the request source application 10 (example of the first application) and the request destination application 20 (example of the second application) (information and the like indicating whether or not each of the plurality of system-adaptable applications is installed in the user terminal 100). The application list notifier 232 (example of the application information notifier) may then judge by referencing the application manager 231 whether or not a request for invitation to the request source application 10 can be made (for example, whether or not it is installed) and transmit to the user terminal 100 of the inviting user (example of the first user) an application list (example of information indicating applications) indicating applications for which an invitation request can be made.

This enables the management server 200 to notify the user terminal 100 of the inviting user regarding only system-adaptable application installed in the user terminal 100 of the inviting user of the system-adaptable applications adaptable to the mutual invitation system 500.

If information indicating a system-adaptable applications that has been launched in the user terminal 100 of the inviting user can be acquired, the management server 200 may take as an application that can request an invitation, of the system-adaptable application adaptable to the mutual invitation system 500, a system-adaptable application that has been launched in the user terminal 100 of the inviting user to be a system-adaptable application installed in the user terminal 100 of the inviting user.

(6) The specified mode launcher 162 (example of the launcher) of the user terminal 100, with respect to the request destination application 20, which is system-adaptable application selected based on the second operation from amount the system-adaptable applications presented by the presentor 168 (example of the first presentor, example of the application list presentor), launches the selected request destination application 20 (example of the application) in the specified mode, so that the first user information (for example the user ID (an example of the identification information)) corresponding to the inviting user (an example of the local user) in the request source application 10 (example of the application) running in the normal mode can be notified to the management server 200. In this manner, by launching the request source application 20 in the specified mode, it is possible to make a difference from when the user launches a system-adaptable application for the purpose of using the application, and it is possible to call a specific function of the functions of a system-adaptable application.

That is, the specified mode launcher 162 (example of the launcher) launches the request destination application 20 in the specified mode (example of the second application) selected based on the second operation from the system-adaptable application indicated by information indicating one or a plurality of system-adaptable application displayed on the display 120 by the presentor 168 (example of the first display controller).

The above-described specified mode (example of the specified function) may have a function that, by transmitting to the application server 320 (example of the server device) handling the request destination application 20 a user ID (example of the identification information) of an inviting user (example of the local user) in the request destination application 20 (example of the second application) that executed the specified mode, acquires a user list (example of information indicating users in a prescribed relationship, example of the prescribed relationship user information) of users in a prescribed relationship (for example, friend relationship) with the inviting user in the request destination application 20.

This enables the user terminal 100 to acquire the information of a user in a prescribed relationship (for example, friend relationship) with the inviting user in the request destination application 20 from the request source application 10, and to invite that user to the request source application 10 as the invited user.

(7) The invitation request notifier 164 transmits to the management server 200 invitation request information that further includes information (for example, user ID (identification information)) corresponding to the inviting user (example of the local user) in the request source application 10 (the application that executes a specified function with respect to another application).

It is sufficient that the information corresponding to the inviting user is associated with the invitation request information and need not be included in the invitation request information. For example, the invitation request notifier 164 may transmit to the management server 200 invitation request information that further has associated therewith a user ID (example of identification information, example of information corresponding to the inviting user) corresponding to the inviting user (example of the local user) in the request source application 10 (the application that executes a specified function with respect to another application).

For example, the invitation request notifier 164 may transmit to the management server 200 invitation request information with which a user ID (example of identification information, example of the first user information) corresponding to the inviting user (example of the local user) in the request source application 10 (example of the first application) and a user ID (example of identification information, example of the second user information) corresponding to the invited user are associated.

This enables the user terminal 100 to notify the management server 200 via the request destination application 20 that has been launched in the specified mode regarding information (for example, the user ID (identification information)) corresponding to the inviting user in the request source application 10.

(8) The specified mode launcher 162 (example of the launch unit) may launch the request destination application 20 in a specified mode so as to enable further notification to the request destination application 20 (example of the selected application) regarding application information indicating the application ID (example of the identification information) of the request source application 10 (example of the application) running in the normal mode. The invitation request notifier 164 may transmit to the management server 200 invitation request information further including application information indicating the application ID of the request source application 10 (example of the application causing the execution of a specified function with respect to another application) running in the normal mode.

That is, the specified mode (specified function) may further have a function of notifying the management server 200 regarding the application ID (example of identification information) of the request source application 10 (example of the application) that executed the specified mode and the user ID (example of identification information) of the inviting user (example of the local user) in the request source application 10 that executed the specified mode.

It is sufficient that the application information indicating the application ID is associated with the invitation request information, and need not be included in the invitation request information. For example, the invitation request notifier 164 may transmit to the management server 200 invitation request information that further has associated therewith an application ID (example of identification information, example of information indicting the first application) of the request source application 10 (example of the first application, example of the application that executes a specified function with respect to the other application) running in the normal mode.

This enables the user terminal 100 to notify the management server 200 via the request destination application 20 that launched in the specified mode regarding the application ID of the request source application 10 (that is, the system-adaptable application to which the invited user is to be invited). Thus, the management server 200 can identify, by the application ID of the request source application 10, the system-adaptable application to which the invited user is invited.

(9) The invitation request notifier 164 may transmit to the management server 200 invitation request information that includes information (for example, the user ID (example of identification information)) corresponding to the invited user (an example of the selected user) in the request destination application 20.

The information corresponding to the invited user (example of user that is invited) may be associated with the invitation request information need not be included in the invitation request information. For example, the invitation request notifier 164 may transmit to the management server 200 invitation request information with which information (for example, user ID, (example of identification information)) corresponding to the invited user in the request destination application 20 is associated.

This enables the user terminal 100 to notify the management server regarding the user ID of the invited user in the request destination application 20 and, therefore, not only enables the management server 200 to identify the invited user by the user ID of the invited user, but also enables it to identify user terminal 100 of the invited user.

(10) The invitation request notifier 164 may transmit to the management server 200 invitation request information (for example, a user ID (example of identification information)) corresponding to the local user in the request destination application 20 (example of the application executing a specified function) and information (for example, user ID) corresponding to the invited user (example of the selected user) in the request destination application 20.

The information corresponding to the local user and the information corresponding to the invited user in the request destination application 20 may be associated with the invitation request information and need not be included in the invitation request information. For example, the invitation request notifier 164 may transmit to the management server 200 invitation request information to which information (for example, a user ID (example of identification information)) corresponding to the local user in the request destination application 20 (example of the application executing a specified function) and information (for example, user ID) corresponding to the invited user (example of the selected user) in the request destination application 20 are associated.

This enables the user terminal 100 to further notify the management server 200 regarding the user ID of the local user (example of the inviting user) in the request destination application 20 and, therefore, enables the management server 200 to notify the user terminal 100 of the invited user regarding from whom the invitation has been made, by the user ID of the inviting user.

(11) The information corresponding to the inviting user (example of the first user) in the request source application 10 (example of the first application) included in the invitation request information is acquired by the request destination application 20 (example of the second application) in the user terminal 100 of the inviting user either directly from the request source application 10 or indirectly via the terminal storage 140 (example of the storage) of the user terminal 100. In this case, it is sufficient that the information corresponding to the inviting user is information enabling identification of the inviting user at the management server 200, such as the user ID (example of identification information) or token information associated with the user ID (for example, the inviter token). This enables the management server 200 to identify from whom the invitation request was received from the request destination application 20 (second application).

The token information associated with the user ID (for example the inviter token) is, for example, generated by the management server 200. The timing of generating the token information is, for example, the time when the management server 200 acquires application list request information or prescribed information (for example, information of the selected request destination application 20) from the request source application 10 during acquisition of the invitation request information.

It is sufficient that the information corresponding to the inviting user in the request source application 10 is associated with the invitation request information and need not be included in the invitation request information. For example, the information corresponding to the inviting user (example of the first user) in the request source application 10 (example of the first application) associated with the invitation request information may be acquired by the request destination application 20 (example of the second application) in the user terminal 100 of the inviting user either directly from the request source application 10 or indirectly via the terminal storage 140 (example of the storage) of the user terminal 100.

(12) The user terminal 100 has a specified mode terminater 165 that, after the invitation request notifier 164 transmits the invitation request information, ends the request destination application 20 (example of the selected application) launched in the specified mode.

This enables the user terminal 100 to end the request destination application 20 launched in the specified mode after the invitation request was made from the request destination application 20 launched in the specified mode. In this manner, the user terminal 100 can select the invited user by using a specified function of the request destination application 20 that was temporarily launched without the user being aware of it, as part of a series of operations by the inviting user with respect to the request source application 10 running in the normal mode.

(13) For example, the presentor 168 of the user terminal 100 (example of the user list presentor) presents a least a part of the user list acquired by the user list acquisitor 163 as the user list of users that are candidates for invitation to the request source application 10 (example of the application that executed a specified function).

The presentor 168, for example, by causing the display 120 to display the user list of invitation candidate users, presents the user list to the invited user. For example, the presentor 168 (example of the third display controller) causes the display 120 to display at least a part of user list (example of information indicating users in a prescribed relationship) acquired by the user list acquisitor 163 (example of the user information acquisitor) as a user list of users who are candidates for invitation to the request source application 10 (example of information indicating users who are candidates for invitation to an application that executed a specified function).

This, enables display on the user terminal 100 of a user list in the request destination application 20 of candidates for invitation to the request source application 10, by causing the request destination application 20 to execute a specified function, based on operation in the request source application 10.

(14) When this is done, the presentor 168 (example of the user list presenter) switches the display on the display 120 from the screen previously displayed by the request source application 10 (example of the application caused to execute a specified function) to a display screen of a user list that includes at least a part of the acquired user list.

For example, the presenter 168 (example of the third display controller) switches the display on the display 120 from the screen previously displayed by the request source application 10 (example of the application caused to execute a specified function) to a display screen of a user list that includes at least a part of the acquired user list (example of information including at least a part of the information indicating users in a prescribed relationship).

In this manner, the user terminal 100 can switch the display between the display screen in the request source application 10 running in the normal mode and the display screen in the request destination application 20 for the purpose of selecting an invited user, without having the inviting user be aware of the switching of the applications.

(15) After the invitation request notifier 164 transmits to the management server 200 invitation request information, the presenter 168 (example of the second presenter, example of the invitation information presenter) ends the display of the display screen of the user list that was displayed on the display 120, so that there is a switch to the display screen displayed by the request source application 10 (example of the application that executed a specified function).

For example, after the invitation request notifier 164 transmits to the management server 200 invitation request information, the presenter 168 (example of the third identifying controller) ends the display of the display screen of the user list that was displayed on the display 120 (example of information including at least a part of the information that indicates users in a prescribed relationship), so that there is a switch to the display screen displayed by the request source application 10 (example of the application that executed a specified function).

In this manner, the user terminal 100 can switch the display between the display screen in the request source application 10 running in the normal mode and the display screen in the request destination application 20 for the purpose of selecting an invited user, without having the inviting user be aware of the switching of the applications. This enables the user terminal 100 to have the user that has completed a request of an invitation to continue to use the request source application 10, for example, so that the stoppage of use by the user of the request destination application 20 does not occur.

(16) The invitation request receiver 233 of the management server 200 receives invitation request information from the request destination application 20 (example of the second application) that launched by selection from an application list in the user terminal 100 of the inviting user (example of the first user).

In this case, the invitation request information includes information corresponding to the inviting user in the request source application 10 (example of the first application) and information corresponding to the invited user (example of the second user) in the request destination application 20.

It is sufficient that the information corresponding to the inviting user is information enabling identification of the inviting user at the management server 200, such as the user ID (example of identification information) or token information (for example, an inviter token) associated with the user ID. If the information corresponding to the invited user is token information, it may be made possible to identify from the token information not only the inviting user, but also the request source application 10.

It is sufficient that the information corresponding to the invited user is information enabling identification of the inviting user at the management server 200, such as the user ID or token information associated with the user ID.

The management server 200 has an invitation request manager 234 that manages as the invitation request records the application IDs and user IDs included in the invitation request information that are associated with each other. That is, the invitation request manager 234 of the management server 200 manages invitation request record corresponding to invitation request information.

The invitation request information may additionally include the user ID (example of identification information) of the inviting user (example of the first user) in the request destination application 20 (example of the second application). If a communication session between the user terminal 100 (SKD11) and the management server 200, because the user (the inviting user in the request destination application 20) who transmits the invitation request information can be identified from information regarding the communication session (for example, session information), information may not be included in the invitation request information enabling identification by the session information, such as inviting user information in the request destination application 20 in the invitation request information. The lack of the need to include information identifiable by the session information is not only the invitation request information, but the same with other information as well.

This enables the management server 200 to acquire invitation request information transmitted from the user terminal 100 of the inviting user and to manage it as an invitation request record. The management server 200 can also, based on the user ID including in the acquired invitation request information, identify the inviting user in the request source application 10, the inviting user in the request destination application 20, and the invited user in the request destination application 20.

Although in the above-described embodiment, the invitation request information has been described as including information corresponding to the inviting user in the request source application 10 and information corresponding to the invited user in the request destination application 20, this is not a restriction. For example, it is sufficient that the information corresponding to the inviting user in the request source application 10 and the information corresponding to the invited user in the request destination application 20 is associated with the invitation request information, and one or both thereof may not be included in the invitation request information.

For example, the invitation request receiver 233 may acquire invitation request information in association with information corresponding to the inviting user (example of the first user) in the request source application 10 (example of the first application) and information corresponding to the invited user (example of the second user) in the request destination application 20 (example of the second application). The invitation request manager 234 may then manage, as an invitation request record, the invitation request information, the information corresponding to the inviting user in the request source application 10, and the information corresponding to the invited user in the request destination application 20 that were associated and acquired by the invitation request receiver 233.

The invitation request receiver 233 need not acquire invitation request information and information corresponding to the inviting user in the request source application 10. For example, in cases such as when the invited user is not notified of who the inviting user is or a reward is not granted to the inviting user when the invitation is established, the management server 200 need not acquire information corresponding to the inviting user in the request source application 10 and may just transmit to the user terminal 100 of the invited user the acquired invitation notification information.

For example, the invitation request receiver 233 may acquire the invitation request information in association with the information corresponding to the invited user (example of the second user) in the request destination application 20 (example of the second application). The invitation request manager 234 then may manage as an invitation request record in association with each other the invitation request information acquired by the invitation request receiver 233 in association with each other and the information corresponding to the invited user in the request destination application 20.

(17) The request inquirer 235 of the management server 200, based on the request inquiry from the request source application 20 (example of the second application) of the user terminal 100 of the invited user (example of the second user), inquires regarding the existence or non-existence of an invitation request record with respect to the invited user in the request destination application 20. For example, the request inquirer 235 inquires regarding the existence or non-existence of an invitation request record corresponding to information corresponding to the invited user in the request destination application 20 included in the request inquiry from the user terminal 100 of the invited user. As one example, the request inquirer 235 inquires regarding the existence or non-existence of an invitation request record corresponding to the user ID (example of identification information) of the invited user in the request destination application 20 included in the above-noted request inquiry.

It is sufficient that the information corresponding to the invited user (for example, the user ID) of the request destination application 20 is associated with the request inquiry and need not be included in the request inquiry. For example, the request inquirer 235 may make an inquiry regarding the existence or non-existence of an invitation request record corresponding to information (for example, a user ID) corresponding to the invited user in the request destination application 20 (example of the second application) associated with the request inquiry from the user terminal 100 of the invited user (example of the second user).

This enables the management server 200 to inquire, based on the request inquiry from the user terminal 100 of the invited user, as to whether or not it is managing an invitation request record with respect to the invited user.

(18) The user terminal 100 has an inquirer 166 that makes an inquiry with respect to the management server 200 regarding the existence or non-existence of invitation request information in which the information corresponding to the local user (for example, the user ID (example of identification information)) is information corresponding to the invited user (example of the second user information, for example, the user ID).

If the result of the inquiry by the inquirer 166 is that there is invitation request information in which the information corresponding to the local user (for example, the user ID) is information corresponding to the invited user (for example, the user ID), the invitation request receiver 167 of the user terminal 100 acquires the invitation notification information from the management server 200, based on the invitation request information.

That is, the invitation notification receiver 167 of the user terminal 100, based on the user ID (example of identification information) of the invited user (example of the selected user) included in the invitation request information transmitted to the management server 200 from another user terminal 100, acquires from the management server 200 invitation notification information based on the invitation request information in which the user requested invitation to the request source application 10 (example of the application caused to execute a specified function) is the local user. The presentor 168 (example of the second presentor, example of the invitation information presentor) presents the invitation information based on the invitation notification information acquired by the invitation notification receiver 167.

It is sufficient that the information corresponding to the invited user (example of the user being invited) is associated with the invitation request information and need not be included in the invitation request information. For example, the invitation notification receiver 167 of the user terminal 100 may, based on the user ID (example of identification information) of the invited user (example of the user being invited) associated with the invitation request information transmitted to the management server 200 from the user terminal 100 (example of the other user terminal) of another user, acquire from the management server 200 invitation notification information based on invitation request information in which the user (example of the invited user) who was invited by request invitation to the request source application 10 (example of the application caused to execute a specified function) is the local user.

That is, the invitation notification receiver 167 may acquire from the management server 200 invitation notification information based on the invitation request information, among of the invitation request information transmitted to the management server 200 from the user terminal 100 (example of the other terminal device) in which the invited user (example of the user being invited) is the local user. Then, the presentor 168 (example of the second display controller) causes display of the invitation information on the display 120, based on the invitation notification information acquired by the invitation notification receiver 167.

This enables the user terminal 100 to acquire and present (display on the display 120) the invitation notification information base on the invitation request record if an invitation request record in which the local user is the invited user is managed by the management server 200. That is, in the mutual invitation system 500, notification of the invitation request is given from the inviting user to the invited user.

(19) The user terminal 100 has a screen transitioner 169 that, based on the third operation with respect to the invitation information presented by the presentor 168 (example of the second presentor), transitions to a screen enabling installation of the request source application 10 (example of the application) indicated by the invitation information.

For example, the screen transitioner 169, based on a third operation with respect to the invitation information caused by the presentation unit 168 (example of the second display controller) to be displayed on the display 120, transitions to a screen enabling installation of the request source application 10 (example of the application) indicated by the invitation information.

If the invitation information based on invitation notification information acquired from the management server 200 is approved, this enables the user terminal 100 to automatically display the store page enabling installation of the request source application 10 corresponding to the approved invitation information, without making the user make any special operation.

(20) The user terminal 100 has an invitation information manager 170 that stores in the terminal storage 140 (example of the storage) of the user terminal 100 (example of the local terminal device) at least a part of the information included in the invitation notification information corresponding to the invitation information that was the subject of the third operation of the invitation information presented by the presentation unit 168 (example of the second presenter, example of the invitation information presenter).

The invitation information manager 170 may, rather than the at least a part of the information included in the invitation notification information, store in the terminal storage 140 at least a part of information associated with the invitation notification information.

For example, the invitation information manager 170 may store in the terminal storage 140 (example of the storage) of the user terminal 100 (example of the local terminal device) at least a part of information associated with the invitation notification information corresponding to invitation information operated on by the third operation of the invitation information displayed on the display 120 by the presentor 168 (example of the second display controller).

If, by storing the invitation notification information corresponding to the approved invitation information, the request source application 10 corresponding to this invitation information is installed, the user terminal 100 can identify the installed request source application 10 as having been the subject of an invitation.

(21) The user terminal 100 has an invitation establishment notifier 171 that transmits invitation establishment information corresponding to the invitation information to the management server 200, if the request source application 10 (example of the application caused to execute a specified function) corresponding to any one of the invitation information presented by the presenter 168 (example of the invitation information presentor) is installed in the user terminal 100 (example of the local terminal device) and also a prescribed condition is satisfied. The prescribed condition may include the first installation and execution (launching) of the request source application 10.

For example, the invitation establishment notifier 171 transmits invitation establishment information corresponding to the invitation information to the management server 200, if the request source application 10 (example of the application caused to execute a specified function) corresponding to any one of the invitation information displayed on the display 120 by the presentor 168 (example of the second display controller) is installed in the user terminal 100 (example of the local terminal device) and also a prescribed condition is satisfied.

For example, if the request source application 10 (example of the application) running in the normal mode satisfies a prescribed condition, the invitation establishment notifier 171 transmits invitation establishment information corresponding to the invitation notification information to the management server 200, under the condition that at least part of the information included in the invitation notification information corresponding to the request source application 10 (example of the application currently running) is stored in the terminal storage 140 of the user terminal 100.

As described above, the invitation information manager 170 may store in the terminal storage 140 (example of the storage) of the user terminal 100 (example of the local terminal device) at least a part of information associated with the invitation notification information corresponding to the invitation information operated on by the third operation of the invitation information caused to be displayed on the display 120 by the presentor 168 (example of the second display controller, example of the invitation information presentor). In this case, if the prescribed condition is satisfied in the request source application 10 (example of the first application) running in the normal mode, the invitation establishment notifier 171 may transmit to the management server 200 invitation establishment information corresponding to the invitation notification information, with the condition that at least a part of the information that is associated with invitation notification information corresponding to the request source application 10 is stored in the terminal storage 140 of the user terminal 100.

This enables the user terminal 100 to notify the management server 200 of the establishment of the invitation by the invitation request, by the invited user installing and using the request source application 10 based on the invitation request from the inviting user. In this case, if a prescribed condition after using the request source application 10 is satisfied in the request source application 10 at the time the invitation establishment information is transmitted to the management server 200, the case in which the request source application 10 has only been installed but has not been used can be excluded from the invitation establishment condition.

(22) The management server 200 has an invitation establishment receiver 237 and an invitation establishment processor 238. The invitation establishment receiver 237, based on the request source application 10 (example of the first application) being launched in the user terminal 100 of the invited user (example of the second user), receives, from the user terminal 100 of the invited user, invitation establishment information indicating the establishment of an invitation corresponding to the invitation notification information. For example, the invitation establishment receiver 237 receives invitation establishment information from the request source application 10 (example of the first application) of the user terminal 100 of the invited user.

The invitation establishment processor 238 performs prescribed processing, based on the invitation establishment information received by the invitation establishment receiver 237.

If the invitation has been established by an invitation request from the inviting user, this enables the management server 200 to grant, for example, a prescribed reward (for example, an incentive) to the inviting user in the request source application 10 by the establishment of the invitation.

The invitation establishment receiver 237 may acquire the above-noted invitation establishment information from the application server 310 (game A) handling the request source application 10. For example, if the request source application 10 is launched in the user terminal 100 of the invited user, the application server 310 (game A) handling the request source application 10 can communicate with the user terminal 100 of the invited user and recognize that the request source application 10 has been launched in the user terminal 100 of the invited user. Given this, the above-noted invitation establishment information may be made to be transmitted from the application server 310 (game A) handling the request source application 10 to the management server 200.

For example, the invitation establishment receiver 237 receives invitation establishment information indicating the establishment of the invitation corresponding to the invitation establishment information, which was transmitted from the user terminal 100 of the invited user, based on the request source application 10 (example of the first application) being launched in the user terminal 100 of the invited user (example of the second user) or the application server 310 (example of the server device) handling request source application 10. The invitation establishment processor 238 performs prescribed processing base on the invitation establishment information received by the invitation establishment receiver 237.

If an invitation by an invitation request from an inviting user is established, this enables the management server 200 to recognize the establishment of the invitation. Also, if the management server 200 recognizes the establishment of the invitation request from the inviting user it can, for example, grant to the inviting user in the request source application 10 a prescribed reward.

For example, as the prescribed processing, the invitation establishment processor 238, based on the invitation establishment information received by the invitation establishment receiver 237, transmits invitation completion notification information that notifies of the establishment of the invitation corresponding to the invitation notification information to the user terminal 100 of the inviting user (example of the first user) or the application server 310 (example of the server device) corresponding to the request source application 10 (example of the first application).

This enables the request source application 10 executed in the user terminal 100 of the inviting user or the application server 310 handling the request source application 10 to grant reward under the condition that the invitation corresponding to invitation notification information was established.

Specifically, the invitation establishment processor 238, based on the invitation establishment information received by the invitation establishment receiver 237, transmits to the user terminal 100 of the inviting user or the application server 310 (example of the server device) handling the request source application 10 at least a part of the information corresponding to the inviting user in the request source application 10 as the inviting completion notification information, so that a reward is granted to the inviting user (example of the first user) in the request source application 10 (example of the first application).

This enables the request source application 10 executed in the user terminal 100 of the inviting user or the application server 310 handling the request source application 10 to grant a reward to the inviting user, under the condition that the invitation corresponding to the invitation notification information was established.

The arrangement may be made so that, if the invitation by the invitation request from the inviting user has been established, the management server 200 grants a prescribed reward to the invited user in the request source application 10. The management server 200 may grant a prescribed reward to the inviting user or the invited user in the request destination application 20, and may grant a reward to the inviting user or the invited user that can be used in common by a plurality of applications.

The above-described reward may be made reward usable in another application different from the request source application 10 and the request destination application 20 or reward usable on a website (for example, currency or points usable when purchasing products or services by communication via a communication network). In this case, the management server 200, for example, by temporarily managing information regarding the reward granted to the user and then performing a prescribed procedure, to enable the reward to be usable in another application or on a website may transmit information regarding the managed reward to a server device handling the other application or a server device handling the website.

(23) The invitation establishment information includes a part of or all of the invitation notification information, and the part of or all of the invitation notification information is acquired by the request source application 10 (example of the first application) in the user terminal 100 of the invited user (example of the second user), either directly or indirectly, via the terminal storage 140 (example of the storage) of the user terminal 100 from the request destination application 20 (example of the second application).

This enables the user terminal 100 to transmit from the request source application 10 invitation establishment information that includes a part of or all of the invitation notification information acquired in the request destination application 20.

It is sufficient that the part of or all of the invitation notification information is associated with the invitation establishment information and need not be included in the invitation establishment information. For example, the part of or all of the invitation notification information may be associated with the invitation establishment information, and the part of or all of the invitation notification information may be acquired by the request source application 10 (example of the first application) in the user terminal 100 of the invited user (example of the second user), either directly from the request destination application 20 (example of the second application) or indirectly via the terminal storage 140 (example of the storage) of the user terminal 100.

This enables the management server 200 to acquire invitation establishment information with which the part of or all of the invitation notification information is associated.

(24) The above-described functions of the application list acquisitor 161, the specified mode launcher 162, the user list acquisitor 163, the invitation request notifier 164, the specified mode terminater 165, the inquirer 166, the invitation notification acquisitor 167, the presentor 168, the screen transitioner 169, the invitation information manager 170, and the invitation establishment notifier 171 are implemented based on the SDK 11 (example of program (software)) into which are embedded programs (for example, programs for the request source application 10 and the request destination application 20) for system-adaptable applications installed in the user terminal 100.

That is, by executing the SDK 11 (example of the program (software)) embedded in the programs for system-adaptable applications installed in the user terminal 100 (for example, programs for the request source application 10 and the request destination application 20), the above-described functions of the application list acquisitor 161, the specified mode launcher 162 (example of the launcher), the user list acquisitor 163 (example of the invitation candidate user information acquisitor), the invitation request notifier 164, the specified mode terminater 165, the inquirer 166, the invitation notification acquisitor 167, the presentor 168 (example of the first display controller, example of the second display controller), the screen transitioner 169, the invitation information manager 170, and the invitation establishment notifier 171 are implemented.

For example, the SDK 11A embedded in the request source application 10 executes the functions of the application list acquisitor 161, the specified mode launcher 162, a part of the presentor 168, and the invitation establishment notifier 171, and the SDK 11B embedded in the request destination application 20 executes the functions of the user list acquisitor 163, the invitation request notifier 164, the specified mode terminater 165, the inquirer 166, the invitation notification acquisitor 167, a part of the presentor 168, the screen transitioner 169, and the invitation information manager 170. The SDK 11A and the SDK 11B have the same type of functions, and execute corresponding functions depending upon whether they are embedded in the request source application 10 or embedded in the request destination application 20.

For example, by execution of the SDK 11A (example of the program (software)) embedded in the program of the request source application 10 (example of the application) installed in the user terminal 100, the function of the specified mode launcher 162 (example of the launcher) is implemented, and by execution of the SDK 11B (example of the program (software)) embedded in the program of the request destination application 20 (example of another application) installed in the user terminal 100, the functions of the user list acquisitor 163 (example of the user information acquisitor) and the invitation request notifier 164 are implemented.

In this manner, by embedding the SDK 11 into an application, it is possible to make the application a system-adaptable application that accommodates the mutual invitation system 500 of the present embodiment. Thus, for example, even in an existing application or an application to be developed, if the program of the application is updated or slightly modified so that the SDK 11 can be embedded therein, it is possible to make the application a system-adaptable application that accommodates the mutual invitation system 500.

In the above-described embodiment, although the example described was one in which, for example, the functional constitution is such that the application list acquisitor 161, the specified mode launcher 162 (launcher), the presentor 168, the invitation information manager 170 and the invitation establishment notifier 171 are executed by the SDK 11A of the request source application 10, and the functional constitution is such that the user list acquisitor 163, the invitation request notifier 164, the specified mode terminater 165, the inquirer 166, the invitation notification acquisitor 167, the presentor 168, and the screen transitioner 169 are executed by the SDK 11B of the request destination application 20, these are not restrictions.

The invitation processing functional elements executed by each of the above-described SDK 11A embedded in the request source application 10 and the SDK 11B embedded in the request destination application 20 are examples, and the functional elements executed by each of the SDK 11A and the SDK 11B can be discretionarily changed. For example, it is sufficient that the functional constitution is such that the SDK 11A executes the invitation request notifier 164.

(Second Embodiment)

Next, the second embodiment of the present invention will be described. The constitution of the mutual invitation system 500 of the present embodiment is different from the first embodiment with regard to the point of being able to exclude an arbitrary pre-established system-adaptable application beforehand from the application list of system-adaptable applications that can be selected for invited users.

Figure 11:
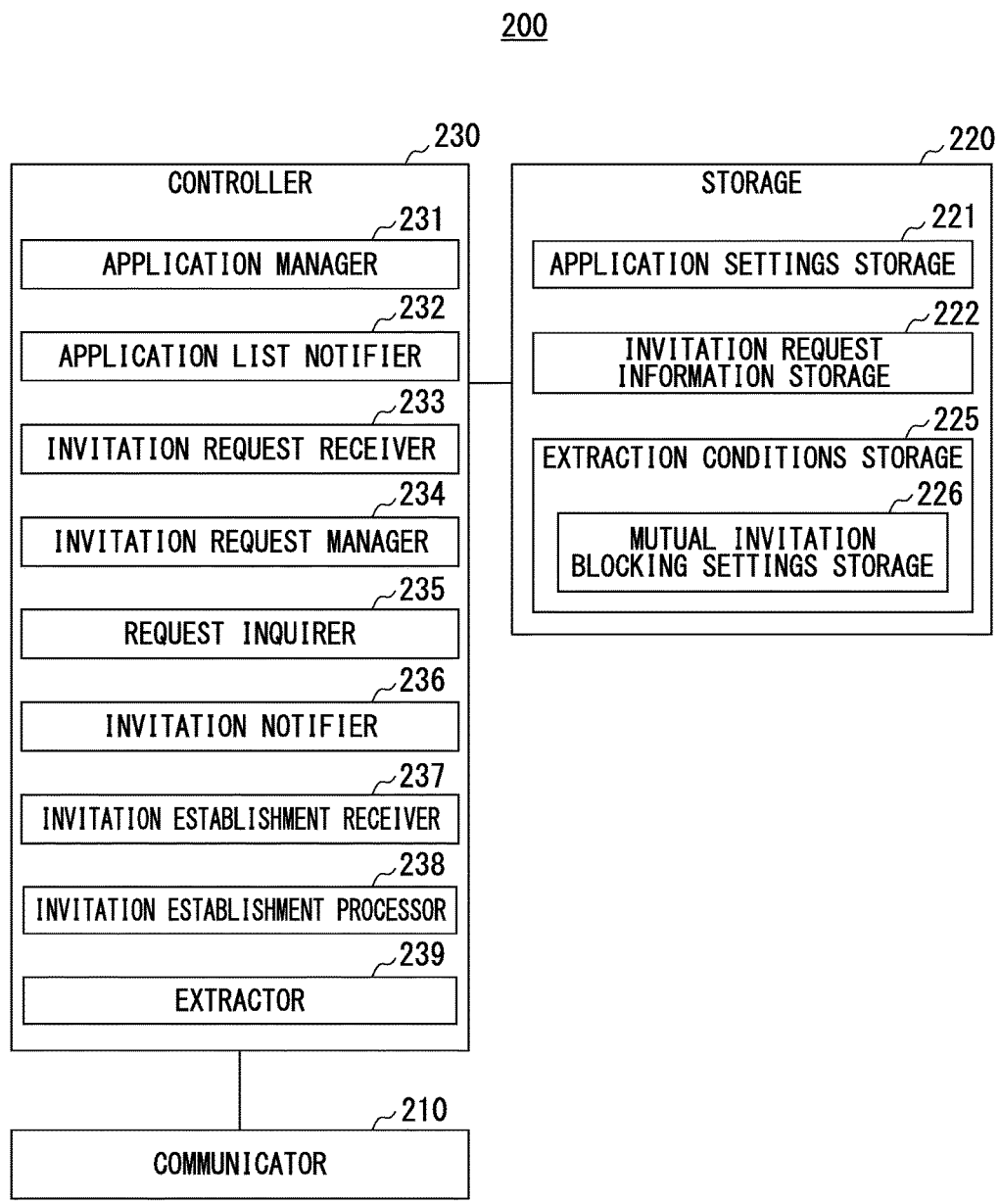
FIG. 11 is a drawing showing an example of the constitution of a management server according to a second embodiment.

FIG. 11 shows an example of the constitution of a management server 200 according to the second embodiment. The management server 200 shown in the drawing is different from the management server 200 according to the first embodiment as shown in FIG. 6 with regarding to the further provision of an extraction condition storage 225 in the storage 220 and an extractor 239 in the controller 230. In FIG. 11, constituent elements that are the same as shown in FIG. 6 are assigned the same reference symbols. The characteristic features of the present embodiment will be described, with references made to FIG. 11.

The extraction conditions storage 225 stores conditions for extracting system-adaptable applications with regard to which an invitation request to the request source application 10 (example of the first application) can be made. For example, the extraction conditions storage 225 has as the above-noted extracting conditions a mutual invitation blocking settings storage 226 that stores mutual invitation blocking setting information indicating settings regarding combinations of system-adaptable application for which mutual invitations are not desired in the mutual invitation system 500.

Specifically, the mutual invitation blocking settings storage 226 stores mutual invitation prohibition settings information (third prohibition information) that is a combination of an invitation-accepting-prohibited-application and an inviting-prohibited-application. The inviting-prohibited-application is an application on which prohibition for an invitation to the invitation-accepting-prohibited-application is set, so that the inviting-prohibited-application as an invitation request source application is prohibited from inviting the invitation-accepting-prohibited-application as an invitation request destination application. The invitation-accepting-prohibited-application is an application on which prohibition for accepting an invitation from the inviting-prohibited-application is set, so that the invitation-accepting-prohibited-application as an invitation request destination application is prohibited from accepting the invitation from the inviting-prohibited-application as an invitation request source application. FIG. 12 shows an example of the mutual invitation blocking settings information stored in the mutual invitation blocking settings storage 226. The mutual invitation blocking settings information is associated with a filter ID (FilterID), a blocking application ID (ApIDfrom) as an invitation request source application, and a blocked application ID (ApIDto) as an invitation request destination application.

The filter ID (FilterID) is a management ID issued in the sequence in which each mutual invitation blocking settings information is registered, so as to enable identification of each of the mutual invitation blocking settings information. The application ID of the inviting-prohibited-application, on which prohibition for an invitation to the invitation-accepting-prohibited-application is set so that the inviting-prohibited-application as an invitation request source application is prohibited from inviting the invitation-accepting-prohibited-application as an invitation request destination application, is set into the inviting-prohibited-application or the blocking application ID (ApIDfrom) as an invitation request source application. The application ID of the invitation-accepting-prohibited-application, on which prohibition for accepting an invitation from the inviting-prohibited-application is set so that the invitation-accepting-prohibited-application as an invitation request destination application is prohibited from accepting the invitation from the inviting-prohibited-application as an invitation request source application, is set into the blocked application ID (ApIDto) as an invitation request destination application.

For example, if an application ID of the request source application 10 is set into the blocked application ID (ApIDto), the system-adaptable application set into the blocking application ID (ApIDfrom) is removed from the application list. That is, if it is desired to block the invitation to the request destination application 20 (game B) from the request source application 10 (game A), the application ID of the request source application 10 (game A) is set into the blocked application ID (ApIDto) and the application ID of the request destination application 20 is set into the blocking application ID (ApIDfrom).

If the application ID of the request source application 10 is set into the blocking application ID (ApIDfrom), the system-adaptable application set into the blocked application ID (ApIDto) may be removed from the application list. That is, with respect to the setting-side application that sets blocking of an invitation request and the set-side application that is block from making an invitation request in the blocking application ID (ApIDfrom) and the blocked application ID (ApIDto), the blocking of an invitation request may be done with respect to one thereof or with respect to both.

In this case, the application manager 231 manages the mutual invitation blocking settings information stored in the above-described mutual invitation blocking settings storage 226. That is, the application manager 231 manages the mutual invitation prohibition settings information that is the combination of the invitation-accepting-prohibited-application that is prohibited from requesting the invitation and the inviting-prohibited-application to which the request for invitation request to the invitation-accepting-prohibited-application is prohibited.

The extractor 239, by extraction conditions based on the mutual invitation blocking settings information stored in the mutual invitation blocking settings storage 226, extracts from the system-adaptable applications system-adaptable applications for which an invitation request to the request source application 10 (first application) can be made.

Then, the application list notifier 232 transmits the application list that includes at least a part of the system-adaptable applications extracted by the extractor 239 to the user terminal 100 of the inviting user (example of the first user) as an application list of system-adaptable applications for which an invitation request to the request source application 10 (example of the first application) can be made.

This enables exclusion of an arbitrary system-adaptable application from application list of system-adaptable applications from which an invited user is selectable, by setting the invitation blocking information beforehand.

As described above, the application manager 231 manages information regarding each of a plurality of system-adaptable applications that include the request source application 10 (example of the first application) and the request destination application 20 (example of the second application). In this case, the information regarding each of a plurality of system-adaptable applications managed by the application manager 231 is, for example, information indicating each of the plurality of system-adaptable applications or information regarding the blocking of an invitation request set in each of the plurality of system-adaptable applications.

The application list notifier 232 (example of the application information notifier) references the application manager 231, judges whether or not a request for an invitation to the request source application 10 is possible (for example, whether blocking of an invitation request is set), and transmits to the user terminal 100 of the inviting user (example of the first user) an application list (example of information indicating an application) indicating applications for which an invitation request can be made.

This enables the management server 200 to transmit to the user terminal 100 of the inviting user an application list of only system-adaptable applications for which an invitation request can be made.

For example, the application manager 231 manages invitation blocking information that combines the setting-side application that sets the blocking of the invitation request and the set-side application that is blocked from making an invitation request with respect to the setting-side application.

The application list notifier 232 (example of the application information notifier) references the information blocking information managed by the application manager 231 and, if there is invitation blocking information that sets the request source application 10 (example of the first application) to set-side application, transmits to the user terminal 100 inviting user (example of the first user) an application list of system-adaptable applications that excludes the setting-side application indicated by the invitation blocking information (example of the third blocking information).

Specifically, the application list notifier 232 may transmit to the user terminal 100 of the inviting user an application list of system-adaptable applications extracted based on the extraction conditions by the extractor 239, as the application list of system-adaptable application for which an invitation request to the request source application 10 is possible.

For example, consider the case in which, as the extraction conditions, among the invitation blocking information managed by the application manager 231 there is invitation blocking information that sets the request source application 10 to set-side application. In this case, the extractor 239 extracts system-adaptable applications corresponding to setting-side application indicated by the invitation blocking information which exclude system-adaptable applications for which invitation requests to the request source application 10 are set to be blocked. The application list notifier 232 then, based on the results of extraction by the extractor 239, transmits to the user terminal 100 of the inviting user an application list from which system-adaptable applications for which request for an invitation to the request source application 10 are set to be blocked have been excluded.

In the mutual invitation system 500, this enables the relationship between system-adaptable applications between which mutual invitations is not desired to be set into the management server 200. For example, if there is, among the system-adaptable applications, one that has a rating (age rating) set, a request destination application 20 in which a rating is not set can be excluded from the application list, so that an invitation is not permitted from a request source application 10 in which a rating is not set is not permitted to a request destination application 20 in which a rating is set.

This enabling the blocking of the mutual (bidirectional) listing of applications between setting-side applications that set the mutual invitation blocking settings information and set-side applications with respect to which the mutual invitation blocking settings information is set.

In the inter-application filter information shown in FIG. 12, the blocking application ID (application ID of the setting-side application) and the blocked application ID (application ID of the set-side application) may be related so that mutual listing is prohibited. That is, the application list notifier 232 (example of the application information notifier) may reference the mutual invitation blocking settings information managed by the application server 231 and, if there is invitation blocking information in which the request source application 10 is set to the setting-side application, may transmit to the user terminal 100 of the inviting user an application list (example of information indicating applications) of application that excludes set-side applications indicated by the invitation blocking information.

In this manner, because mutually blocking invitation requests eliminates the need to mutually store unidirectional mutual invitation blocking settings information, it is possible to reduce the storage capacity of the mutual invitation blocking settings storage 226. Information indicating whether unidirectional or bidirectional is enabled can be added to the mutual invitation blocking settings information stored in the mutual invitation blocking settings storage 226.

(Third Embodiment)

Next, the third embodiment of the present invention will be described. The constitution of the mutual invitation system 500 of the present embodiment is different from the first embodiment with regard to the point of being able to exclude a pre-established user from the user list of users selectable as invited users.

In the first embodiment, the description was for a constitution in which a friend list corresponding to a user list acquired from the application server 300 handling request destination application 20 that is running in a specified mode (for example, the application server 320 (game B) handling the request destination application 20 (game B)) is displayed on the display 120. In the present embodiment, the constitution is such that the users included in that list are filtered in accordance with prescribed extraction conditions and are then displayed on the display 120 as a new user list (hereinafter referred to as the invitation candidate user list). The filtering processing of the user list is performed in the management server 200 by notification being made from the user terminal 100-1 (SDK 11B) to the management server 200 regarding the user list acquired from the application server 300.

(Operation of the User List Filtering Processing)

Figure 13:
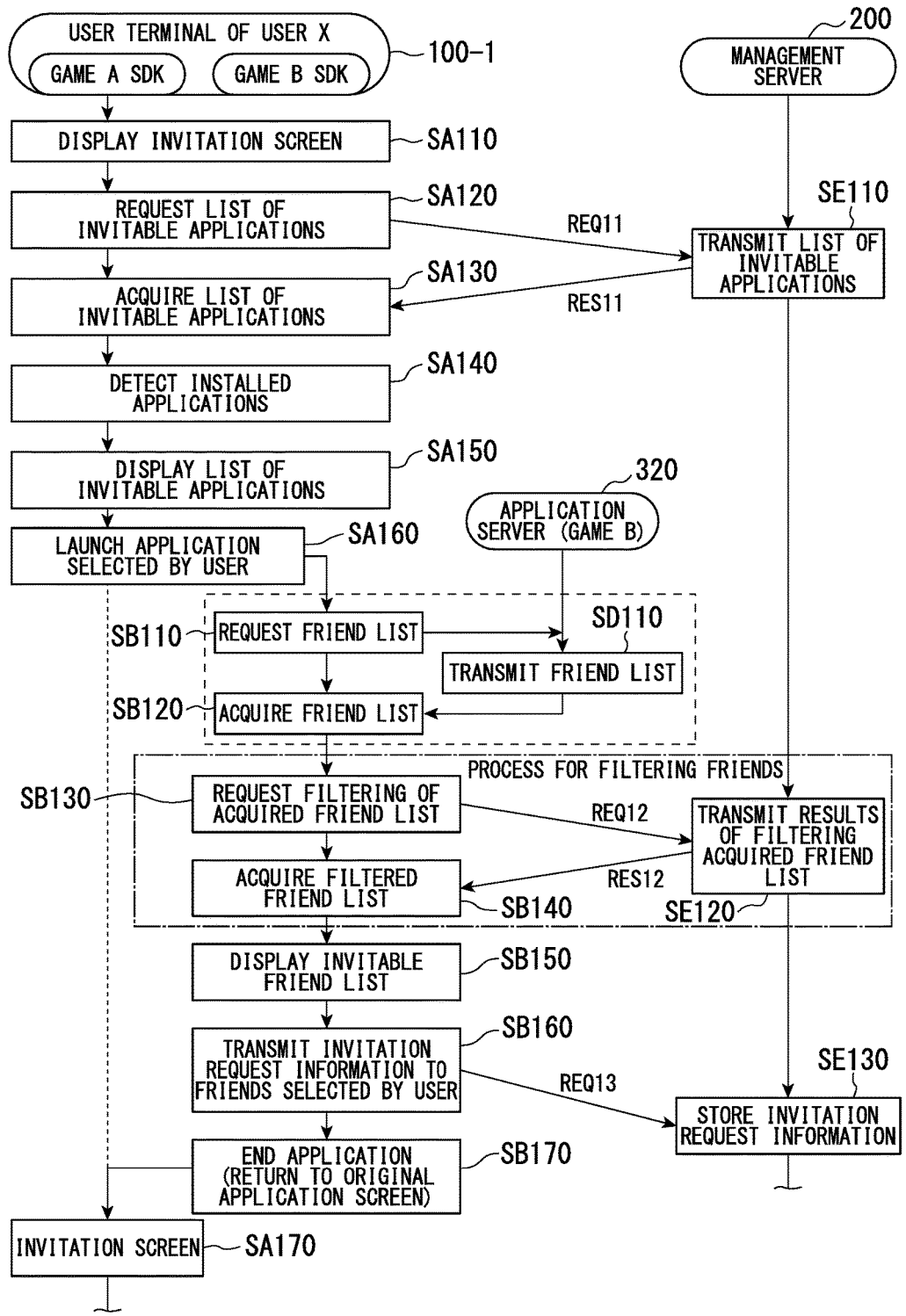
FIG. 13 is a flowchart showing an example of the operation of invitation processing according to a third embodiment.

Referring to FIG. 13, the operation of invitation processing for the case of filtering the user list will be described. FIG. 13 is a flowchart showing an example of the operation of invitation processing according to the present embodiment. The invitation processing showing in the drawing differs from the invitation processing of the first embodiment shown in FIG. 9 with regard to the addition of user list filtering processing (steps SB130, SE120, and SB140). In FIG. 13, processing elements that are the same as in FIG. 9 have been assigned the same reference symbols, and the description thereof will be omitted.

At step SB120, upon the request destination application 20 (game B) of the user terminal 100-1 acquiring a user list from the application server 320 (game B), the user list acquisitor 163 of the SDK 11B of the request destination application 20 (game B) acquires the user list from the request destination application 20 (game B) and notifies the management server 200 regarding the acquired user list. For example, the user list acquisitor 163 transmits to the management server 200 filtering request information that includes the user ID of the user included in the user list.

In this case, the filtering request information includes, for example, the request source application ID (ApIDfrom), the request destination application ID (ApIDto), the request destination application invitation user ID (Apto_UIDfrom), and the request destination application invited user ID (Apto_UIDto).

Next, the management server 200 acquires the user list by receiving the filtering request information from the user terminal 100-1 (SDK 11B), performs filtering processing in accordance with prescribed extraction conditions, and transmits the filtered invitation candidate user list resulting from the filtering to the user terminal 100-1 (SDK 11B) (RES12, step SE120). The filtered invitation candidate user list (filtering result) includes the user IDs of users extracted from the user list regarding which the management server 200 was notified from the user terminal 100-1 (SDK 11B) in accordance with the prescribed extraction conditions.

The user list acquisitor 163 of the SDK 11B of the user terminal 100-1 then acquires filtered the invitation candidate user list as the result of the filtering in accordance with the transmitted filtering request information (step SB140).

At step SB140, when the user list acquisitor 163 acquires the filtered invitation candidate user list, the presentor 168 of the SDK 11B of the user terminal 100-1 causes display on the display 120 of a friend list corresponding to a user list that will be a list of candidates to be invited to the request source application 10 (game A), which is at least a part of the users included in the invitation candidate user list (step SB150).

(Constitution of the Management Server 200 of the Third Embodiment)

Next, the constitution of the management server 200 that executes the above-described filtering processing will be described.

Figure 14:
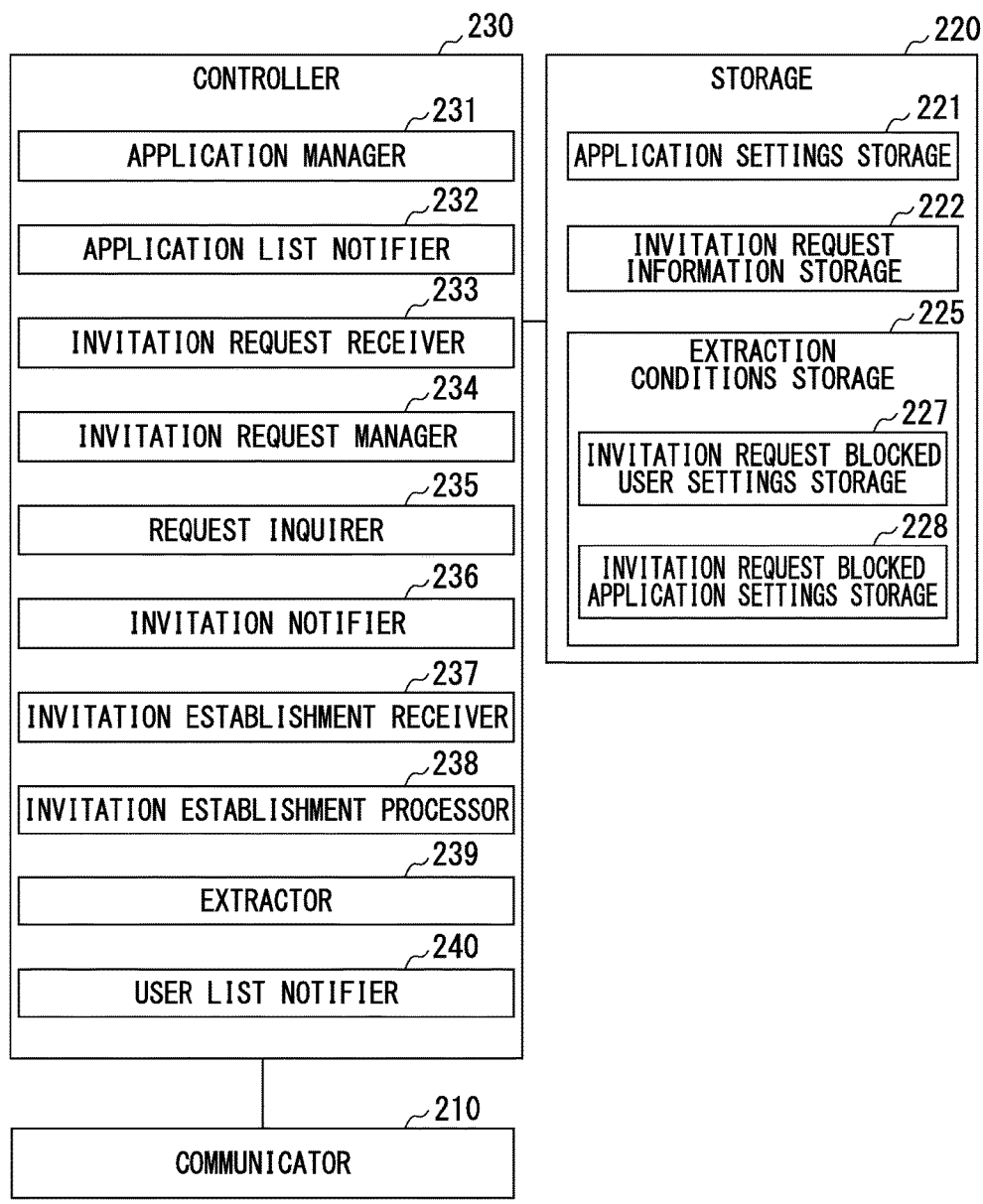
FIG. 14 is a drawing showing an example of the constitution of a management server according to the third embodiment.

FIG. 14 shows an example of the constitution of the management server 200 according to the present embodiment. The management server 200 shown in the drawing differs from the management server 200 according to the second embodiment shown in FIG. 11 with regard to the controller 230 further having a user list notifier 240 and the extraction conditions storage 225 having an invitation request blocked user settings storage 227 and an invitation request blocking application settings storage 228. In FIG. 14 constituent elements that correspond to the same parts in FIG. 11 are assigned the same reference symbols. In the following, the characteristic constitution and processing of the present embodiment are described, with references made to FIG. 14.

The user list notifier 240 of the management server 200 acquires from the request destination application 20 (SDK 11B) running in the specified mode in the user terminal 100 filtering request information that requests filtering of the user list. If this is acquired, the user list notifier 240, based on the filtering results (extraction results) by the extractor 239, transmits to the user terminal 100 (SDK 11B) a user list (invitation candidate user list) of users of the user included in the user list, who will be candidates for invitation to the request source application 10.

In the present embodiment, the extractor 239 filters (extracts) users who will be invitation candidates from users included in the user list if the user list is acquired from the request destination application 20 (SDK 11B) of the user terminal 100, based on the prescribed extraction conditions.

The prescribed extraction conditions for extraction by the extractor 239 are managed by the application manager 231. Specifically, they are stored in the extraction conditions storage 225. The extraction conditions storage 225 has the invitation request blocked user settings storage 227 and the invitation request blocking application settings storage 228.

(Invitation Request Blocked User Setting)

The invitation request blocked user settings storage 227 stores, as the extraction conditions for the extractor 239, invitation request blocking user settings information indicating the settings regarding users from which invitation are not to be accepted in the mutual invitation system 500. For example, the invitation request blocked user settings storage 227 stores invitation request blocking user settings information (first blocking information), which is the combination of a setting-side user who sets the blocking of invitation requests, a set-side user who is blocked from making an invitation request, and a system-adaptable application for which these settings are enabled.

FIG. 15 shows an example of the invitation request blocked user settings information stored in the invitation request blocked user settings storage 227. The invitation request blocked user settings information includes the filter ID (FilterID), the application ID (FilterApID), the blocking user (UIDfrom), and the blocked user (UIDto), in association with each other. The filter ID (FilterID) is a management ID issued in the sequence in which each invitation request blocked user settings information is registered, to enable identification of each invitation request blocked user settings information. The application ID of the system-adaptable application (request destination application 20) for which the blocking setting is to be enabled is set into the application ID (FilterApID). The user ID of the setting-side user who sets the blocking of an invitation request is set into the blocking user (UIDfrom). The user ID of the set-side user who is block from making an invitation request is set in the blocked user (UIDto).

For example, if the request destination application 20 is set into the application ID (FilterApID) and also the user ID of the inviting user is set into the blocked user (UIDto), the user set into the blocking user (UIDfrom) is excluded from the invitation candidate list in the request destination application 20 of the inviting user. Therefore, for example, if at the request destination application 20 (game B) user Y does not wish to receive an invitation from user X, it is sufficient that an application ID of the request destination application 20 (game B) is, for example, set into the application ID (FilterApID), the user ID of the user X is set into the blocked user (UIDto), and the user ID of the user Y is set into the blocking user (UIDfrom). This excludes the user Y from the invitation candidate user list in the request destination application 20 (game B) of the user X.

If the request destination application 20 is set into the application ID (FilterApID) and also the user ID of the inviting user is set into the blocking user (UIDfrom), the user set into the blocked user (UIDto) may be excluded from the invitation candidate user list in the request destination application 20 of the inviting user. That is, with respect to the setting-side user who sets the blocking of an invitation request and the set-side user who is blocked from making an invitation request, which are set, respectively, into the blocking user (UIDfrom) and the blocked user (UIDto), invitation requests may be blocked in one direction or bidirectionally.

The setting of a user from which an invitation is not desired is made possible from the user terminal 100 as a function of the SDK 11. When the user (blocking user) makes a blocking setting of any system-adaptable application, invitation request blocking user settings information, into which are set the application ID of the system-adaptable application as the application ID (FilterApID), the user ID of the user making the blocking setting as the blocking user (UIDfrom), and the user ID that does not wish to accept invitation as the blocked user (UIDto), is registered and stored in the invitation request blocked user settings storage 227.

(Invitation Request Blocking Application Setting)

The invitation request blocking application settings storage 228 stores as the extraction conditions of the extractor 239 invitation request blocking application settings information indicating the settings regarding a system-adaptable application in which a user does not wish to accept an invitation to in the mutual invitation system 500.

FIG. 16 shows an example of the invitation request blocking application settings information stored in the invitation request blocking application settings storage 228. In the invitation request blocking application settings information, the filter ID (FilterID), the blocking user (UIDfrom), and the application ID of the system-adaptable application to be blocked (FilterApID) are associated with each other. The filter ID (FilterID) is a management ID issued in sequence in which each invitation request blocking application settings information is registered, so that identification is possible of each invitation request blocking application settings information. The application ID of the system-adaptable application for which a user does not wish to accept an invitation is set into the application ID (FilterApID). The user ID of a user who does not wish to accept an invitation from the system-adaptable application set in this application ID (FilterApID) is set into the blocking user (UIDfrom).

The setting of a system-adaptable application to which a user does not which to accept an invitation is made possible from the user terminal 100 as a function of the SDK 11. When the user (blocking user) makes the blocking setting of any system-adaptable application, invitation request blocking application settings information, into which are set the application ID of the system-adaptable application as the application ID (FilterApID) and the user ID of the user setting the blocking as the blocking user (UIDfrom) is registered and stored in the invitation request blocked application settings storage 228.

For example, consider the case in which the request destination application 20 (game B) is set into the application ID (FilterApID) and also the user ID of the user Y is set into the blocking user (UIDfrom). In this case, the user Y is excluded from the invitation candidate list presented in the request destination application 20 (game B) of the inviting user (for example the user X).

Consider also the case in which the request source application 10 (game A) is set into the application ID (FilterApID) and also the user ID of the user Y is set into the blocking user (UIDfrom). In this case, the user Y is excluded from the friend list of invitation candidate users invited to the request source application 10 (game A) of the friend list of invitation candidates presented to the inviting user (for example, the user X). This, for example, enables blocking so that an invitation request is not made to an already-installed system-adaptable application or to a system-adaptable application that was installed but then uninstalled after playing a game once.

(1) As described above, the user terminal 100 of the present embodiment (example of the terminal device) has the application list acquisitor 161, the specified mode launcher 162 (example of the launcher), the presentor 168 (example of the first presentor, example of the second presentor), the user list acquisitor 163, the invitation request notifier 164, the inquirer 166, the invitation notification acquisitor 167, the screen transitioner 169, and the invitation information manager 170.

The application list acquisitor 161, based on the first operation in the request source application 10 (example of the application) running in the normal mode, acquires from the management server 200 an application list of a part of or all of a plurality of system-adaptable applications corresponding to processing (example of the invitation processing) to install the request source application 10 (example of the first application) into the user terminal 100 in which the request destination application 20 (example of the second application) is installed. The presentor 168 (example of the first presentor, example of the application list presentor) presents system-adaptable applications installed in the user terminal 100 (example of the local terminal device) from the application list acquired by the application list acquisitor 161.

The specified mode launcher 162 (example of the launcher) with respect to the request destination application 20, which is the system-adaptable application selected based on the second operation from among the system-adaptable application presented by the presentor 168 (example of the first presentor, example of the application list presentor), launches the selected request destination application 20 (example of the application), so that notification can be made to the management server 200 regarding the first user information (user ID or token information associated with the user ID) corresponding to the inviting user (example of the local user) in the request source application 10 (example of the application) running in the normal mode.

The user list acquisitor 163, while the request destination application 20 (example of the application) is running in the specified mode, acquires from the management server 200 a user list of users who will be invitation candidates. The invitation request notifier 164 transmits to the management server 200 invitation request information including first user information and second user information which corresponds to a user (example of the invited user) selected from a user list acquired by the user list acquisitor 163.

The inquirer 166 inquires of the management server 200 regarding the existence or non-existence of a record (example of the invitation request record) of invitation request information (that is, invitation request information with respect to the local user) in which the invited user will be the local user (for example, the user Y) in the request destination application 20 running in the normal mode (example of the request inquiry). Then, if the result of the inquiry by the inquirer 166 is that there is invitation request information in which the information corresponding to the local user is the second user information (for example, the user ID) corresponding to the invited user, the invitation notification acquisitor 167 acquires the invitation notification information based on the invitation request information from the management server 200.

The presentor 168 (example of the second presentor, example of the invitation information presentor) presents the invitation information based on the invitation notification information acquired by the invitation notification acquisitor 167. The screen transitioner 169, based on the third operation with respect to the invitation information presented by the presentor 168, transitions to a screen enabling installation of the request source application 10 indicated by the invitation information.

Then, the invitation information manager 170 stores in the terminal storage 140 of the user terminal 100 a part of or all of the invitation notification information corresponding to the invitation information in which the third operation is performed (invitation was approved by the invited user (for example, the user Y)) of the invitation information presented by the presentor 168.

The SDK 11 may have an application list of system-adaptable applications, in which case, because it is not necessary to acquire the application list from the management server 200, the user terminal 100 may not have the application list acquisitor 161 as a constituent element.

Even if the user terminal 100 of the invited user does not make a request inquiry with respect to the management server 200, invitation notification information based on the invitation request information with respect to the invited user transmitted from the management server 200 may be acquired. For example, the management server 200 may use the occasion of the launching of the request destination application 20 in the user terminal 100 of the invited user to transmit, to the user terminal 100 of the invited user, invitation notification information based on the invitation request information with respect to the invited user. The management server 200 may transmit the invitation notification information to the user terminal 100 of the invited user at a prescribed time interval, or may transmit it at a regularly prescribed time.

Therefore, the user terminal 100 (example of the terminal device) of the embodiment may be constituted to have at least a part of the specified mode launcher 162 (example of the launcher), the presentor 168 (example of the first display controller, example of the second display controller), the user list acquisitor 163 (example of the invitation candidate user information acquisitor), the invitation request notifier 164, the invitation notification acquisitor 167, and the screen transitioner 169, and the various constituent elements can be described as follows.

The presentor 168 (example of the first display controller), based on the first operation in the request source application 10 (example of the first application) installed in the user terminal 100 (example of the local terminal device), causes display of information indicating one or a plurality of system-adaptable applications on the display 120. The specified mode launcher 162 (example of the launcher) launches, in the specified mode, the request destination application 20 (example of the second application) selected based on the second operation from among the system-adaptable applications indicated by the information indicating one or a plurality of system-adaptable applications displayed by the presentor 168. The user list acquisitor 163 acquires from the management server 200 a user list (example of the invitation candidate user information) indicating users who will be candidates for invitation to the request source application 10 in the request destination application 20 running in the specified mode. The invitation request notifier 164 transmits to the management server 200 invitation request information with which second user information (for example, a user ID) corresponding to an invited user, of the invitation candidate user list acquired by the user list acquisitor 163, who will be invited to the request source application 10.

If, in the request source application 10 running in the normal mode, there is invitation request information in which information corresponding to the local user is second user information corresponding to the invited user in the management server 200, the invitation notification acquisitor 167 acquires from the management server 200 the invitation notification information based on the invitation request information. The presentor 168 (example of the second display controller) causes the display 120 to display of the invitation information based on the invitation notification information acquired by the invitation notification acquisitor 167. The screen transitioner 169, based on the third operation with respect to the invitation information displayed on the display 120 by the presenter 168, transitions to a screen from which an application indicated by the application indicated by the invitation information can be installed.

This enables the user terminal 100, by launching the request destination application 20 based on the operation by the inviting user in the request source application 10 in the specified mode, to acquire and display on the display 120 an invitation candidate user list indicating users who will be candidates for invitation to the request source application 10. In this case, the user indicated by the invitation candidate list is, for example, a user extracted as a user to be an invitation candidate from among other users in a prescribed relationship (friend relationship) with the inviting user in the request destination application 20, these being candidates who can be invited to the request destination application 20. Therefore, because the user terminal 100 can display only the users who can be selected as an invited user, it is possible to enhance the convenience when the inviting user selects an invited user.

Because the user terminal 100 can make a request to invite an invited user in a prescribed relationship (for example, friend relationship) with the inviting user in the request destination application 20 to the request source application 10, a user in a prescribed relationship (for example, friend relationship) in a given application can be invited to another application. In the user terminal 100 of the invited user, if there has been an invitation request from an inviting user, because the invitation information of invitation to the request destination application 20 in the request destination application 20 is displayed on the display 120, the invited user can easily recognize being invited to the request destination application 20. Because an operation of the invitation information displayed on the display 120 transitions to a screen enabling installation of the request destination application 20, the invited user can easily install the request destination application 20 to which the invitation was received.

(2) The user terminal 100 has an invitation establishment notifier 171. If a prescribed condition is satisfied in the request source application 10 (example of the application) running in the normal mode, the invitation establishment notifier 171 transmits to the management server 200 invitation establishment information corresponding to the invitation notification information, with the condition that at least a part of the information included in the invitation notification information corresponding to the request source application 10 (example of the application running currently) is stored in the terminal storage 140 (example of the storage) of the user terminal 100.

As described regarding the first embodiment, the invitation information manager 170 may store in the terminal storage 140 (example of the storage) of the user terminal 100 (example of the local terminal device) at least a part of the information associated with the invitation notification information corresponding to invitation information that was the subject of the third operation among invitation information caused to be displayed on the display 120 by the presenter 168 (example of the second display controller, example of the invitation information presenter). In this case, if the prescribed condition is satisfied in the request source application 10 (example of the first application) running in the normal mode, the invitation establishment notifier 171 may transmit to the management server 200 invitation establishment information corresponding to the invitation notification information, with the condition that at least a part of the information associated with the invitation notification information corresponding to the request source application 10 is stored in the terminal storage 140 of the user terminal 100.

This enables the user terminal 100, by using the installation and use of the request source application 10 by the invited user based on the invitation information from the inviting user, to notify the management server 200 of the establishment of the invitation by the invitation request. Additionally, by applying the condition that at least a part of the information included in the invitation notification information is stored, it is possible to exclude an application, for example, that the user him/herself as installed without using the mutual invitation system 500 (that is, installed not based on invitation request from the inviting user). That is, it is possible to notify the management server 200 regarding only those invitations that are established by invitation information from an inviting user. In this case, if the timing of transmitting the invitation establishment information to the management server 200 is made when a prescribed condition is satisfied after use in the request source application 10, it is possible to exclude from the conditions for invitation establishment the case in which the request source application 10 is simply installed but not used.

(3) The application list acquisitor 161 of the user terminal 100 acquires, in addition to the application list, the URL schemes of each of the system-adaptable applications included in the application list. Then, the presenter 168 example of the first presenter, example of the application list presenter) detects, using the acquired URL schemes, and presents to the local user system-adaptable applications that are installed in the user terminal 100 (example of the local terminal device).

Although the example of detecting system-adaptable applications installed in the user terminal 100 using URL schemes was described, this is not a restriction. For example, if it is possible for the operating system to acquire information indicating the system-adaptable applications that have already been installed in the user terminal 100, the information acquired by the operating system indicating already-installed system-adaptable applications may be used so as to detect other applications installed in the user terminal 100.

For example, the presenter 168 (example of the first display controller) may detect, using functions of the user terminal 100 (example of the local terminal device) the system-adaptable applications installed in the user terminal 100 from among the system-adaptable application indicated by the information indicating one or a plurality of system-adaptable application lists acquired by the application list acquisitor 161 (example of the application information acquisitor), and display on the display 120 information indicating the detected applications.

This enables the user terminal 100 to present (display on the display 120) only system-adaptable applications installed in the user terminal 100 (example of the local terminal device) from among the system-adaptable applications acquired from the management server 200.

(4) The user list acquisitor 163 of the SDK 11 of the system-adaptable application installed in the user terminal 100 (example of the terminal device) of the present embodiment may notify the management server 200 (example of the management device) regarding the user list acquired from the application server 300 (example of the server device) handling the request destination application 20 (example of the application) running in the specified mode. Then, the user list acquisitor 163 acquires from the management server 200 the user list filtered (example of extraction) based on the prescribed extraction conditions from the notified user list to be a new user list (for example, the invitation candidate user list).

As described with regard to the first embodiment, the user list is an example of information indicating users, and this information can take any form. For example, the user list acquisitor 163 (invitation candidate user information acquisitor) may notify the management server 200 regarding a user list (example of prescribed relationship user information) indicating users in a prescribed relationship (for example, friend relationship) with an inviting user (example of the local user) in the request destination application 20 (example of the second application) running in the specified mode. The user list acquisitor 163 may then acquire from the management server 200 information indicating the users extracted from the notified user list based on prescribed extraction conditions and take this as being the invitation candidate user list (example of invitation candidate user information).

This enables the user terminal 100 present as a friend list an invitation candidate user list of users who can select the invited user to the inviting user, from which pre-established users from among users in a prescribed relationship (for example, friend relationship) with the inviting user in the request destination application 20 have been excluded. The inviting user, therefore, can select an invited user from among a friend list that excludes users whom the inviting user does not wish to accept.

(5) The controller 230 of the management server 200 (example of the management device) has the extractor 239, the user list notifier 240, the invitation request receiver 233, the invitation notifier 236, and the invitation establishment receiver 237. The extractor 239 performs filtering (extraction), based on the prescribed extraction conditions, of users who are candidates for invitation to the request source application 10 (example of the first application) of the users included in the user list when a user list of users in a prescribed relationship (for example, friend relationship) is acquired from the request destination application 20 (example of the second application). The user list notifier 240 transmits to the user terminal 100 of the inviting user (example of the first user) an invitation candidate list that is a list of users extracted by the extractor 239, who will be candidates for invitation to the request source application 10 (example of the first application). The invitation request receiver 233 receives from the user terminal 100 of the inviting user invitation request information that requests invitation to the request source application 10 of the invited user (example of the second user), who is a user selected from among the filtered invitation candidate user list. The invitation notifier 236 transmits to the user terminal 100 of the invited user invitation notification information based on the invitation request information. The invitation establishment receiver 237 receives from the user terminal 100 of the invited user invitation establishment information that indicates the establishment of an invitation from the request destination application 20 to the request source application 10.

This enables the management server 200 to notify the user terminal 100 regarding the invitation candidate user list of users extracted based on pre-established extraction conditions from the user list of users in a prescribed relationship (for example, friend relationship) with the inviting user in the request destination application 20. It is therefore possible to improve the convenience for a user when inviting a user in a friend relationship in a given application to another application.

The constitution of the controller 230 of the management server 200 (example of the management device) need not have the invitation establishment receiver 237, and may have at least the extractor 239, the user list notifier 240, the invitation request receiver 233, and the invitation notifier 236. For example, if the extractor 239 acquires a user list (example of prescribed relationship user information indicating a prescribed relationship) of users in a prescribed relationship (for example, friend relationship) from the request destination application 20 (example of the second application), it performs filtering (extraction), based on the extraction conditions, of users who will be candidates for invitation to the request source application 10 (example of the first application) among from users included in the user list. The user list notifier 240 (example of the invitation candidate user notifier) transmits to the user terminal 100 of the inviting user (example of the first user) an invitation candidate user list (example of invitation candidate user information) indicating users who are candidates for invitation to the request source application 10 extracted by the extractor 239. The invitation request receiver 233 receives from the user terminal 100 of the inviting user invitation request information that requests invitation to the request source application 10 of the invited user (example of the second user) from among users indicated in the transmitted invitation candidate user list. The invitation notifier 236 transmits the invitation notification information based on the invitation request information to the user terminal 100 of the invited user.

This enables the management server 200 to extract and notify the user terminal 100 of the inviting user of only users who will be invitation candidates of the user list of users in a prescribed relationship (for example, friend relationship) with the inviting user in the request destination application 20. It is therefore possible to improve the convenience for a user when inviting a user in a friend relationship in a given application to another application.

For example, if the extractor 239 acquires from the request destination application 20 launched from the request source application 10 a user list of user in a prescribed relationship, it extracts users who will be candidates for invitation to the request source application 10, based on the extraction conditions. The user list notifier 240 transmits the invitation candidate user list to the request destination application 20 of the user terminal 100 of the inviting user. The invitation request receiver 233 receives from the request destination application 20 of the user terminal 100 of the inviting user invitation request information that requests an invitation of the invited user to the request source application 10. In this manner, rather than receiving invitation request information from the request source application 10 of the inviting user, because the invitation request information is received from the request source application 10 with the intervention (launching) of the request destination application 20, invitations between even applications in which there is incompatibility of user information, such as the request source application 10 and the request destination application 20, is made easy.

The management server 200 may have a constitution having invitation establishment receiver 237 that receives from the user terminal 100 of the invited user (example of the second user) invitation establishment information indicating the establishment of an invitation to the request source application 10 (example of the first application) from the request destination application 20 (example of the second application).

According to this constitution, if the invitation by invitation request from the inviting user establishes an invitation, the management server 200 can recognize the establishment. For example, if the management server 200 recognizes that the invitation by invitation request information from the inviting user is established, it may perform processing so as to grant prescribed reward to the inviting user in the request source application 10.

(6) For example, as the above-noted extraction condition, the extractor 239 excludes from the subject of extraction the users in which invitation requests from an inviting user (example of the first user) are set as blocked.

This enables the management server 200 to transmit to the user terminal 100 of the inviting user an invitation candidate user list from which users who have set the blocking of invitation requests from the inviting user have been excluded.

Specifically, for example, the application manager 231 stores in the invitation request blocked user settings storage 227 invitation request blocked user settings information (example of the first blocking information) that combines blocking users (setting-side users who have blocked invitation requests) set and blocked user (set-side users who have been blocked from invitation information with respect to setting-side users).

As the extraction condition, if there is, among the invitation request blocked user settings information managed by the application manager 231, invitation request blocked user settings information in which the inviting user (example of the first user) is set as a blocked user (example of the set-side user), the extractor 239 excludes the blocking user (example of the setting-side user) indicated by the invitation request blocked user settings information from the subject of extraction as a user for which blocks invitation requests set from the inviting user.

If there is invitation request block user settings information in which an inviting user (example of the first user) is set to the blocking user (example of the setting-side user), the blocked user indicated by the invitation request blocked user settings information may be excluded as a user in which invitation requests from the inviting user are blocked. That is, the blocking of invitation requests may be made in one direction with respect to the blocking user and the blocked user, or may be made with respect to both.

In the mutual invitation system 500, this enables the setting of the relationship of users in system-adaptable applications in which mutual invitation is not wished to be made in the management server 200. Therefore, the mutual invitation system 500 can prevent invitation requests to an invited user from an inviting user from which invitations are not welcomed in an arbitrary system-adaptable application.

(7) The extractor 239 may, as the above-noted extraction condition, exclude from the targets of extraction a user in which blocking of an invitation request to the request source application 10 (example of the first application) is set.

Specifically, for example, the application manager 231 stores into the invitation request blocking application settings storage 228 and manages invitation request blocked application settings information (example of second blocking information) that combines the blocking user (setting-side user who sets the blocking of an invitation request) and the blocked system-adaptable application (set-side application for which invitation request is blocked with respect to the setting-side user).

If, in the invitation request blocked application settings information managed by the application manager 231, there is invitation request blocked application settings information in which the request source application 10 (example of the first application) is set to a blocked application (example of the set-side application), the extractor 239 excludes a blocking user indicated by the invitation request blocked application settings information (example of the setting-side user) as a user that sets blocking of invitation requests to the request source application 10.

This enables the management server 200 to transmit to the user terminal 100 of the inviting user an invitation candidate list from which users that have set blocking of invitation requests to the request source application 10 have been excluded. The mutual invitation system 500 can thus make a blocking invitation request to the system-adaptable application in which the user does not wish to accept an invitation. Therefore, in the mutual invitation system 500, for example, if a user makes a setting to block invitation requests to system-adaptable applications that are already installed in the user terminal 100 of the user or system-adaptable application that were played once and subsequently uninstalled, it is possible to block, so that invitation requests are not made to these system-adaptable applications with respect to that user.

(Fourth Embodiment)

Next, the fourth embodiment of the present invention will be described. Because the constitution of the mutual invitation system 500 in the present embodiment is the same as the third embodiment, the characteristic processing in the present embodiment will be described. In the third embodiment, the description has been for the case in which the user list is filtered based on the invitation request blocked user settings information or invitation request blocked application settings information stored in the extraction conditions storage 225. In the present embodiment, the description will be of filtering of the user list based on the invitation request records stored in the invitation request information storage 222.

For example, if the user list is acquired from the request destination application 20 (SDK 11B) of the user terminal 100, the extractor 239 of the management server 200 filters (extracts), based on the invitation request records, the invitation candidate users that will be candidates for invitation to the request source application 10 from among the users included in that user list.

What should be the object of first priority in the filtering processing in the present embodiment is the exclusion of invitation candidate users who have installed and already used the request source application 10 from the invitation candidate user list. The second object is the exclusion from the invitation candidate user list of invitation candidate users with respect to whom an invitation request is currently being made. The third object is the exclusion from the invitation candidate user list of invitation candidate users with a history of a failed or blocked invitation.

In the following, examples of the processing to fitter based on the invitation request records will be described, with references made to FIG. 17 to FIG. 21, which will show the first to the fifth example as examples of filtering processing. The first and second examples are examples of filtering processing regarding the first object, the third example is an example of filtering processing regarding the second object, and the fourth and fifth examples are examples of filtering processing regarding the third object.

In this case, FIG. 17 to FIG. 21 show examples of part of the information included the invitation request record information stored in the invitation request information storage 222. In each of these drawings, information of the invitation request record information that is noted as "=" is the same as the ID set in the invitation request record of a past invitation request as the extraction conditions when the extractor 239 performed filtering.

(1) FIG. 17 describes the first example of processing for filtering based on invitation request records. The processing shown in the first example is filtering processing to exclude, from the invitation candidate user list, invitation candidate users who have performed an invitation request to the request source application 10 (game A), so that an invitation candidate user who has already used (played) the request source application 10 (game A) does not receive an invitation request (is not re-invited). This invitation request is one for the same request source application 10 and the same request destination application 20 and in which the invitation candidate user is the inviting user.

With respect to the invitation request records stored in the invitation request information storage 222, the extractor 239 of the management server 200 excludes, from the invitation candidate user list, invitation candidate users satisfying the condition that the request source application ID (ApIDfrom) and the request destination user ID (ApIDto) coincide and also that the user ID of the invitation candidate user coincides with the inviting user ID (Apto_UIDfrom) of the request destination application, so that an invitation request (re-invitation) satisfying these conditions is not made. That is, an invitation candidate user indicated by the user ID set in the inviting user ID (Apto_UIDfrom) of the request source application is removed from the invitation candidate user list, so that an invitation request for which the user ID that is set to the inviting user ID (Apto_UIDfrom) of the request destination application is the invited user ID (Apto_UIDto) of the request destination application is not subject to an invitation request.

(2) FIG. 18 describes the second example of the invitation request filtering processing. The processing shown in the second example is filtering processing that excludes from the invitation candidate user list an invitation candidate user for which an invitation to the request source application 10 (game A) has already been established, so that an invitation candidate user who has already used (played) the request source application 10 (game A) is not subjected to an invitation request (re-invitation).

The invitation request information shown in FIG. 18 indicates that either the flag 2 or the flag 3 is set into the invitation request status (StatusInvite), showing that the invitation for the invitation request has already been established. With respect to the invitation request records stored in the invitation request information storage 222, the extractor 239 of the management server 200 excludes from the invitation candidate user list invitation candidate users satisfying the condition that the request source application ID (ApIDfrom), the request destination application ID (ApIDto), and the invited user ID (Apto_UIDto) of the request destination application coincide, so that an invitation request (re-invitation) satisfying these conditions is not made.

The processing shown in the second example may be further applied to the processing shown in the first example, in which case filtering processing is done that excludes, from the invitation candidate user list, invitation candidate users who have already used (played) the request source application 10 (game A).

(3) FIG. 19 describes the third example of invitation request filtering processing. The processing shown by the third example is filtering processing that, for example, excludes, from the invitation candidate user list, invitation candidate user for which an invitation request is currently being made (invitation in progress) to the request source application 10 (game A) from the request destination application 20 (game B).

The invitation request information shown in FIG. 19 indicates that either the flag 0 or the flag 1 is set into the invitation request status (StatusInvite), showing that the invitation request is currently being made (the invitation request either being already notified or not yet notified). With respect to the invitation request records stored in the invitation request information storage 222, the extractor 239 of the management server 200 excludes, from the invitation candidate user list, invitation candidate users satisfying the condition that the request source application ID (ApIDfrom), the request destination application ID (ApIDto), and the request destination application invited user ID (ApTo_UIDto) coincide and also that the user ID of the invitation candidate user coincides with the inviting user ID (Apto_UIDfrom), so that an invitation request satisfying these conditions is not made.

The processing shown as the third example may be further applied to the processing shown in the first example or the second example, in which case filtering processing is done that excludes, from the invitation candidate user list, invitation candidate users who are already using (playing) the request source application 10 (game A) or invitation candidate users for whom invitation requests are in progress.

(4) FIG. 20 describes the fourth example of the invitation request filtering processing. The processing shown in the fourth example is filtering processing that excludes from the invitation candidate user list, for example, an invitation candidate user for which an invitation request to the request source application 10 (game A) failed or was blocked.

The processing shown in the fourth example is applied in the case in which a system-adaptable application in which the re-invitation enabling flag (FlagResultInvite) of the application information stored in the application settings storage 221 is set to the flag 0 (re-invitation disabled) is the request source application 10 or the request destination application 20.

The invitation request information shown in FIG. 20 indicates that the flag −1 is set into the invitation request status (StatusInvite), indicating that this invitation request either failed or was blocked. With respect to the invitation request records stored in the invitation request information storage 222, the extractor 239 of the management server 200 excludes, from the invitation candidate user list, invitation candidate users satisfying the condition that the request source application ID (ApIDfrom), the request destination application ID (ApIDto), and the request destination application invited user ID (ApTo_UIDto) coincide, so that an invitation requests satisfying these conditions is not made.

If system-adaptable applications in which the re-invitation enabling flag (FlagResultInvite) is set to the flag 1 (re-invitation enabled) are the request source application 10 and the request destination application 20, invited users satisfying the above-noted conditions are not excluded from the invitation candidate user list.

The processing shown in the fourth example may be applied to the processing of the first to the third examples, in which case filtering processing is done that excludes, from the invitation candidate user list, an invitation candidate user who is already using (playing) the request source application 10 (game A), an invitation candidate user for whom the invitation request is in progress, or an invitation candidate user for whom an invitation request has failed or was blocked.

(5) FIG. 21 describes the fifth example of invitation request filtering processing. The processing shown in the fifth example is filtering processing that, in the processing shown in the fourth example, if the inviting user is the same, further excludes an invitation candidate user for which the invitation request from the request destination application 20 (game B) to the request source application 10 (game A) has failed. That is, in the processing shown in the fourth example, even in the case of an invited user for which an invitation request from the request destination application 20 (game B) to the request source application 10 (game A) has failed, if the inviting user is different, that invitation candidate user need not be excluded from the invitation candidate user list.

The invitation request information shown in FIG. 21 shows that the flag −1 is set into the invitation request status (StatusInvite), indicating that the invitation request has failed. With respect to the invitation request records stored in the invitation request information storage 222, the extractor 239 of the management server 200 excludes, from the invitation candidate user list, invitation candidate users satisfying the condition that the request source application ID (ApIDfrom), the request destination application ID (ApIDto), and the request destination application inviting user ID (Apto_UIDftom), and the request destination application invited user ID (ApTo_UIDto) coincide, so that an invitation requests satisfying these conditions are not made.

As described above, in the present embodiment, similar to the third embodiment, a user list that has been filtered (extracted) based on prescribed conditions is taken to be a new user list (example of the invitation candidate user list). In this case, in the present embodiment filtering is performed by extraction based on invitation request records.

(1) The controller 230 of the management server 200 (example of the management device) of the present embodiment has the extractor 239, the user list notifier 240, the invitation request receiver 233, the invitation notifier 236, and the invitation establishment receiver 237. If a user list of users in a prescribed relationship (for example, friend relationship) has been acquired from the request destination application 20 (example of the second application), the extractor 239, of the users included in the user list, filters (extracts) users as candidates for invitation to the request source application 10 (example of the first application) based on prescribed extraction conditions. The user list notifier 240 transmits, to the user terminal 100 of the inviting user (example of the first user), an invitation candidate user list that is a list of users that are candidates for invitation to the request source application 10 extracted by the extractor 239. The invitation request receiver 233 receives, from the user terminal 100 of the inviting user, invitation request information that requests an invitation of the inviting user (example of the second user), who is selected from among the filtered invitation candidate user list, to the request source application 10. The invitation notifier 236, based on the invitation request information, transmits the invitation request information to the user terminal 100 of the invited user. The invitation establishment receiver 237 receives, from the user terminal 100 of the invited user, invitation establishment information indicating that the invitation to the request source application 10 from the request source application 20 has been established.

This enables the management server 200 to notify the user terminal 100 regarding the invitation candidate user list of users extracted based on pre-established extraction conditions from the user list of users in a prescribed relationship (for example, friend relationship) with the inviting user in the request destination application 20. It is therefore possible to improve the convenience of a user inviting a user in a friend relationship in the given application to another application.

The controller 230 of the management server 200 (example of the management device) may be constituted so as not to have the invitation establishment receiver 237, and may be constituted to include at least the extractor 239, the user list notifier 240, the invitation request receiver 233, and the invitation notifier 236. For example, if the prescribed relationship user list (for example, friend relationship) (example of a prescribed relationship user information indicating users in a prescribed relationship) from the request destination application 20 (example of the second application), the extractor 239 performs filtering (extraction), based on extraction conditions, of users that will be candidates for invitation to the request source application 10 (example of the first application) from among users included in the user list. The user list notifier 240 (example of the invitation candidate user notifier) transmits to the user terminal 100 of the inviting user (example of the first user) an invitation candidate user list indicating users who will be candidates for invitation (example of the invitation candidate user information) to the request source application 10 extracted by the extractor 239. The invitation request receiver 233 receives, from the user terminal 100 of the inviting user, invitation request information that request the invitation of the invited user (example of the second user) indicated in the transmitted invitation candidate user list to the request source application 10. The invitation notifier 236 transmits, to the user terminal 100 of the invited user, invitation notification information based on the invitation request information.

This enables the management server 200 to extract and notify the user terminal 100 of the inviting user regarding only users that will be candidates for invitation among the user list of users in a prescribed relationship (for example, friend relationship) with the inviting user in the request destination application 20. It is therefore possible to improve the convenience of a user inviting a user in a friend relationship in the given application to another application.

(2) For example, the extractor 239 of the management server 200 excludes, under the above-noted extraction conditions, from the subject of extraction, users who have made an invitation request from the request destination application 20 (example of the second application) to the request source application 20 (example of the first application). In this case, a user who has made an invitation request from the request destination application 20 to the request source application 10 is a user who is already using the request source application 10.

This enables the management server 200 to suppress the inclusion in the invitation candidate user list of a user who is already using the request source application 10. That is, the management server 200 can transmit to the user terminal 100 of the inviting user the invitation candidate user list and improve the convenience of the inviting user.

(3) The extractor 239 may, under the above-noted extraction conditions, exclude from the subject of extraction a user for which an invitation request from the request destination application 20 (example of the second application) to the request source application 10 (example of the first application) has been established (second extraction condition) and the invitation request has been done. In this case, a user for which an invitation request from the request destination application 20 to the request source application 10 has been established and the invitation request has been done refers to a user who already is using the request source application 10.

This enables the management server 200 to suppress the inclusion in the invitation candidate user list of a user who is already using the request source application 10. That is, the management server 200 can transmit to the user terminal 100 of the inviting user the invitation candidate user list and improve the convenience of the inviting user.

Additionally, by combining the first extraction condition and the second extraction condition, it is possible to further suppress the inclusion in the invitation candidate user list of a user who is already using the request source application 10.

(4) The extractor 239 may, under the above-noted extraction conditions, exclude from the subject of extraction a user for which an invitation request from the request destination application 20 (example of the second application) to the request source application 10 (example of the first application) has been made but not established (third extraction condition).

Because a user that has been requested to be invited from another user is not included in the invitation candidate user list, this enables the management server 200 to suppress the inclusion in the invitation candidate user list of a user for which there is a possibility that the invitation request will fail. That is, the management server 200 can transmit the invitation candidate user list to the user terminal 100 of the inviting user and can improve the convenience for the inviting user.

Additionally, by combining the first extraction or the second extraction condition with the third extraction condition, users for which an invitation request is easily established are included in the invitation candidate user list.

(5) The extractor 239, under the above-noted extraction conditions, may exclude from the subject of extraction a user that rejected an invitation request from the request destination application 20 (example of the second application) to the request source application 10 (example of the first application) (example of the fourth extraction condition). In this case, the user that rejected an invitation request from the request destination application 20 to the request source application 10 refers to a user who has rejected an invitation request by an invited user or a user who has ignored an invitation request status in which the invitation request is in progress and time has elapsed until a pre-established amount of time.

If a user who has ignored an invitation request to the request source application 10 from the request destination application 20 requests the invitation to the request source application 10, there is a possibility that the invitation request will fail. The result is that the management server 200 can suppress the inclusion in the invitation candidate user list of a user for which there is a possibility that an invitation request will fail. That is, the management server 200 can transmit the invitation candidate user list to the user terminal 100 of the inviting user and improve the convenience of the inviting user.

Additionally, by combining the above-noted first extraction condition, or second extraction condition or the above-noted third extraction condition with the fourth extraction condition, users for which an invitation request is easily established are included in the invitation candidate user list.

(6) The application manager 231 of the management server 200 manages information regarding a plurality of system-adaptable applications, including information indicating whether or not to permit re-invitation to the request source application 10 (example of the first application). The extractor 239 of the management server 200, under the above-noted extraction conditions, references the application manager 231 and, if re-invitation to the request source application 10 (example of the first application) is permitted, includes the user who has rejected an invitation request to the request source application 10 in the subject of extraction.

If there is an invitation request to the request source application 10 (example of the first application) to which re-invitation is permitted, the management server 200 can permit re-invitation.

(7) Under the above-noted extraction conditions, even in the case of a user who has rejected an invitation request from the request destination application 20 (example of the second application) to the request source application 10 (example of the first application), the extractor 239 may, if there is an invitation request from an inviting user (example of the first user) different from that invitation request, include that user in the subject of extraction.

This enables the management server 200 to permit re-invitation in the case of a different inviting user, even if an invitation request from the same system-adaptable application had been rejected in the past.

(Variation Examples)

Although embodiments of the present invention have been described in detailed, with references made to drawings, the specific constitution is not restricted to the above-described embodiments, but encompasses designs within the scope of spirit of the present invention. Each of the functions that have been described in the above first to third embodiments can be arbitrarily combined.

(1) In the above embodiments, examples have been described in which the communicator 210 of the management server 200 (example of the transceiver) communicates the application list (example of at least a part of information managed by the application manager 231), invitation request information, invitation notification information and invitation establishment information directly with the user terminal 100 of the inviting user or the user terminal 100 of the invited user. In the same manner, examples have been described in which the terminal communicator 130 of the user terminal 100 (example of the transceiver) communicates the application list, the user list (example of the invitation candidate user information), the invitation request information, the invitation notification information and the invitation establishment information directly with the management server 200.

In this case, the communicator 210 of the management server 200 establishes a communication session via the application server 300 (example of the server device) handling the request source application 10 (example of the first application) or the request destination application 20 (example of the second application), and then may communicate directly with the user terminal 100 of the inviting user or the user terminal 100 of the invited user. In the same manner, the terminal communicator 130 of the user terminal 100 establishes a communication session via the application server 300 handling the request source application 10 or the request destination application 20 (example of the application currently running), and then may communicate directly with the management server 200.

Additionally, if direct communication from the user terminal 100 to the management server 200 is performed, if necessary, a communication session may be established. Both cases may be included, that is, the case in which before establishing the communication session, direct communication with the management server 200 is performed, and another case in which after establishing the communication session, direct communication with the management server 200 is performed.

Figure 22:
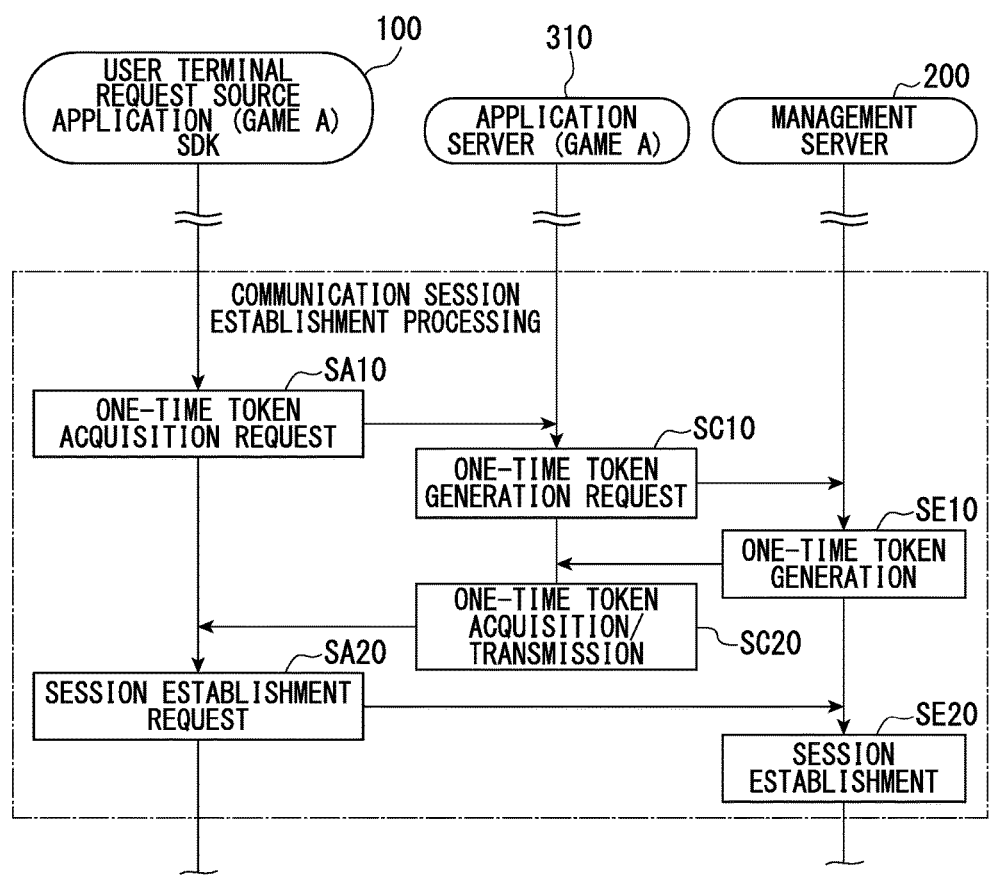
FIG. 22 is a flowchart describing the operation of processing to establish a communication session.

FIG. 22 is a flowchart describing the operation of processing to establish a communication session. The processing to establish the communication session (communication session establishment processing) is processing that is performed, as necessary, before communicating with the management server 200 after launching the request source application 10 or the request destination application 20 in the user terminal 100. FIG. 22 shows the communication session establishment processing that is performed in the case in which direct communication with the management server 200 is performed from the SDK 11A of the request source application 10 installed into the user terminal 100. Also, the communication session establishment processing can be done in the same manner in the case in which direct communication with the management server 200 is performed from the SDK 11B of the request destination application 20. It is pre-condition that a communication session has already been established between the user terminal 100 and the application server 310.

First, the SDK 11A of the user terminal 100 transmits to the application server 310 one-time token acquisition request information that requests the acquisition of a one-time token (step SA10). Upon acquiring the one-time token acquisition request information from the user terminal 100 (SDK 11A), the application server 310 transmits to the management server 200 one-time token generation request information based on the acquired one-time token acquisition request information (step SC10). Upon acquiring the one-time token generation request information from the application server 310, the management server 200 generates a one-time token and transmits the generated one-time token to the application server 310 (step SE10). Upon acquiring the one-time token from the management server 200, the application server 310 transmits the acquired one-time token to the user terminal 100 (SDK 11A) (step SC20). Upon acquiring the one-time token from the application server 310, the SDK 11A of the user terminal 100 transmits to the management server 200 session establishment request information that includes the acquired one-time token (step SA20). Upon acquiring the session establishment request information from the user terminal 100 (SDK 11A), the management server 200 establishes a communication session to permit communication by the mutual invitation system 500, if the one-time token included in the acquired session establishment request information is correct information (if the one-time token transmitted to the user terminal 100 (SDK 11A) coincides therewith) (step SE20). Subsequently, the invitation processing by the mutual invitation system 500 described with reference, for example, to FIG. 9, FIG. 10, and FIG. 13 is performed. If the one-time token included in the session establishment request information acquired from the user terminal 100 (SDK 11A) is not the correct information, the management server 200 takes this to be a communication error, so as not to permit communication by the mutual invitation system 500. Also, if the management server 200 cannot acquire the session establishment request information from the user terminal 100 (SDK 11A), the communication by the mutual invitation system 500 is naturally not permitted.

In this manner, after establishing the communication session, communication by the mutual invitation system 500 starts, thereby enabling improvement of security within the network system 1 that includes the mutual invitation system 500.

Rather than communicating directly part of the application list, the invitation request information, the invitation notification information, from the user terminal 100 to the management server 200, communication with the user terminal 100 may be done via the application server 300 (example of the server device) handling the request source application 10 (example of the first application) or the request destination application 20 (example of the second application). That is, the communicator 210 of the management server 200 (example of the transceiver) may communicate the application list, the invitation request information, the invitation notification information, or the invitation establishment information with the user terminal 100 of the inviting user or the user terminal 100 of the invited user via the application server 300 handling the request source application 10 or the request destination application 20, or may directly communicate with the user terminal 100 of the inviting user or the user terminal 100 of the invited user. In the same manner, the terminal communicator 130 of the user terminal 100 (example of the transceiver) may communicate the application list, the user list, the invitation request information, the invitation notification information, or the invitation establishment information with the management server 200 via the application server 300 handling the request source application 10 or the request destination application 20 (example of the application currently running), or may directly communicate with the management server 200.

Additionally, the communicator 210 of the management server 200 (example of the transceiver) may communicate the application list, the invitation request information, the invitation notification information, and the invitation establishment information with the user terminal 100 of the inviting user or the user terminal 100 of the invited user via the application server 300 (example of the server device) handling the request source application 10 (example of the first application) or the request destination application 20 (example of the second application). In the same manner, the terminal communicator 130 of the user terminal 100 (example of the transceiver) may communicate the application list, the user list, the invitation request information, the invitation notification information, and the invitation establishment information with the management server 200 via the application server 300 handling the request source application 10 or the request destination application 20 (example of the application currently running).

In this manner, the mutual invitation system 500 can perform the same invitation processing as in the above-noted embodiments even if the user terminal 100 and the management server 200 communicate via the application server 300, and the same effects can be obtained.

(2) Although the above-noted third embodiment and fourth embodiment have been described for the example in which the request destination application 20 (game B) of the user terminal 100-1 acquires a user list from the application server 320 (game B) and gives notification to the management server regarding a filtering request that includes the user ID that is included in the acquired user list, this is not a restriction.

For example, the request destination application 20 (game B) of the user terminal 100-1 notifies the management server 200 of the filtering request information without acquiring the user list from the application server 320 (game B). Then, the management server 200, upon receiving the filtering request information from the user terminal 100-1 (SDK 11B), transmits to the application server 320 (game 13) friend list request information that requests a user lists of users in a prescribed relationship (friend relationship) with the user X.

Next, the application server 320 (game B), upon receiving the friend list request information from the management server 200, transmits to the management server 200 a user list of users in a prescribed relationship (friend relationship) with the user X. Then, the management server 200, upon receiving the user list from the application server 320 (game B), performs filtering processing in accordance with prescribed extraction conditions, and transmits the filtered invitation candidate user list as the result of filtering to the user terminal 100-1 (SDK 11B).

In this manner, if the user list is acquired from the application server 320 (game B), the management server 200 may acquire it directly from the application server 320 (game B) or indirectly via the user terminal 100-1 (SDK 11B).

(3) In the above-noted embodiments, although the descriptions have been for the system-adaptable applications adaptable to the mutual invitation system 500 being games, this is not a restriction, and the applications may be those other than games.

In the above-noted embodiments, although the descriptions have been for the case in which the user in a prescribed relationship with the inviting user in the request source application 20 is a user in a friend relationship with the inviting user, this is not a restriction. For example, the prescribed relationship may be belonging to the same group in the request source application 20, being in the same company, or being a relative or the like, or may be simply the relationship of a user registered in the request destination application 20.

The storage 220 of the management server 200 may be provided in a server device that is different from the management server 200. The controller 230 of the management server 200 may communicate via the network NW with a storage 220 provided in a server device different from the management server 200 so as to manage various information stored in various uses of the storage 220.

The management server 200 and the application server 300 may be constituted integrally as a server device.

Although the above-noted embodiments have been described for the example in which a system-adaptable application adaptable to the mutual invitation system 500 is a native application, this is not a restriction. For example, a system-adaptable application adaptable to the mutual invitation system 500 may be a so-called browser (web-based) application so that the execution agent for the processing regarding the system-adaptable application is not the user terminal 100, but rather the application server 300.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A management device comprising:
   a management server configured to communicate with a software development kit embedded in a first application installed in a first terminal, wherein the first application is managed by a first application server;
   the management server being further configured to communicate with the software development kit embedded in a second application installed in the first terminal, wherein the second application is managed by a second application server, independently from the management of the first application by the first application server;
   the management server being further configured to communicate with the software development kit embedded in the second application installed in a second terminal, wherein the second application is managed by the second application server, independently from the management of the first application by the first application server;
   the management server being further configured to manage, for the first terminal, a list of applications installed in the first terminal, wherein the applications are embedded with the software development kit, wherein the applications include at least the first application and the second application;
   the management server being further configured to receive, from the software development kit embedded in the first application installed in the first terminal, a request for a list of applications installed in the first terminal where the applications are embedded with the software development kit;
   the management server being further configured to provide, in accordance with the request from the software development kit embedded in the first application installed in the first terminal; the list of applications installed in the first terminal where the applications are embedded with the software development kit, wherein the applications are other than the first application, the list is for allowing a user of the first terminal to select one or more applications, and the list is for allowing the software development kit to start the one or more of the applications;
   the management server being further configured to receive, from the software development kit embedded in the second application installed in the first terminal, a request for inviting a user of the second terminal to the first application, wherein the user of the second terminal is managed as being associated with the user of the first terminal by the second application server, and the user of the second terminal is selected by the user of the first terminal on the basis of a user list managed by the second application server; and
   the management server being further configured to send the software development kit embedded in the second application installed in the second terminal an invitational notice of inviting the user of the second terminal to the first application.

2. The management device according to claim 1, wherein the management server comprises:
   an invitation request receiver configured to acquire an invitation request information associated with user information for users of terminals, and
   an invitation request manager configured to manage, as an invitation request record, the invitation request information and the second user, which are associated with each other.

3. The management device according to claim 2,
   wherein the invitation request receiver is configured to acquire the invitation request information in association with a first user in the software development kit embedded in the first application as a request source game application and in association with a second user in the software development kit embedded in the second application as a request destination game application,
   wherein the invitation request manager is configured to manage, as an invitation request record, the invitation request information, and information of association between first and second users the first user corresponding information.

4. The management device according to claim 3, wherein the information of first user in the software development kit embedded in the request source game application associated with the invitation request information is acquired by the software development kit embedded in the request destination game application on the first terminal of the first user, directly from the software development kit embedded in the request source game application on the first terminal of the first user.

5. The management device according to claim 2, wherein the information of first user in the software development kit embedded in the request source game application associated with the invitation request information is acquired by the software development kit embedded in the request destination game application on the first terminal of the first user, indirectly via a memory in the first terminal of the first user.

6. The management device according to claim 2, wherein the management server further comprises:
 a request inquirer configured to inquire whether the invitation request information for the second user is present or not, based on a request inquiry from the second terminal of the second user; and
 an invitation notifier configured to transmit, to the software development kit embedded in the request destination game application in the second terminal of the second user, the invitation notification information that is based on the invitation request information in a case that the invitation notifier determines that the invitation request information for the second user is present, upon the inquiry by the request inquirer.

7. The management device according to claim 2,
 wherein the invitation request receiver is configured to acquire the invitation request information associated with a second user corresponding information that corresponds to the second user in the software development kit embedded in the request destination game application, and
 wherein the management server further comprises:
 an invitation request manager configured to manage, as an invitation request record, the invitation request information and the second user corresponding information, which are associated with each other, and
 wherein the request inquirer is configured to inquire whether the invitation request record corresponding to the second user corresponding information in the software development kit embedded in the request destination game application that is associated with the request inquiry from the software development kit embedded in the request destination game application in the second terminal of the second user.

8. The management device according to claim 2, further comprising:
 an invitation establishment receiver configured to receive an invitation establishment information indicating that an invitation was established, which corresponds to the invitation notification information, wherein upon a launch of the request source game application in the second terminal of the second user, the invitation establishment information was transmitted from the software development kit embedded in the second terminal of the second user or a server that is adaptable to the request source game application, and
 an invitation establishment processor configured to perform a processing based on the invitation establishment information received by the invitation establishment receiver.

9. The management device according to claim 8, wherein, based on the invitation establishment information received by the invitation establishment receiver, the invitation establishment processor is configured to transmit an invitation completion notification information notifying that an invitation, which corresponds to the invitation notification information, to the first terminal of the first user or to a server that is adaptable to the request source game application.

10. The management device according to claim 9, wherein, based on the invitation establishment information received by the invitation establishment receiver, to grant a reward to the first user in the request source game application, the invitation establishment processor is configured to transmit the first user corresponding information in the software development kit embedded in the request source game application as the invitation completion notification information to the first terminal of the first user or to a server that is adaptable to the software development kit embedded in the request source game application.

11. The management device according to claim 8,
 wherein the invitation establishment information is associated with a part or all of the invitation notification information, and
 wherein the part or all of the invitation notification information is acquired by the software development kit embedded in the request source game application on the second terminal of the second user, directly from the software development kit embedded in the request destination game application on the second terminal of the second user, or indirectly via a memory in the second terminal of the second user.

12. The management device according to claim 1, wherein the management server further comprises:
 an application manager configured to manage a set of application information related to each of a plurality of applications which includes the first application as a request source game application and the second application as a request destination game application; and
 an application information notifier configured to transmit at least a part of the set of application information managed by the application manager to the first terminal of the first user.

13. The management device according to claim 12,
 wherein the application manager is configured to manage each application information of each of the plurality of applications which includes the request source game application and the request destination game application,
 wherein the application information notifier is configured to: refer each application information managed in the application manager; determine whether or not a request for invitation to the request source game application is allowed for each of the plurality of applications; and
 transmit, to the first terminal of the first user, a set of application indication information indicating one or more applications to which the request for invitation is allowed.

14. The management device according to claim 12,
 wherein the application manager is configured to manage an invitation prohibition information including a combination of an invitation-accepting-prohibited-application with an inviting-prohibited-application,
 wherein the invitation-accepting-prohibited-application is an application on which prohibition for an invitation to the inviting-prohibited-application is set to prohibit the invitation-accepting-prohibited-application from inviting the inviting-prohibited-application,
 wherein the inviting-prohibited-application is an application on which prohibition for accepting an invitation from the invitation-accepting-prohibited-application is set to prohibit the inviting-prohibited-application from accepting an invitation from the invitation-accepting-prohibited-application,
 wherein the application information notifier is configured to:

refer the invitation prohibition information managed by the application manager; and transmit, to the first terminal of the first user, a set of application indication information indicating other applications than the invitation-accepting-prohibited-application indicated by the invitation prohibition information which sets the first application into the inviting-prohibited-application.

15. The management device according to claim 12, wherein the application manager is configured to manage an invitation prohibition information including a combination of an invitation-accepting-prohibited-application with an inviting-prohibited-application,
wherein the invitation-accepting-prohibited-application is an application on which prohibition for an invitation to the inviting-prohibited-application is set to prohibit the invitation-accepting-prohibited-application from inviting the inviting-prohibited-application,
wherein the inviting-prohibited-application is an application on which prohibition for accepting an invitation from the invitation-accepting-prohibited-application is set to prohibit the inviting-prohibited-application from accepting an invitation from the invitation-accepting-prohibited-application,
wherein the application information notifier is configured to:
refer the invitation prohibition information managed by the application manager; and
transmit, to the first terminal of the first user, a set of application indication information indicating other applications than the inviting-prohibited-application indicated by the invitation prohibition information which sets the first application into the invitation-accepting-prohibited-application.

16. The management device according to claim 1, wherein the management server further comprises:
a transceiver configured to perform at least one of an indirect communication and a direct communication, with respect to at least one of the invitation request information and the invitation notification information,
wherein the indirect communication communicates indirectly via a server adaptable to the first application or the second application to any one of the first terminal of the first user and the second terminal of the second user, and
wherein the direct communication communicates directly to any one of the first terminal of the first user and the second terminal of the second user.

17. The management device according to claim 16, wherein the transceiver is configured to:
establish a communication session via a server adaptable to any one of the first application and the second application; and
communicate directly any one of the first terminal of the first user and the second terminal of the second user, after the communication session has been established.

18. A management method comprising:
communicating, by a management server, with a software development kit embedded in a first application installed in a first terminal, wherein the first application is managed by a first application server;
communicating, by the management server, with a software development kit embedded in a second application installed in the first terminal, wherein the second application is managed by a second application server, independently from the management of the first application by the first application server;
communicating, by the management server, with the software development kit embedded in the second application installed in a second terminal, wherein the second application is managed by the second application server, independently from the management of the first application by the first application server;
managing, by the management server, for the first terminal, a list of applications installed in the first terminal, wherein the applications are embedded with the software development kit, wherein the applications includes at least the first application and the second application;
receiving, by the management server, from the software development kit embedded in the first application installed in the first terminal, a request for a list of applications installed in the first terminal where the applications are embedded with the software development kit;
providing, by the management server, in accordance with the request from the software development kit embedded in the first application installed in the first terminal; the list of applications installed in the first terminal where the applications are embedded with the software development kit, wherein the applications are other than the first application, the list is for allowing a user of the first terminal to select one or more applications, the list is for allowing the software development kit to start the one or more of the applications;
receiving, by the management server, from the software development kit, a request for inviting a user of the second terminal to the first application, wherein the user of the second terminal is managed as being associated with the user of the first terminal by the second application server, and the user of the second terminal is selected by the user of the first terminal on the basis of a user list managed by the second application server; and
sending the management server the software development kit embedded in the second application installed in the second terminal an invitational notice of inviting the user of the second terminal to the first application.

19. A non-transitory computer readable storage medium that stores a computer program to be executed by a computer to perform a management method comprising:
communicating, by a management server, with a software development kit embedded in a first application installed in a first terminal, wherein the first application is managed by a first application server;
communicating, by the management server, with the software development kit embedded in a second application installed in the first terminal, wherein the second application is managed by a second application server, independently from the management of the first application by the first application server;
communicating, by the management server, with the software development kit embedded in the second application installed in a second terminal, wherein the second application is managed by the second application server, independently from the management of the first application by the first application server;
managing, by the management server, for the first terminal, a list of applications installed in the first terminal, wherein the applications are embedded with the software development kit, wherein the applications includes at least the first application and the second application;

receiving, by the management server, from the software development kit embedded in the first application installed in the first terminal, a request for a list of applications installed in the first terminal where the applications are embedded with the software development kit;

providing, by the management server, in accordance with the request from the software development kit embedded in the first application installed in the first terminal; the list of applications installed in the first terminal where the applications are embedded with the software development kit, wherein the applications are other than the first application, the list is for allowing a user of the first terminal to select one or more applications, the list is for allowing the software development kit to start the one or more of the applications;

receiving, by the management server, from the software development kit, a request for inviting a user of the second terminal to the first application, wherein the user of the second terminal is managed as being associated with the user of the first terminal by the second application server, and the user of the second terminal is selected by the user of the first terminal on the basis of a user list managed by the second application server; and sending the management server the software development kit embedded in the second application installed in the second terminal an invitational notice of inviting the user of the second terminal to the first application.

20. A management device comprising:

a management server further configured to communicate with a first software development kit embedded in a first application installed in a first terminal, wherein the first application is managed by a first application server;

the management server being further configured to communicate with a second software development kit embedded in a second application installed in the first terminal, wherein the second application is managed by a second application server, independently from the management of the first application by the first application server, and the second software development kit is the same as the first software development kit;

the management server being further configured to communicate with a third software development kit embedded in a third application installed in a second terminal, wherein the third application is managed by the second application server, independently from the management of the first application by the first application server, and the third software development kit is the same as the first software development kit and the second software development kit;

the management server being further configured to manage, for the first terminal, a first list of a first plurality of applications installed in the first terminal, wherein the first plurality of applications are embedded with a first plurality of software development kits, wherein the first plurality of applications includes at least the first application and the second application, and the first plurality of software development kits includes at least the first software development kit and the second software development kit, the first plurality of software development kits are the same as each other;

the management server being further configured to manage, for the second terminal, a second list of a second plurality of applications installed in the first terminal, wherein the first plurality of applications are embedded with a second plurality of software development kits, wherein the second plurality of applications includes at least the third application, and the second plurality of software development kits includes at least the third software development kit, the second plurality of software development kits are the same as each other; the second plurality of software development kits are the same as the first plurality of software development kits;

the management server being further configured to receive, from the first software development kit, a notice that an additional application is installed in the first terminal where the additional application is embedded with a software development kit which is the same as the first software development kit;

the management server being further configured to provide, in accordance with a request from the first software development kit; the first terminal with a list of applications embedded with software development kits which are the same as the first software development kit, wherein the applications are installed on the first terminal, the applications are other than the first application, the list is for allowing a user of the first terminal to select one or more of the applications, the list is for allowing the first software development kit to start the one or more of the applications;

the management server being further configured to receive, from the second software development kit, a request for inviting a user of the second terminal to the first application, wherein the user of the second terminal is managed as being associated with the user of the first terminal by the second application server, and the user of the second terminal is selected by the user of the first terminal on the basis of a user list managed by the second application server; and the management server being further configured to send the third software development kit an invitational notice of inviting the user of the second terminal to the first application.

21. A management device comprising:

a management server further configured to communicate with a first software development kit embedded in a first application installed in a first terminal, wherein the first application is managed by a first application server;

the management server being further configured to communicate with a second software development kit embedded in a second application installed in the first terminal, wherein the second application is managed by a second application server, independently from the management of the first application by the first application server, and the second software development kit is the same as the first software development kit;

the management server being further configured to communicate with a third software development kit embedded in a third application installed in a second terminal, wherein the third application is managed by the second application server, independently from the management of the first application by the first application server, and the third software development kit is the same as the first software development kit and the second software development kit;

the management server being further configured to manage, for the first terminal, a first list of a first plurality of applications installed in the first terminal, wherein the first plurality of applications are embedded with a first plurality of software development kits, wherein the first plurality of applications includes at least the first application and the second application, and the first plurality of software development kits includes at least the first software development kit and the second software development kit, the first plurality of software development kits are the same as each other;

the management server being further configured to manage, for the second terminal, a second list of a second plurality of applications installed in the first terminal, wherein the first plurality of applications are embedded with a second plurality of software development kits, wherein the second plurality of applications includes at least the third application, and the second plurality of software development kits includes at least the third software development kit, the second plurality of software development kits are the same as each other; the second plurality of software development kits are the same as the first plurality of software development kits;

the management server being further configured to receive, from the first software development kit, a notice that an additional application is installed in the first terminal where the additional application is embedded with a software development kit which is the same as the first software development kit;

the management server being further configured to provide, in accordance with a request from the first software development kit; the first terminal with a list of applications embedded with software development kits which are the same as the first software development kit, wherein the applications are installed on the first terminal, the applications are other than the first application;

the management server being further configured to receive, from the second software development kit, a request for inviting a user of the second terminal to the first application; and the management server being further configured to send the third software development kit an invitational notice of inviting the user of the second terminal to the first application.

22. The management device according to claim 21, wherein the list is for allowing a user of the first terminal to select one or more of the applications, the list is for allowing the first software development kit to start the one or more of the applications; and wherein the user of the second terminal is managed as being associated with the user of the first terminal by the second application server, and the user of the second terminal is selected by the user of the first terminal on the basis of a user list managed by the second application server.

23. A management device comprising:

a management server further configured to communicate with a first interface embedded in a first application installed in a first terminal, wherein the first application is managed by a first application server;

the management server being further configured to communicate with a second interface embedded in a second application installed in the first terminal, wherein the second application is managed by a second application server, independently from the management of the first application by the first application server, and the second interface is the same as the first interface;

the management server being further configured to communicate with a third interface embedded in a third application installed in a second terminal, wherein the third application is managed by the second application server, independently from the management of the first application by the first application server, and the third interface is the same as the first interface and the second interface;

the management server being further configured to manage, for the first terminal, a first list of a first plurality of applications installed in the first terminal, wherein the first plurality of applications are embedded with a first plurality of interfaces, wherein the first plurality of applications includes at least the first application and the second application, and the first plurality of interfaces includes at least the first interface and the second interface, the first plurality of interfaces are the same as each other;

the management server being further configured to manage, for the second terminal, a second list of a second plurality of applications installed in the first terminal, wherein the first plurality of applications are embedded with a second plurality of interfaces, wherein the second plurality of applications includes at least the third application, and the second plurality of interfaces includes at least the third interface, the second plurality of interfaces are the same as each other; the second plurality of interfaces are the same as the first plurality of interfaces;

the management server being further configured to receive, from the first interface, a notice that an additional application is installed in the first terminal where the additional application is embedded with an interface which is the same as the first interface;

the management server being further configured to provide, in accordance with a request from the first interface; the first terminal with a list of applications embedded with interfaces which are the same as the first interface, wherein the applications are installed on the first terminal, the applications are other than the first application;

the management server being further configured to receive, from the second interface, a request for inviting a user of the second terminal to the first application; and the management server being further configured to send the third interface an invitational notice of inviting the user of the second terminal to the first application.

24. The management device according to claim 23, wherein the list is for allowing a user of the first terminal to select one or more of the applications, the list is for allowing the first interface to start the one or more of the applications; and wherein the user of the second terminal is managed as being associated with the user of the first terminal by the second application server, and the user of the second terminal is selected by the user of the first terminal on the basis of a user list managed by the second application server.

25. The management device according to claim 23, wherein each of the first, second and third interfaces is an application programming interface.

* * * * *